US010004651B2

(12) United States Patent
DeLuca et al.

(10) Patent No.: US 10,004,651 B2
(45) Date of Patent: *Jun. 26, 2018

(54) PATIENT SUPPORT APPARATUS

(71) Applicant: Stryker Corporation, Kalamazoo, MI (US)

(72) Inventors: Richard Thomas DeLuca, Kalamazoo, MI (US); Richard A. Derenne, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/965,020

(22) Filed: Dec. 10, 2015

(65) Prior Publication Data

US 2016/0089283 A1 Mar. 31, 2016

Related U.S. Application Data

(63) Continuation-in-part of application No. 13/795,193, filed on Mar. 12, 2013, now Pat. No. 9,259,369.

(Continued)

(51) Int. Cl.
*A61G 1/02* (2006.01)
*B62D 5/04* (2006.01)
(Continued)

(52) U.S. Cl.
CPC ......... *A61G 1/0281* (2013.01); *A61G 1/0243* (2013.01); *A61G 1/0275* (2013.01);
(Continued)

(58) Field of Classification Search
CPC .. A61G 1/0281; A61G 1/0243; A61G 1/0275; A61G 1/0287; A61G 7/08; A61G 2007/0528; B62D 5/0457
See application file for complete search history.

(56) References Cited

U.S. PATENT DOCUMENTS 2,583,858 A 1/1952 Kostolecki
2,925,887 A 2/1960 Gibson
(Continued)

FOREIGN PATENT DOCUMENTS

AU 2008258348 6/2008
CA 2010543 9/1990
(Continued)

OTHER PUBLICATIONS

Fallshaw Wheels & Castors, Safety Made Simple, Trinity EBC Brochure, 4 pages, Sunshine VIC Australia.
(Continued)

*Primary Examiner* — Joseph M Rocca
*Assistant Examiner* — Marlon A Arce
(74) *Attorney, Agent, or Firm* — Howard & Howard Attorneys PLLC

(57) ABSTRACT

Patient support apparatuses—such as beds, cots, stretchers, or the like—include a plurality of user controls that allow a caregiver to control the steering and/or driving of one or more wheels from multiple different locations around the patient support apparatus (e.g. head end, foot end, and/or the sides). The control is carried out by force sensors that detect both an orientation of the applied forces and a magnitude of the applied forces. Translational and/or rotational movement is effectuated, depending upon the magnitude and direction of the forces, as well as the physical location of the applied force relative to a reference point on the support apparatus, such as the center. One or more object sensors may also be included in the support apparatus to assist in steering and/or navigating.

21 Claims, 36 Drawing Sheets

Related U.S. Application Data

(60) Provisional application No. 61/702,316, filed on Sep. 18, 2012, provisional application No. 62/247,396, filed on Oct. 28, 2015.

(51) Int. Cl.
*A61G 7/08* (2006.01)
*A61G 7/05* (2006.01)

(52) U.S. Cl.
CPC ......... *A61G 1/0287* (2013.01); *A61G 7/0528* (2016.11); *A61G 7/08* (2013.01); *B62D 5/0457* (2013.01); *A61G 2203/22* (2013.01); *A61G 2203/32* (2013.01); *A61G 2203/40* (2013.01); *A61G 2205/60* (2013.01)

(56) References Cited

U.S. PATENT DOCUMENTS

| | | |
|---|---|---|
| 3,276,788 A | 10/1966 | Sackler et al. |
| 3,349,862 A | 10/1967 | Shirey, Jr. |
| 4,163,929 A | 8/1979 | Janu et al. |
| 4,280,264 A | 7/1981 | Christensen |
| 4,805,712 A | 2/1989 | Singleton |
| 4,819,925 A | 4/1989 | Linnemann et al. |
| 4,895,173 A | 1/1990 | Brault et al. |
| 5,133,106 A | 7/1992 | Milbredt et al. |
| 5,517,718 A | 5/1996 | Eichhorn |
| 5,547,038 A | 8/1996 | Madwed |
| 5,609,220 A * | 3/1997 | Moriya ............... B62D 7/08 180/253 |
| 5,921,338 A * | 7/1999 | Edmondson ........ B60G 21/045 180/6.5 |
| 5,927,423 A | 7/1999 | Wada et al. |
| 6,109,379 A * | 8/2000 | Madwed ............... B60K 17/30 180/252 |
| 6,321,878 B1 | 11/2001 | Mobley et al. |
| 6,330,926 B1 | 12/2001 | Heimbrock et al. |
| 6,459,962 B2 | 10/2002 | Ulrich et al. |
| 6,584,641 B1 | 7/2003 | Milbredt |
| 6,588,523 B2 | 7/2003 | Heimbrock et al. |
| 6,752,224 B2 | 6/2004 | Hopper et al. |
| 6,834,402 B2 | 12/2004 | Hanson et al. |
| 6,845,533 B1 | 1/2005 | Tulette |
| 6,902,019 B2 | 6/2005 | Heimbrock et al. |
| 7,273,115 B2 | 9/2007 | Kummer et al. |
| 7,284,626 B2 | 10/2007 | Heimbrock et al. |
| 7,302,717 B2 * | 12/2007 | Reinke ............... A61G 1/0287 5/600 |
| 7,398,571 B2 | 7/2008 | Souke et al. |
| 7,406,745 B2 | 8/2008 | Chou |
| 7,407,024 B2 | 8/2008 | Vogel et al. |
| 7,481,286 B2 | 1/2009 | Ruschke et al. |
| 7,617,890 B2 * | 11/2009 | Romig ............... A01D 34/008 180/12 |
| 7,644,458 B2 | 1/2010 | Foster et al. |
| 7,698,765 B2 | 4/2010 | Bobey et al. |
| 7,789,175 B2 * | 9/2010 | Tobey ............... A61G 5/045 180/264 |
| 7,828,092 B2 | 11/2010 | Vogel et al. |
| 7,950,108 B2 | 5/2011 | Yang et al. |
| 7,953,537 B2 | 5/2011 | Bhai |
| 8,051,533 B2 | 11/2011 | Block et al. |
| 8,056,162 B2 | 11/2011 | Newkirk et al. |
| 8,125,318 B2 | 2/2012 | Heimbrock et al. |
| 8,196,944 B1 | 6/2012 | Vondrak |
| 8,205,297 B2 | 6/2012 | Fallshaw et al. |
| 8,266,742 B2 | 9/2012 | Andrienko |
| 8,267,205 B2 * | 9/2012 | Ishii ............... B60K 17/30 180/252 |
| 8,334,779 B2 | 12/2012 | Zerhusen et al. |
| 8,442,738 B2 | 5/2013 | Patmore |
| 8,484,802 B1 | 6/2013 | Lin et al. |
| 8,720,616 B2 | 5/2014 | Kofoed et al. |
| 8,776,314 B2 | 6/2014 | Hofrichter et al. |
| 8,984,685 B2 | 3/2015 | Robertson et al. |
| 9,108,665 B2 * | 8/2015 | Amino ............... B62D 5/0418 |
| 9,220,651 B2 | 12/2015 | Hyde et al. |
| 9,259,369 B2 | 2/2016 | Derenne et al. |
| 9,320,444 B2 | 4/2016 | Hayes et al. |
| 9,833,366 B2 | 12/2017 | DeLuca et al. |
| 2002/0043411 A1 | 4/2002 | Heimbrock et al. |
| 2003/0009825 A1 | 1/2003 | Gallant et al. |
| 2003/0159861 A1 | 8/2003 | Hopper et al. |
| 2003/0183427 A1 | 10/2003 | Tojo et al. |
| 2003/0184071 A1 | 10/2003 | Tokumaru et al. |
| 2005/0236208 A1 * | 10/2005 | Runkles ............... A61G 5/045 180/254 |
| 2006/0102392 A1 | 5/2006 | Johnson et al. |
| 2006/0231302 A1 | 10/2006 | Rose |
| 2007/0284845 A1 | 12/2007 | Roovers et al. |
| 2008/0084175 A1 | 4/2008 | Hollis |
| 2008/0141459 A1 | 6/2008 | Hamberg et al. |
| 2008/0238072 A1 | 10/2008 | Kofoed et al. |
| 2009/0001740 A1 * | 1/2009 | Kofoed ............... A61G 7/08 296/20 |
| 2009/0038864 A1 | 2/2009 | Yun |
| 2009/0143703 A1 | 6/2009 | Dixon et al. |
| 2009/0153370 A1 | 6/2009 | Cooper et al. |
| 2011/0087416 A1 | 4/2011 | Patmore |
| 2012/0117730 A1 | 5/2012 | Lemire et al. |
| 2012/0283746 A1 | 11/2012 | Hu et al. |
| 2013/0008732 A1 | 1/2013 | Richter |
| 2014/0076644 A1 | 3/2014 | Derenne et al. |
| 2014/0109342 A1 | 4/2014 | Hofrichter et al. |
| 2014/0150806 A1 | 6/2014 | Hu et al. |
| 2014/0238784 A1 | 8/2014 | Yeo |
| 2014/0265502 A1 | 9/2014 | Hough et al. |
| 2014/0324315 A1 | 10/2014 | Brondum |
| 2015/0266342 A1 | 9/2015 | Howard et al. |
| 2016/0137216 A1 | 5/2016 | Nilsson et al. |

FOREIGN PATENT DOCUMENTS

| | | |
|---|---|---|
| CN | 2915071 | 6/2007 |
| CN | 200960241 | 10/2007 |
| DE | 4319516 | 12/1994 |
| DE | 19949351 | 7/2001 |
| DE | 19949351 A1 | 7/2001 |
| EP | 0329504 | 8/1989 |
| EP | 0352647 | 1/1990 |
| EP | 0403202 | 12/1990 |
| EP | 0630637 | 12/1994 |
| EP | 0653341 | 5/1995 |
| EP | 0707842 | 4/1996 |
| EP | 2208487 A2 | 7/2010 |
| JP | 9024071 | 1/1997 |
| JP | 10-181609 | 7/1998 |
| JP | 10-305705 | 11/1998 |
| JP | 2000016298 | 1/2000 |
| JP | 2000-118407 | 4/2000 |
| JP | 2004-321722 | 11/2004 |
| JP | 2005-344777 | 12/2005 |
| JP | 2014212844 | 11/2014 |
| KR | 20030028351 | 4/2003 |
| WO | WO 87/07830 | 12/1987 |
| WO | WO94/21505 | 9/1994 |
| WO | WO95/20514 | 8/1995 |
| WO | WO 96/07555 | 3/1996 |
| WO | WO 96/33900 | 10/1996 |
| WO | WO0185084 | 11/2001 |
| WO | WO 2005041837 A2 | 5/2005 |
| WO | WO2005105480 | 11/2005 |
| WO | WO 2007016559 A2 | 2/2007 |
| WO | WO2008148169 | 12/2008 |
| WO | WO2009113009 | 9/2009 |
| WO | WO 2012055407 A1 | 5/2012 |

(56) References Cited

FOREIGN PATENT DOCUMENTS

| WO | WO 2014059483 A1 | 4/2014 |
| WO | WO2014075679 | 5/2014 |

OTHER PUBLICATIONS

Fallshaw, Trinity EBC, URL: htttps://www.fallshaw.com.au/castors/specialised/trinity-ebc.

English language abstract and machine-assisted translation for EP0630637 extracted from espacenet.com database on Mar. 25, 2017, 22 pages.

English Machine Translation for Foreign Patent Application JP9024071, Published Jan. 28, 1977.

International Search Report for PCT/US2013/056595, the International counterpart to U.S. Appl. No. 13/795,193.

International Written Opinion for PCT/US2013/056595, the International counterpart to U.S. Appl. No. 13/795,193.

VersaCare Bed Service Manual from Hill-Rom, MAN333, Rev2.

English language abstract and machine-assisted translation for JP2014212844 extracted from espacenet.com database Apr. 29, 2016, 22 pages.

European Search Report and Written Opinion dated Apr. 14, 2016, for European patent application EP 13839462, corresponding to U.S. Appl. No. 13/795,193, the parent of U.S. Appl. No. 15/004,501.

English language abstract and translation for DE19949351 extracted from espacenet.com database on Sep. 13, 2016, 22 pages.

English language abstract and machine-assisted translation for CN2915071 extracted from espacenet.com database dated Feb. 13, 2018, 9 pages.

English language abstract and machine-assisted translation for CN200960241 extracted from espacenet.com database dated Feb. 14, 2018, 12 pages.

English language abstract and machine-assisted translation for EP0630637 extracted from espacenet.com database dated Feb. 14, 2018, 24 pages.

English language abstract and machine-assisted translation for JP2005344777 extracted from espacenet.com database dated Feb. 14, 2018, 17 pages.

U.S. Appl. No. 15/809,350.

\* cited by examiner

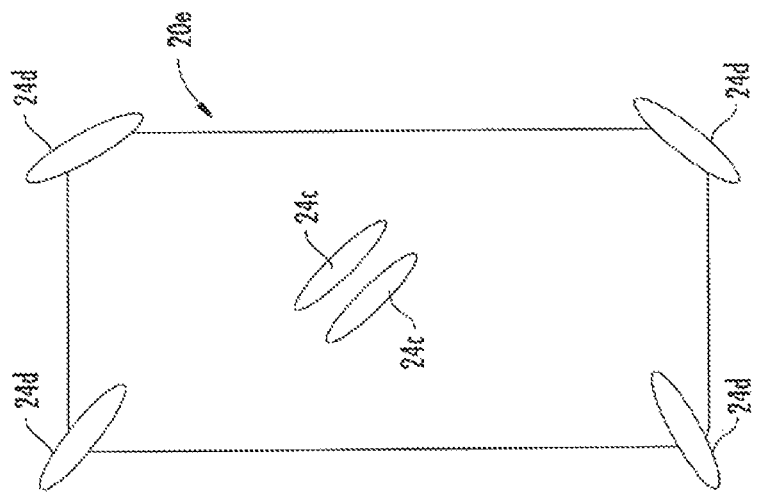
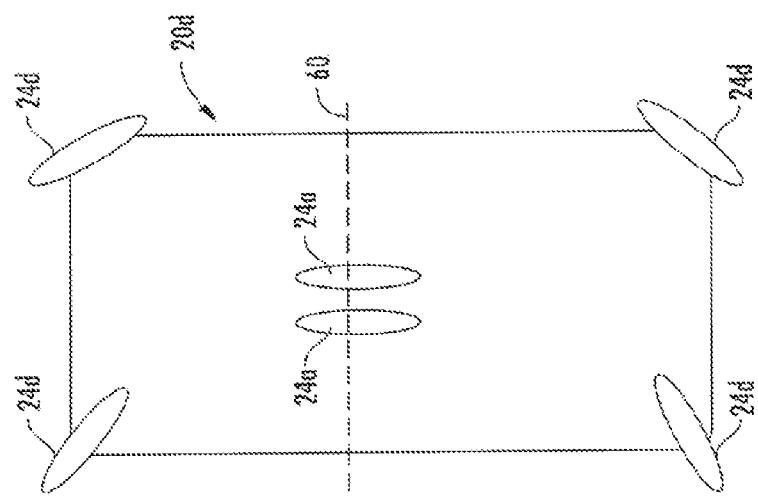

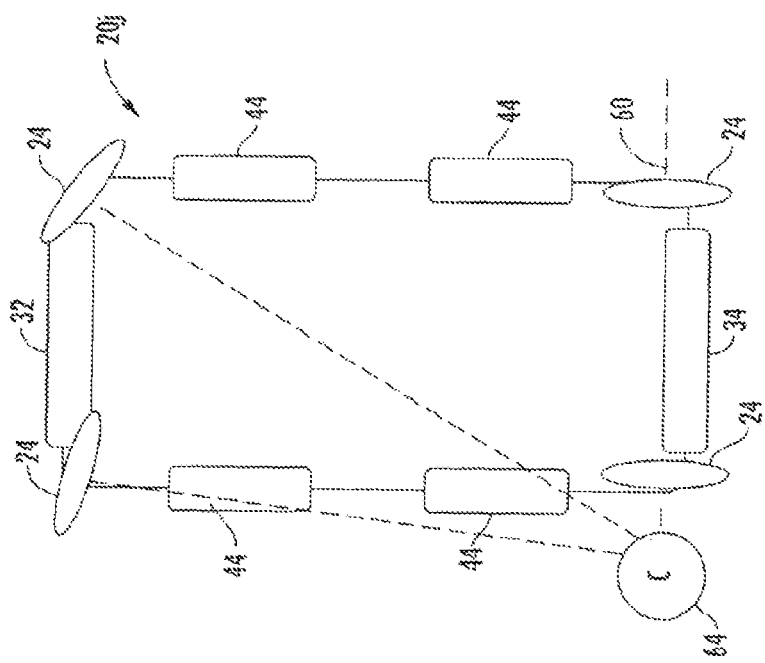
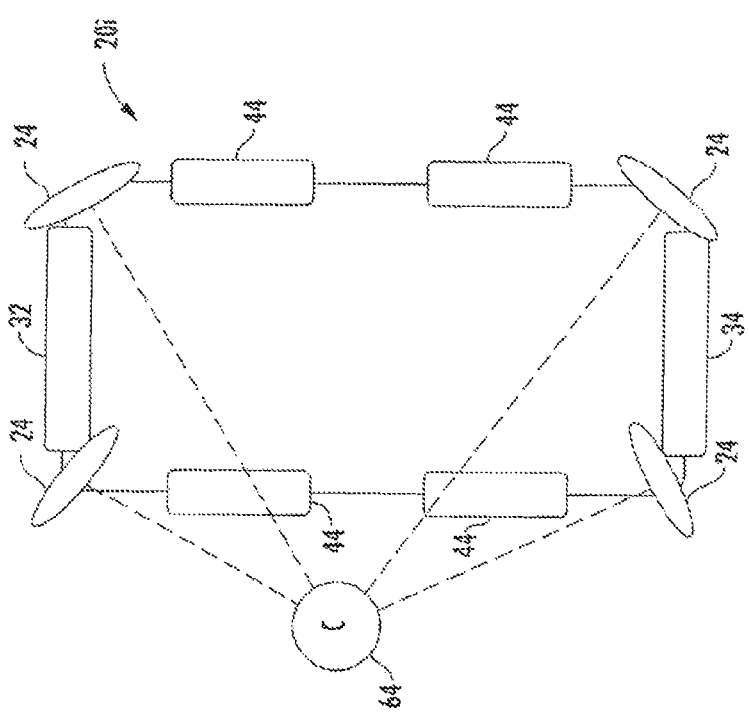

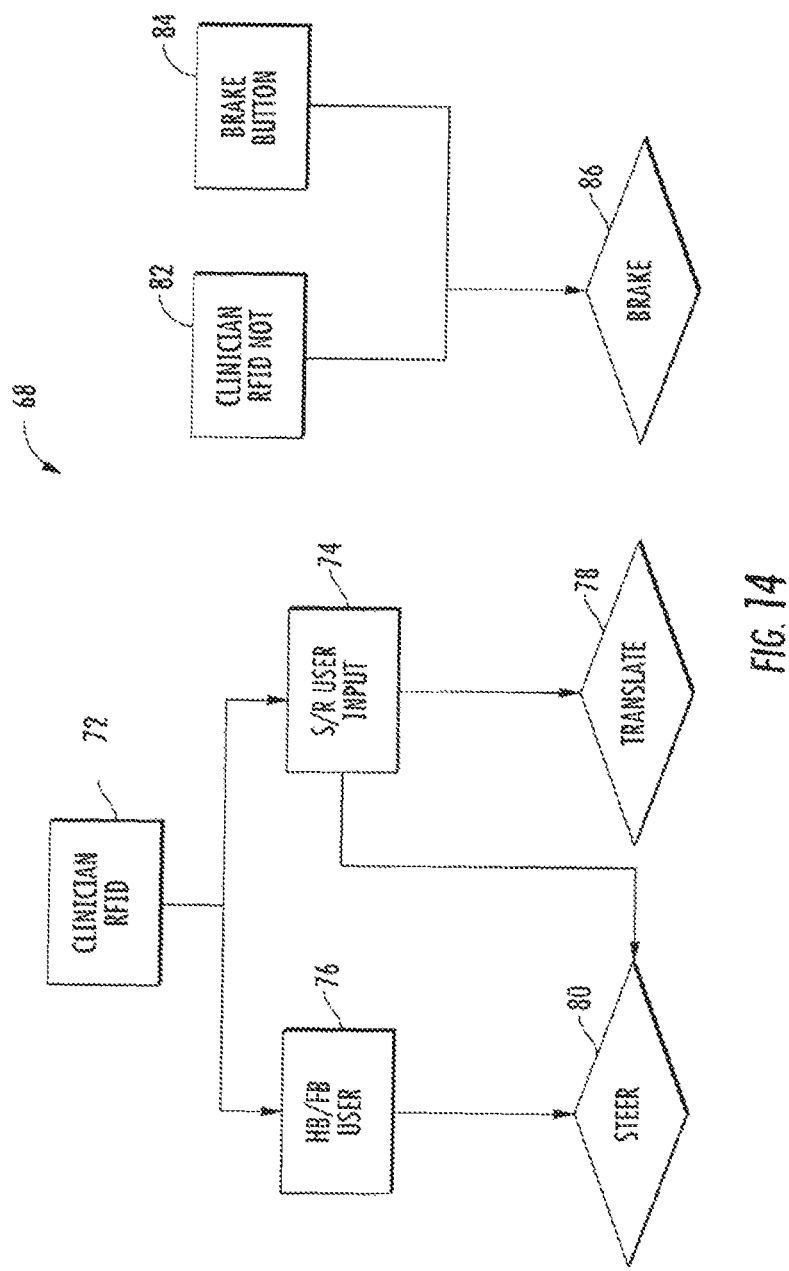

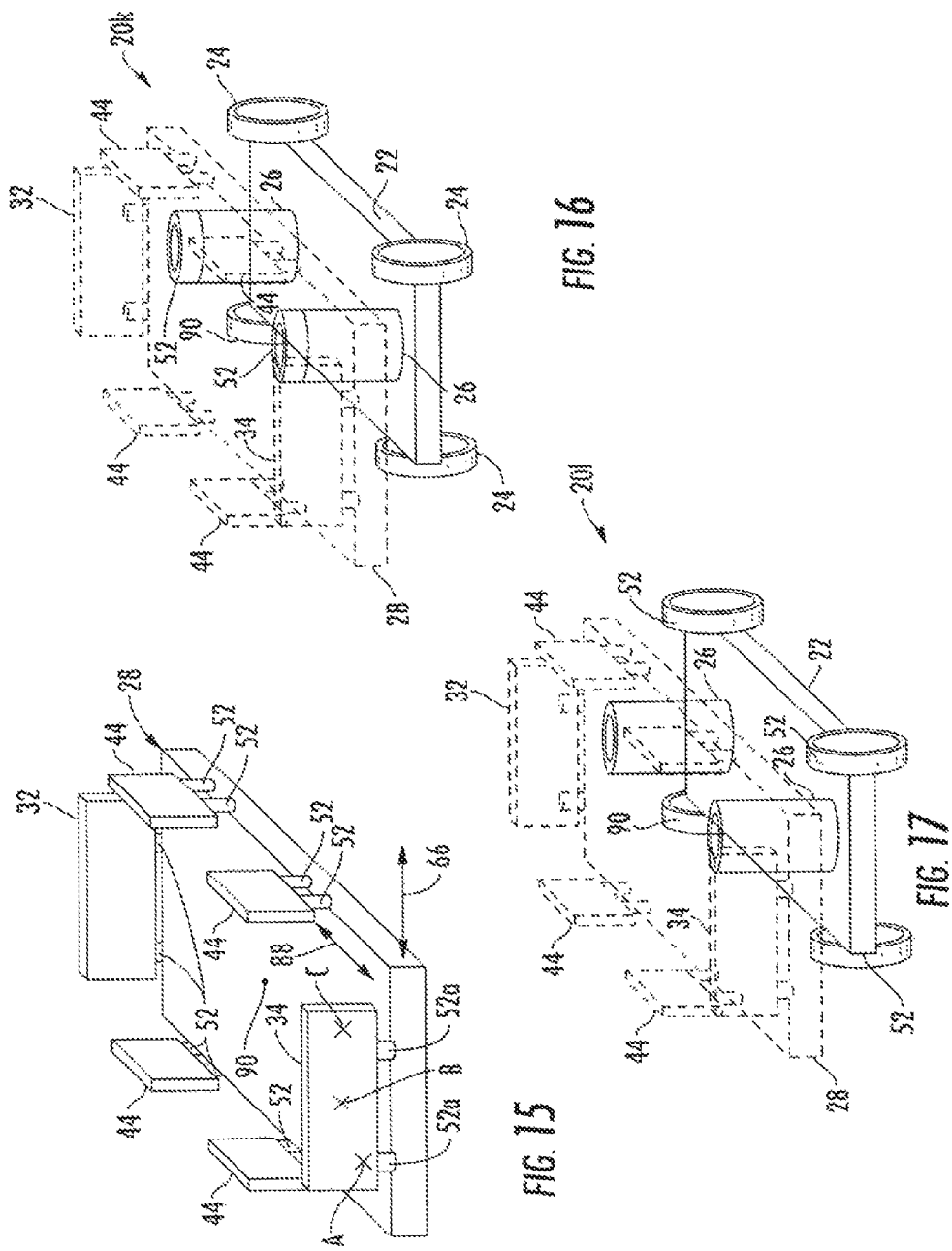

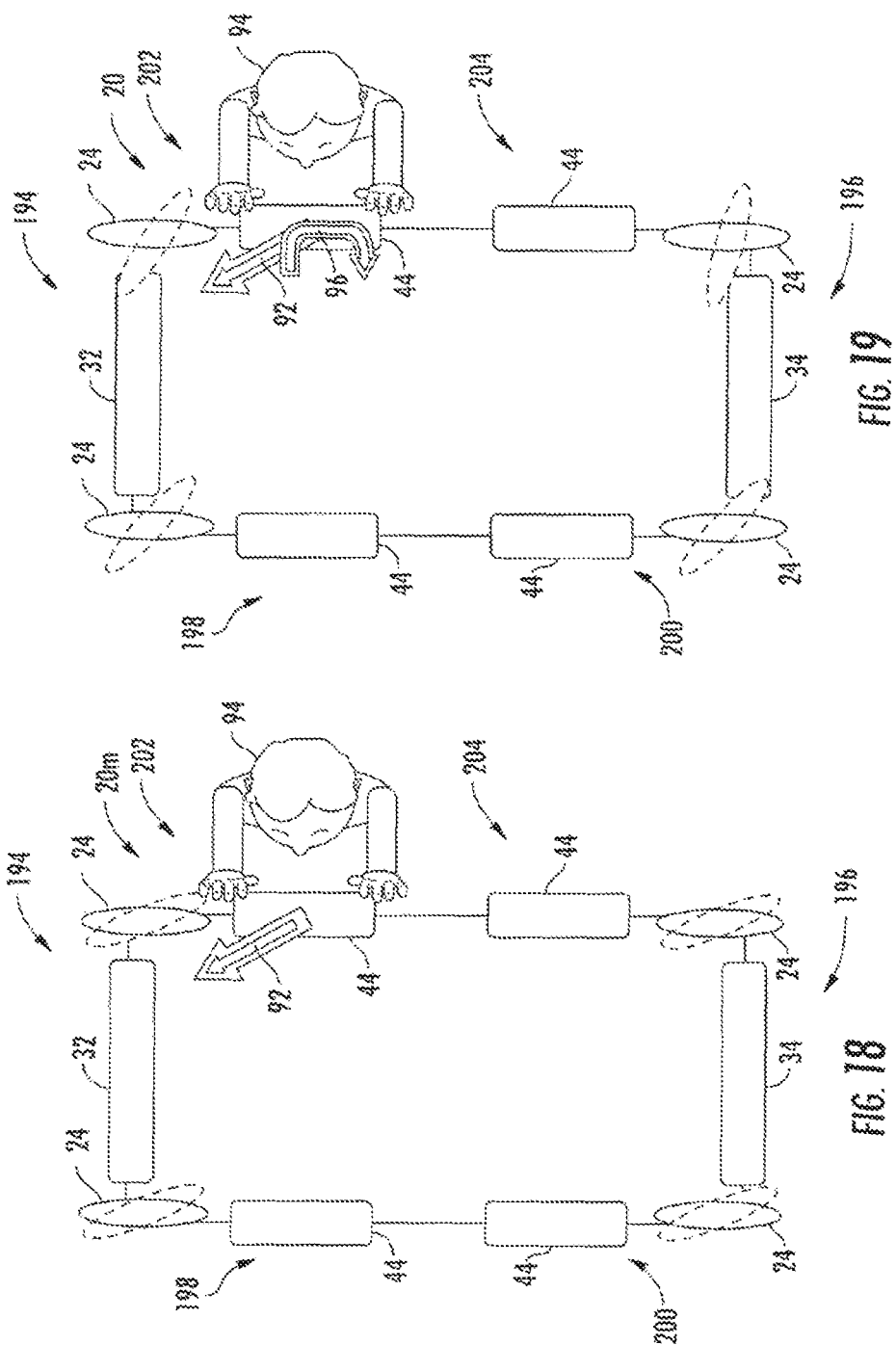

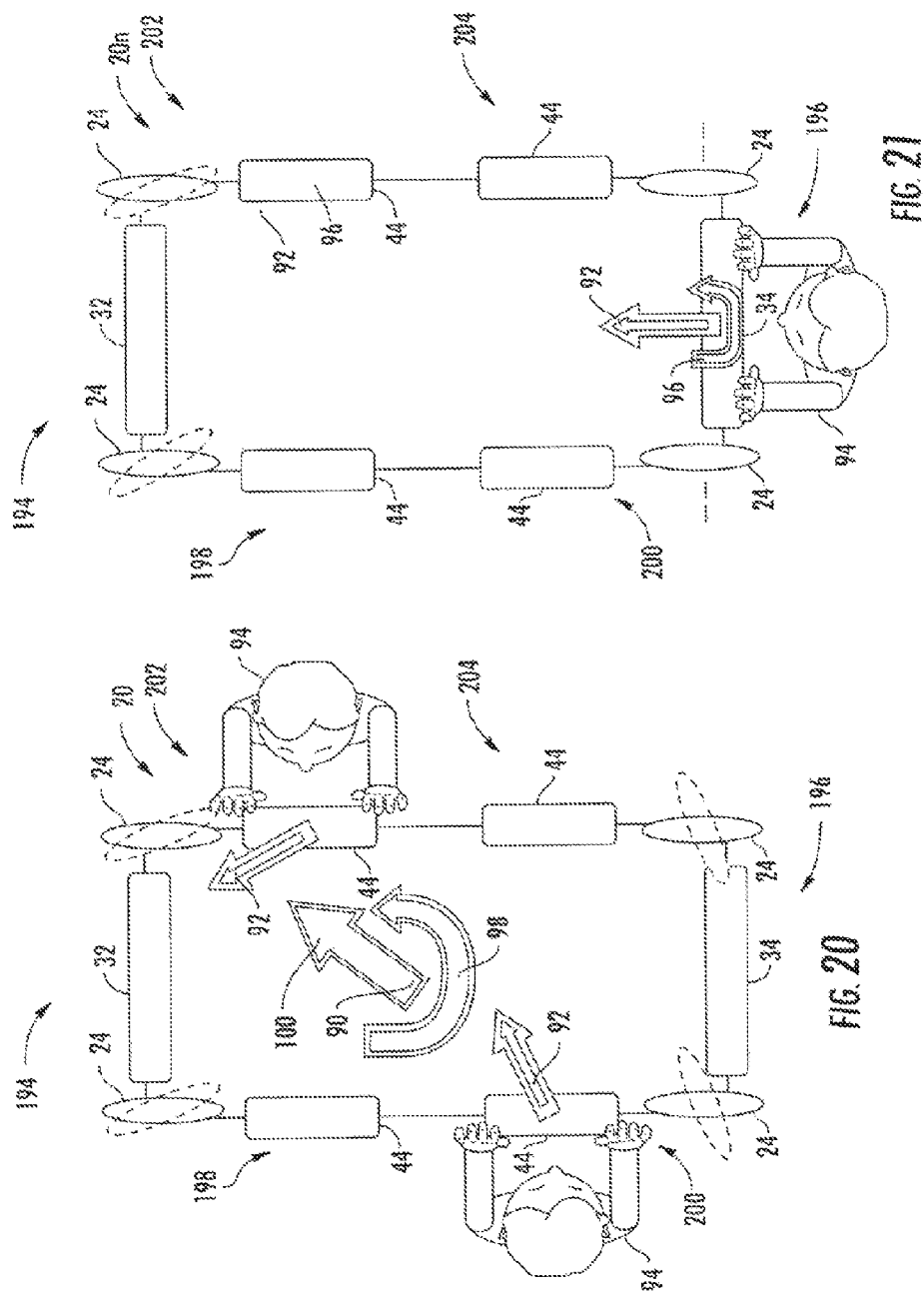

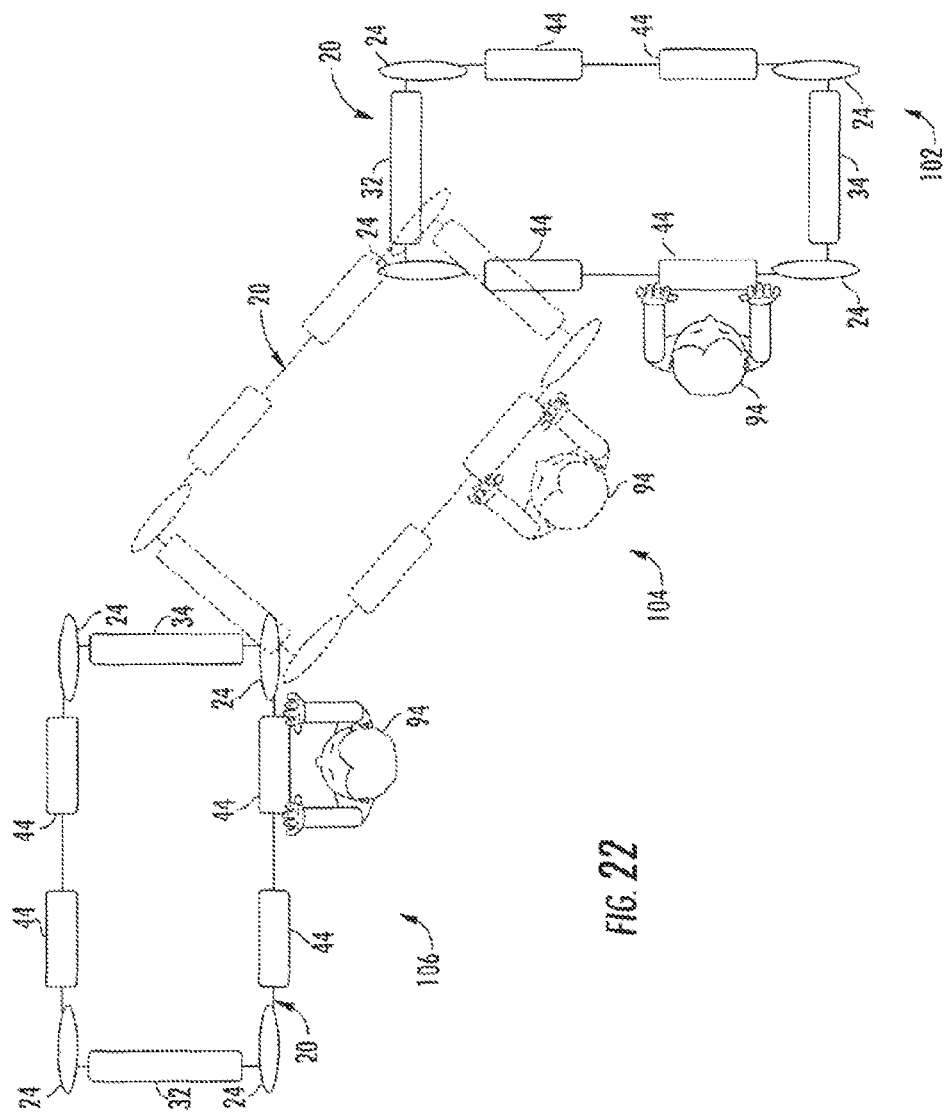

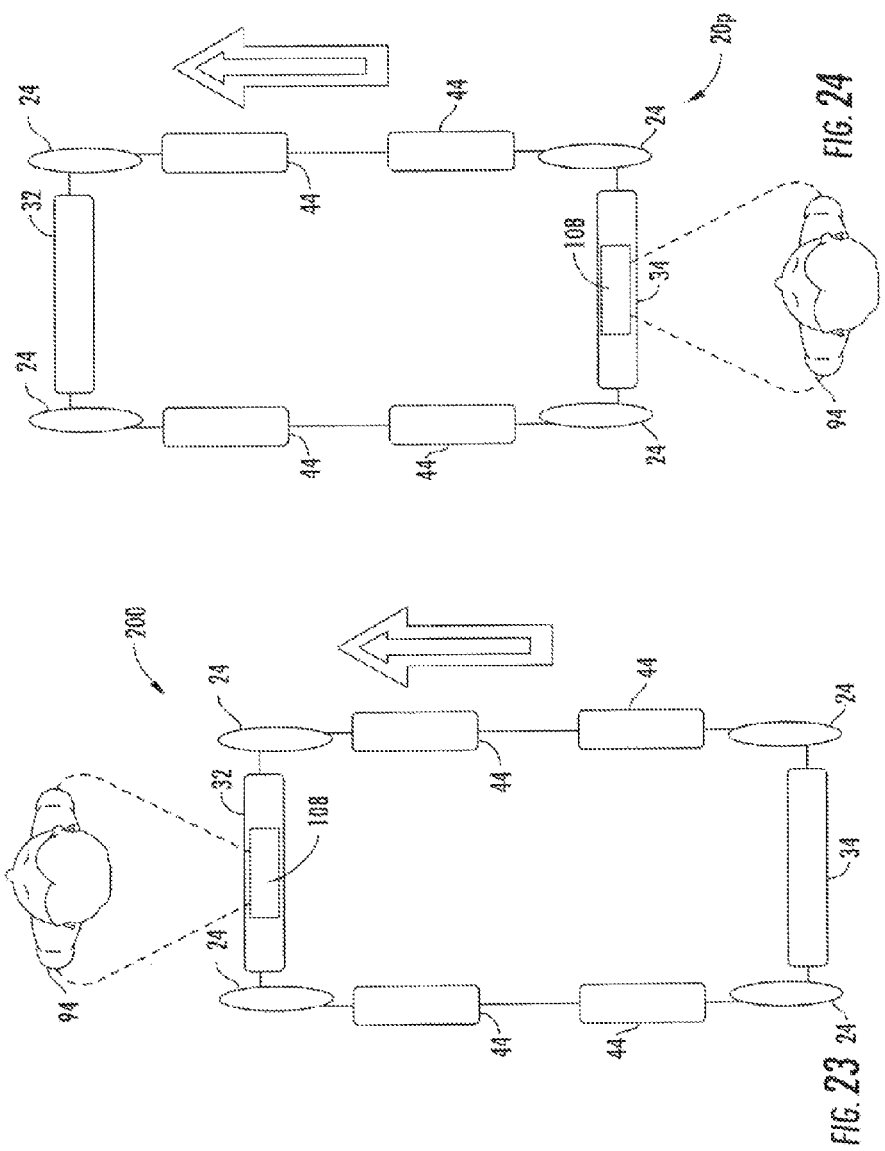

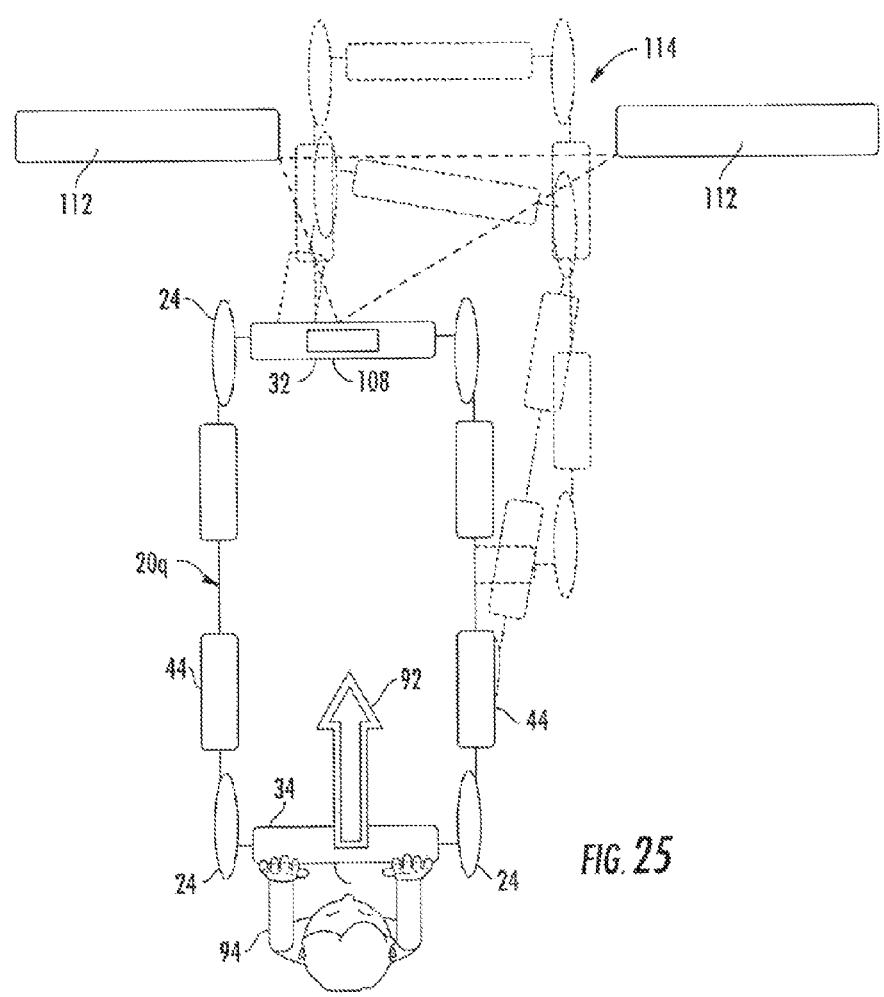

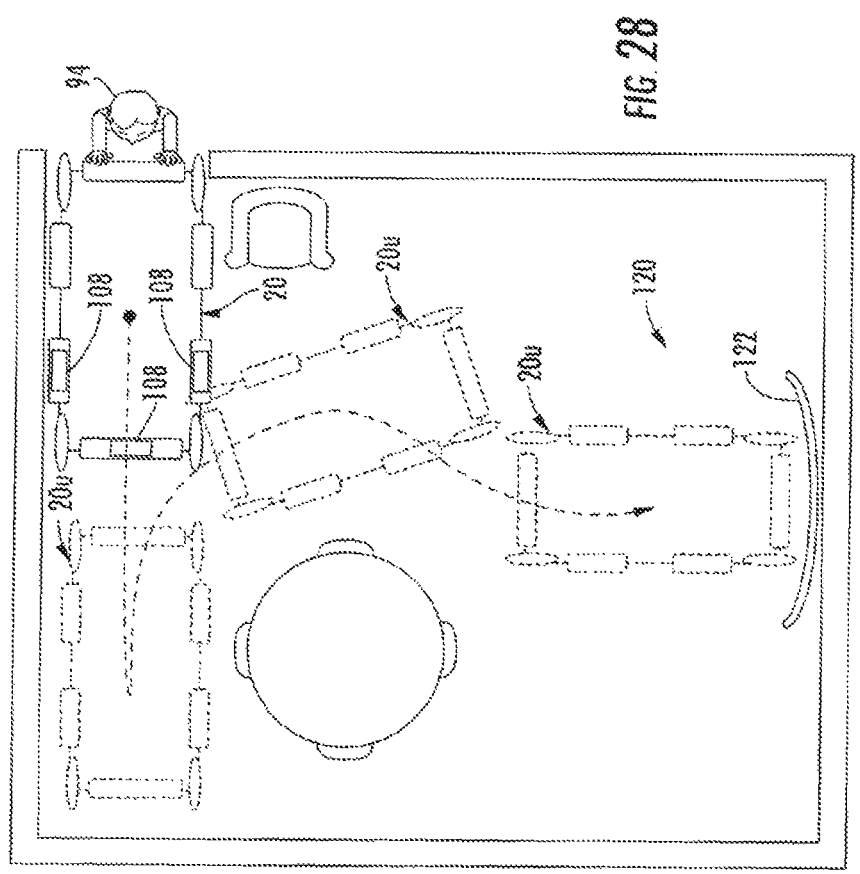

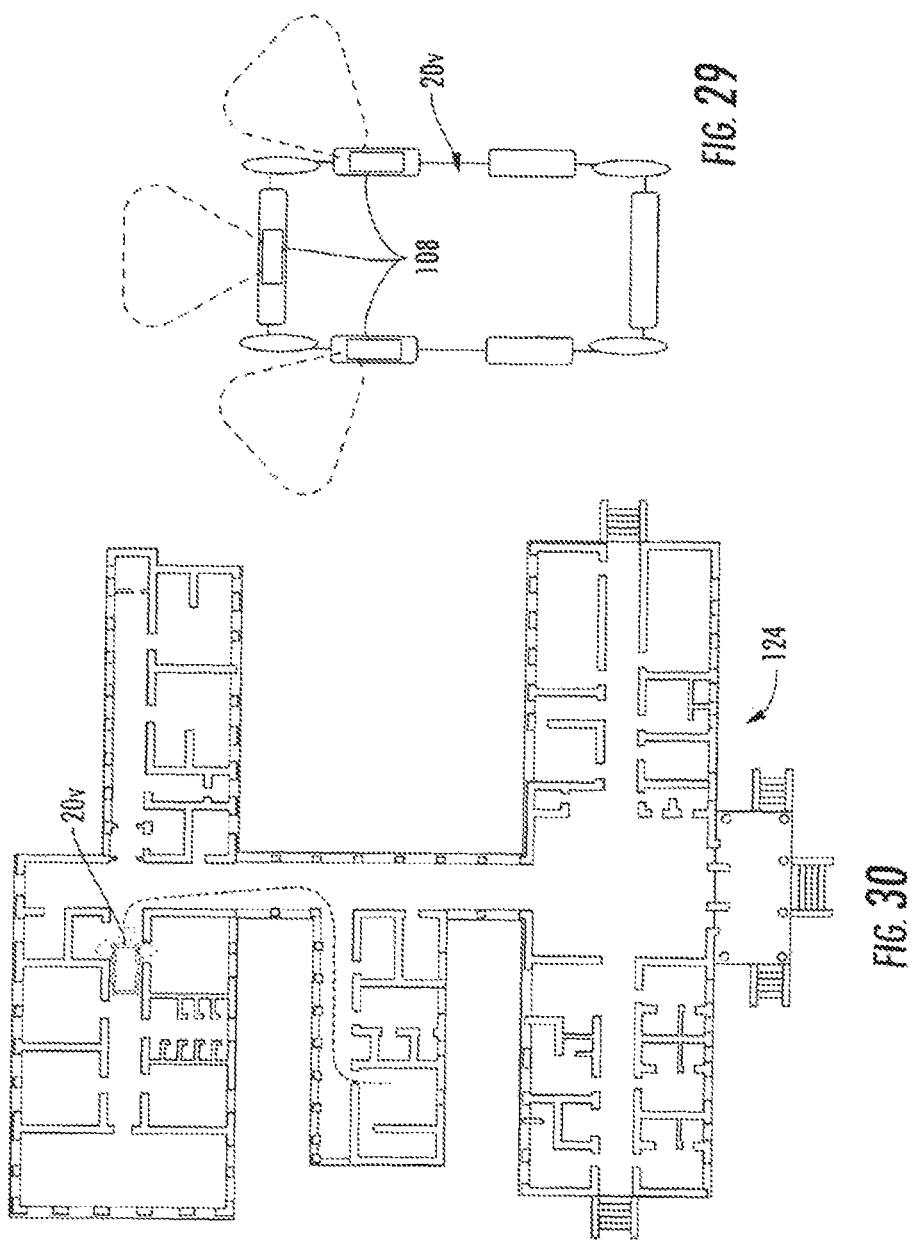

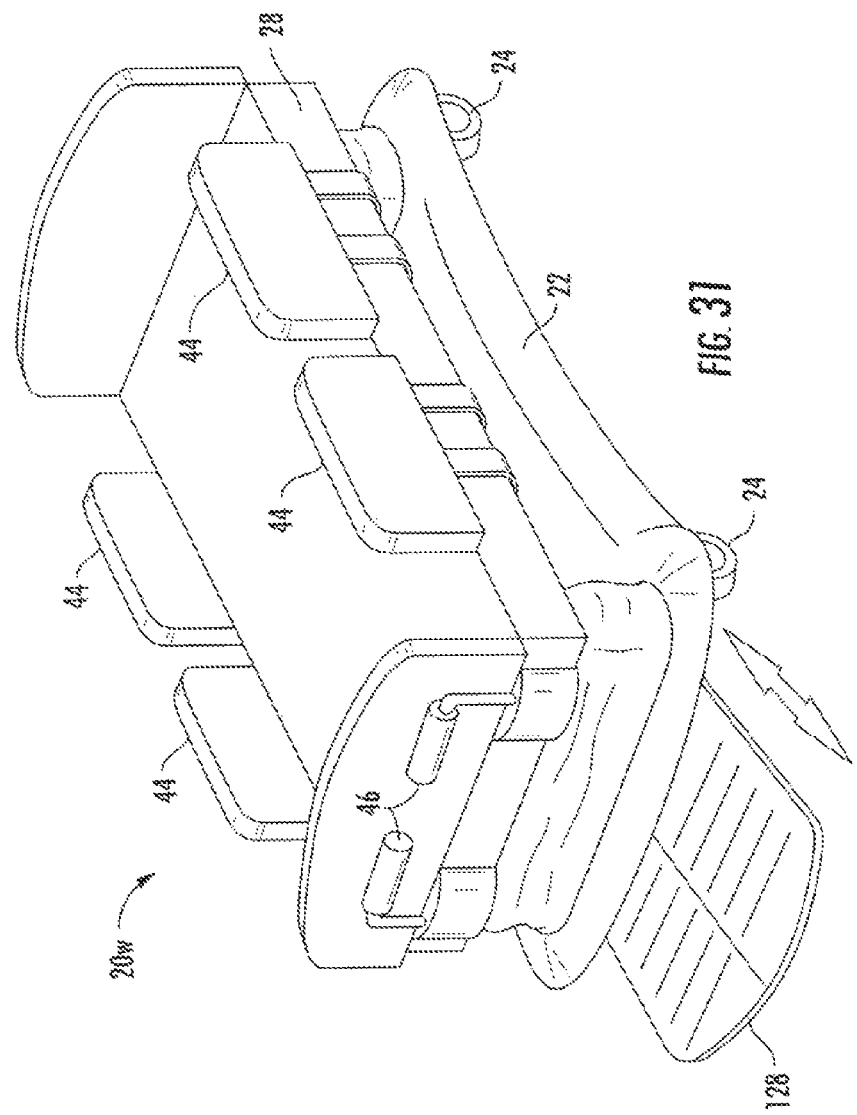

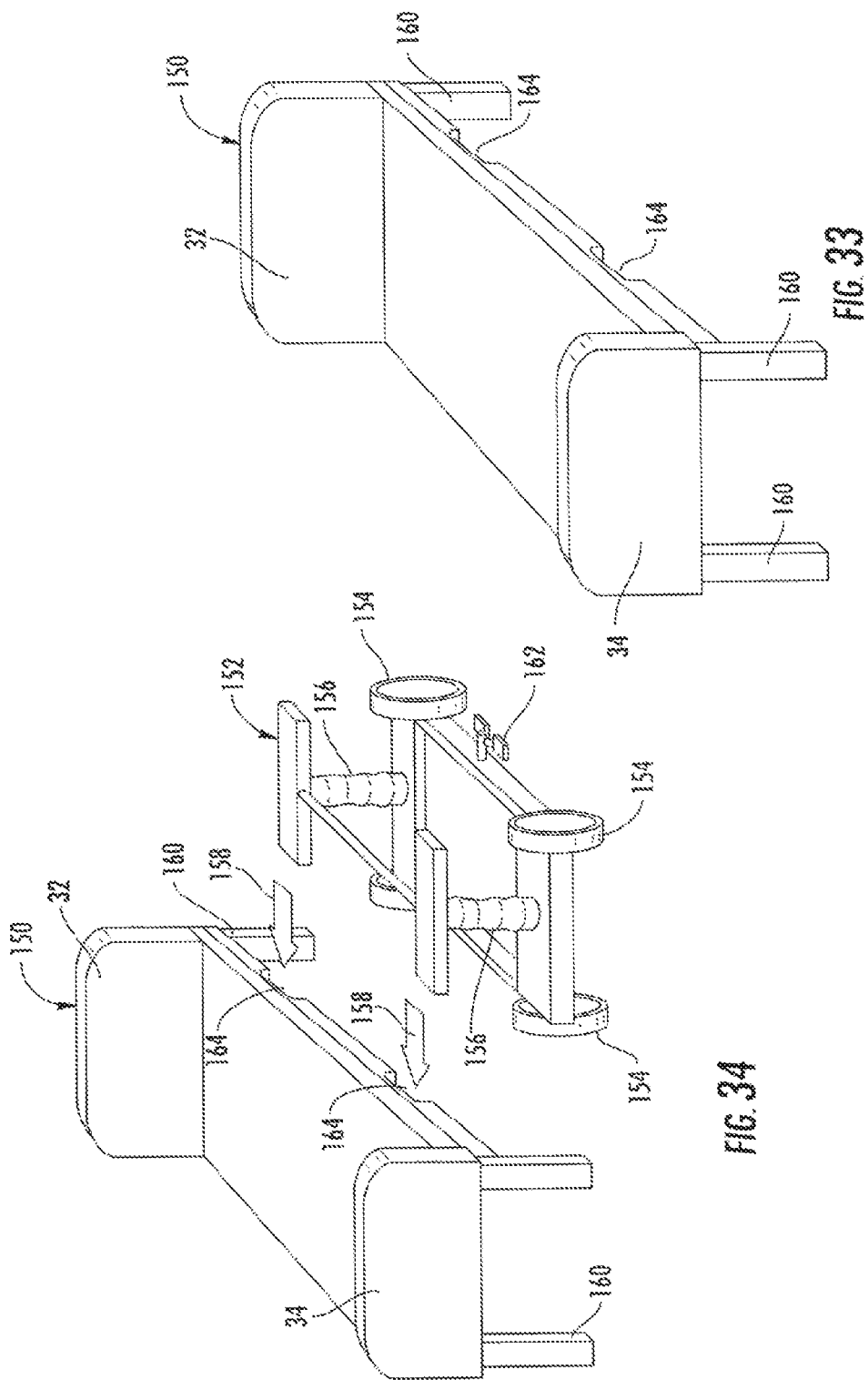

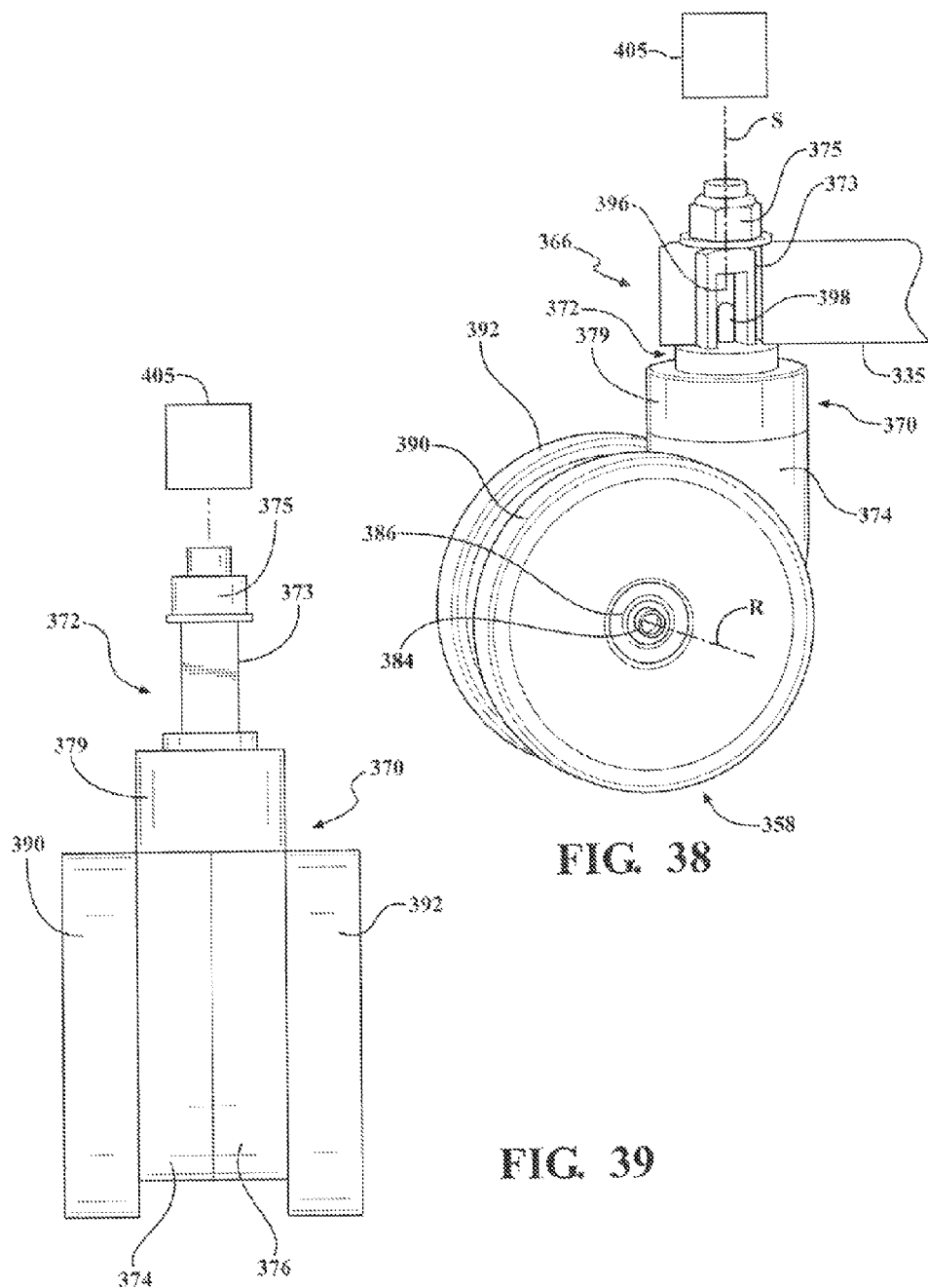

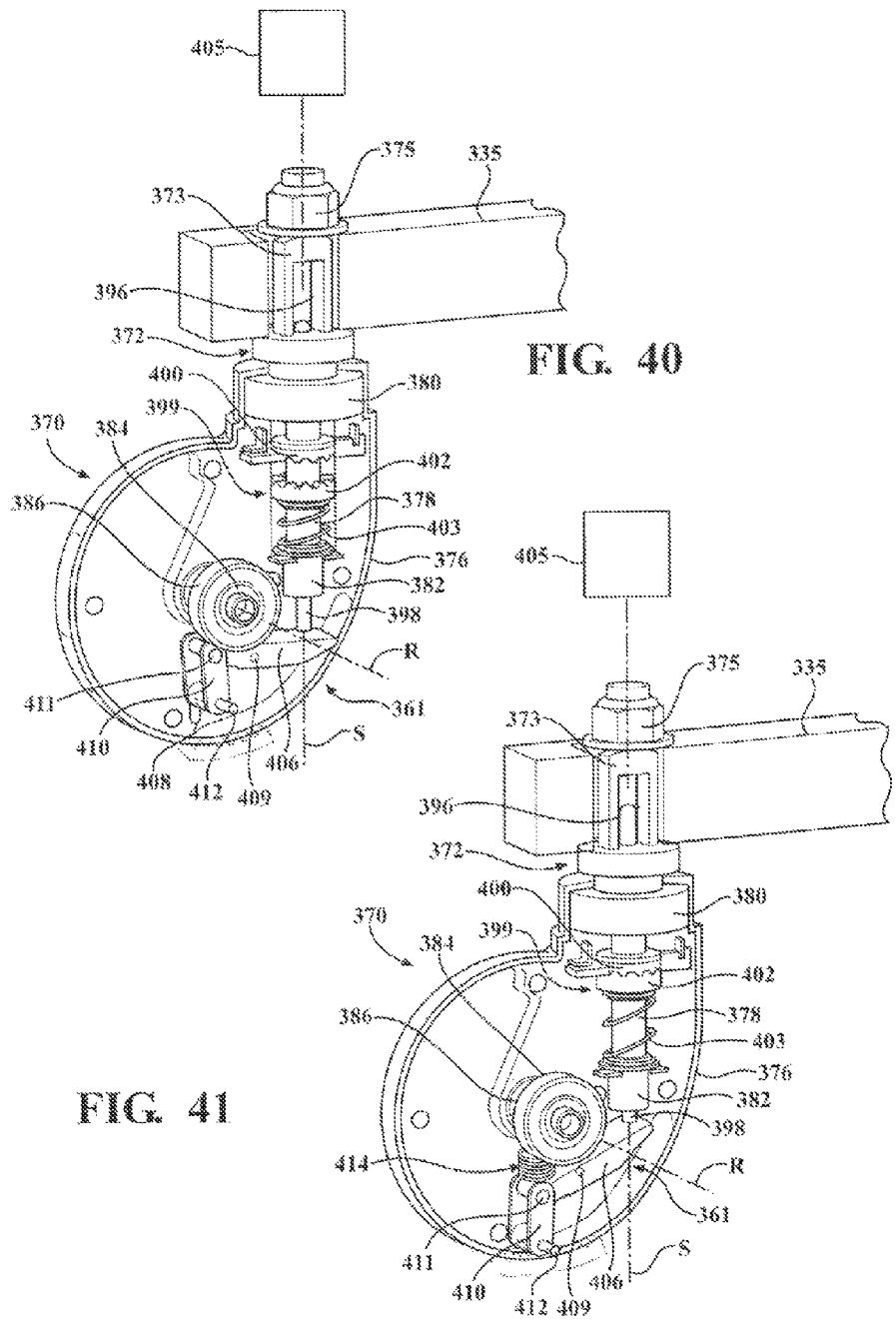

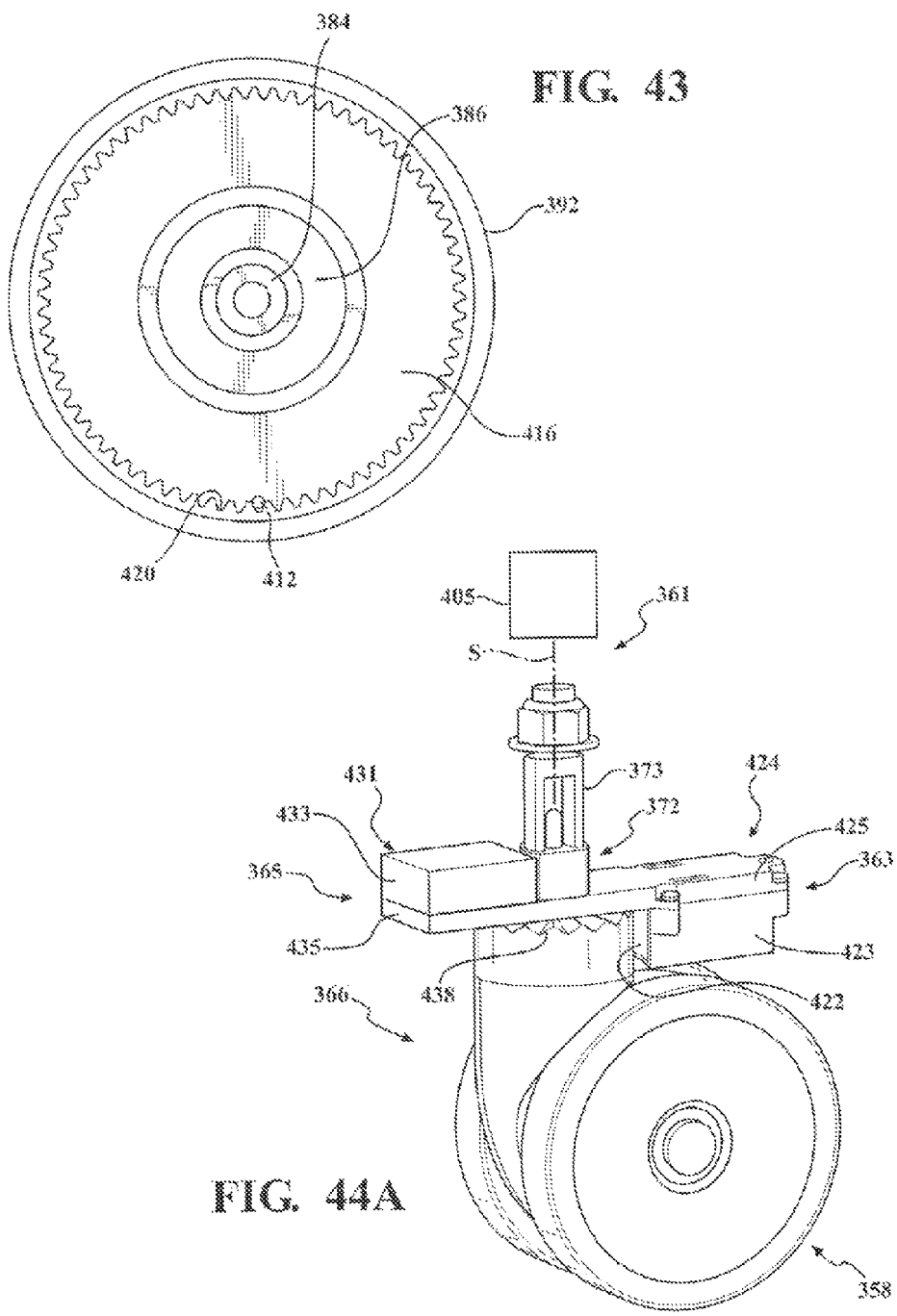

PATIENT SUPPORT APPARATUS

CROSS-REFERENCE TO RELATED APPLICATIONS

This application is a continuation-in-part of U.S. patent application Ser. No. 13/795,193 filed Mar. 12, 2013, which claims priority to U.S. provisional patent application No. 61/702,316 filed Sep. 18, 2012 by applicants Donna-Marie Robertson et al. and entitled POWERED PATIENT SUPPORT APPARATUS, the complete disclosures of both of these applications being hereby incorporated herein by reference. This application also claims priority to U.S. provisional patent application No. 62/247,396 filed Oct. 28, 2015 entitled SYSTEMS AND METHODS FOR FACILITATING MOVEMENT OF A PATIENT TRANSPORT APPARATUS, the complete disclosure of which is hereby incorporated herein by reference.

BACKGROUND OF THE INVENTION

The present invention relates to patient support apparatuses—such as, but not limited to, beds, stretchers, cots, operating tables, and the like—and more particularly to patient support apparatuses that have at least one wheel to assist in the movement of the patient support apparatus over a floor.

Patient support apparatuses are used in hospitals, nursing homes, and other healthcare facilities for both supporting patients within a room or other location, as well as transporting patients between rooms and/or other locations. While most patient support apparatuses include one or more wheels that allow the support apparatus to be wheeled from the first location to the second location, the weight and bulk of the patient support apparatus—including the weight of the patient supported thereon, can make it difficult for a caregiver to manually wheel the support apparatus from one location to another. This can be especially difficult when there are inclines in the floors of the healthcare facility, or when there are long distances involved, or when the patient and/or the support apparatus are heavy. This difficulty can be further exacerbated when it is desirable to maneuver the patient support apparatus into, or through, areas with little excess clearance, such as in elevators, rooms, or corridors, or when turning the patient support apparatus around a corner, or steering it past obstacles.

In the past, powered patient support apparatuses have been provided that include a powered wheel that is driven by a motor positioned on the patient support apparatus. One such example is shown in U.S. Pat. No. 6,752,224 issued to Hopper et al. In prior powered support apparatuses, the powered wheel responds to controls issued by a caregiver. In some instances, the caregiver controls the powered wheel by one or more handles positioned at an end of the patient support apparatus. When the caregiver pushes forward on the handle, the powered wheel powers the support apparatus forward. Conversely, when the caregiver pulls back on the handle, the powered wheel brakes or moves backward. A load cell, a potentiometer, or some other type of sensor may be used to sense the forward/backward pushing of the caregiver.

Despite the assistance of the powered wheel, prior art powered patient support apparatuses can still be difficult to use, and/or suffer from other disadvantages.

SUMMARY OF THE INVENTION

A patient support apparatus is provided in one embodiment. The patient support apparatus comprises a base and non-driven wheels coupled to the base. A patient support deck is supported by the base to support a patient. At least one motor is adapted to change an orientation of the non-driven wheels. A controller is adapted to determine a direction of desired movement of the patient support apparatus based on information received from a user input. The controller is further adapted to command the at least one motor to change the orientation of the non-driven wheels based on the direction of desired movement of the patient support apparatus.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 7 is a plan view diagram of a third wheel configuration that may be incorporated into any of the patient support apparatus embodiments described herein;

FIG. 8 is a plan view diagram of a fourth wheel configuration that may be incorporated into any of the patient support apparatus embodiments described herein;

FIG. 12 is a plan view diagram of a wheel configuration illustrating some wheels being steered in opposite directions to other wheels, and which may be incorporated into any of the patient support apparatus embodiments described herein;

FIG. 13 is plan view diagram of a wheel configuration illustrating an Ackermann steering configuration which may be incorporated into any of the patient support apparatus embodiments described herein;

FIG. 14 is a flow diagram of control logic that may be followed by a controller incorporated into any of the patient support apparatus embodiments described herein;

FIG. 15 is a perspective view diagram of a patient support apparatus litter illustrating force sensors that may be located at the junction of the litter and any one or more of a footboard, a headboard, and/or one or more side rails, and which may be incorporated into any of the patient support apparatus embodiments described herein;

FIG. 16 is a perspective view diagram of a patient support apparatus illustrating force sensors that may be located at the junction of the litter and one or more height adjustment mechanisms for raising and lowering the litter, and which may be incorporated into any of the patient support apparatus embodiments described herein;

FIG. 17 is a perspective view diagram of a patient support apparatus illustrating force sensors that may be located at the junction of the wheels and wheel mounts, and which may be incorporated into any of the patient support apparatus embodiments described herein;

FIG. 18 is a plan view diagram of a patient support apparatus embodiment illustrating pure translation motion that may be implemented by a caregiver pushing on a side rail;

FIG. 19 is a plan view diagram of a patient support apparatus embodiment illustrating translation and rotational motion that may be implemented by a caregiver pushing and/or pulling with different forces on the ends of a side rail;

FIG. 20 is a plan view diagram of a patient support apparatus embodiment illustrating translation and rotational motion that may be implemented by multiple caregivers simultaneously pushing and/or pulling on different side rails;

FIG. 21 is a plan view diagram of a patient support apparatus embodiment illustrating Ackermann steering that may be implemented by a caregiver pushing and/or pulling on a control at an end of the patient support apparatus;

FIG. 22 is a plan view diagram of a caregiver controlling movement of a patient support apparatus embodiment via a side rail of the patient support apparatus;

FIG. 23 is a plan view diagram of a patient support apparatus embodiment having one or more sensors allowing the patient support apparatus to automatically follow a walking caregiver positioned in front of the support apparatus;

FIG. 24 is a plan view diagram of a patient support apparatus embodiment having one or more sensors allowing the patient support apparatus to automatically stay in front of a walking caregiver;

FIG. 25 is a plan view diagram of a patient support apparatus embodiment having one or more sensors allowing the patient support apparatus to automatically assist in steering so as to avoid obstacles;

FIG. 28 is a plan view diagram of a patient support apparatus illustrating an auto-docking feature that may be incorporated into any of the patient support apparatus embodiments discussed herein;

FIG. 29 is a plan view diagram of a patient support apparatus embodiment incorporating a plurality of sensors that enable the patient support apparatus to automatically navigate without the need for human steering;

FIG. 30 is a plan view diagram of an arbitrary healthcare facility floor plan illustrating an example of automatic movement of the patient support apparatus of FIG. 29;

FIG. 31 is a perspective view of a patient support apparatus embodiment having a retractable and extendible platform for a caregiver to ride on;

FIG. 33 is a perspective view of a patient support apparatus having no built-in movement-across-the-floor capabilities;

FIG. 34 is a perspective view of the patient support apparatus of FIG. 33 showing a mobile base that may be coupled to the support apparatus to allow the support apparatus to be moved and steered in a powered manner over the floor;

FIG. 38 is a perspective view of a caster assembly without the steer-lock mechanism or the pre-swivel mechanism;

FIG. 39 is an elevational front view of the caster assembly;

FIG. 40 is a partial perspective view of the caster assembly showing an interior of the caster assembly with the brake mechanism in an unbraked mode and with wheel parts removed;

FIG. 41 is a partial perspective view of the caster assembly showing an interior of the caster assembly with the brake mechanism in a braked mode and with the wheel parts removed;

FIG. 43 is an elevational view of an inner surface of a wheel part of the caster assembly of FIG. 38;

FIG. 44A is a perspective view of the caster assembly with the steer-lock mechanism and the pre-swivel mechanism;

DETAILED DESCRIPTION OF THE EMBODIMENTS

Figure 1:
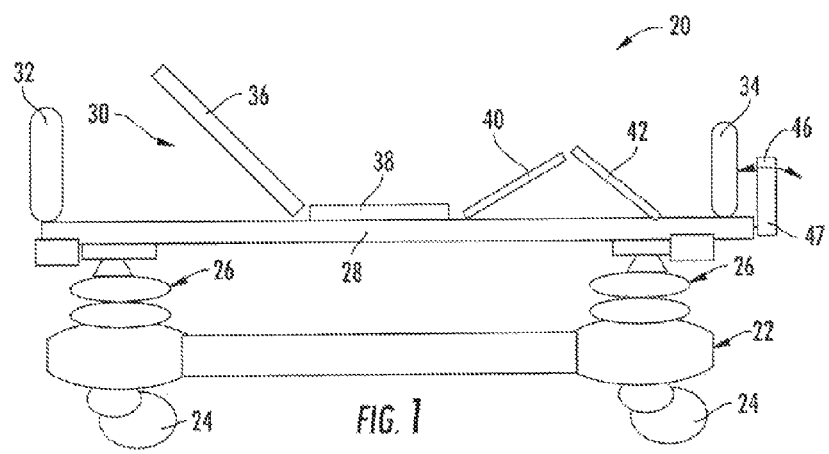
FIG. 1 is a side, elevational view of a patient support apparatus that may incorporate one or more aspects of the present invention.

A patient support apparatus 20 according to one embodiment is shown in FIG. 1. While the particular form of patient support apparatus 20 illustrated in FIG. 1 is a bed, it will be understood that patient support apparatus 20 could, in different embodiments, be a cot, a stretcher, a gurney, or any other structure capable of supporting a patient while being transported from one place to another.

In general, patient support apparatus 20 includes a base 22 having a plurality of wheels 24, a pair of elevation adjustment mechanisms 26 supported on said base, a frame or litter 28 supported on said elevation adjustment mechanisms, and a patient support deck 30 supported on said frame. Patient support apparatus 20 further includes a headboard 32 and a footboard 34.

Base 22 includes a brake that is adapted to selectively lock and unlock wheels 24 so that, when unlocked, patient support apparatus 20 may be wheeled to different locations. Elevation adjustment mechanisms 26 are adapted to raise and lower frame 28 with respect to base 22. Elevation adjustment mechanisms 26 may be hydraulic actuators, electric actuators, or any other suitable device for raising and lowering frame 28 with respect to base 22. In some embodiments, elevation adjustment mechanisms 26 are operable independently so that the orientation of frame 28 with respect to base 22 can also be adjusted.

Frame 28 provides a structure for supporting patient support deck 30, headboard 32, and footboard 34. Patient support deck 30 is adapted to provide a surface on which a mattress (not shown), or other soft cushion is positionable so that a patient may lie and/or sit thereon. Patient support deck 30 is made of a plurality of sections, some of which are pivotable about generally horizontal pivot axes. In the embodiment shown in FIG. 1, patient support deck 30 includes a head section 36, a seat section 38, a thigh section 40, and a foot section 42. Head section 36, which is also sometimes referred to as a Fowler section, is pivotable between a generally horizontal orientation (not shown in FIG. 1) and a plurality of raised positions (one of which is shown in FIG. 1). Thigh section 40 and foot section 42 may also be pivotable, such as is shown in FIG. 1.

A plurality of side rails 44 (FIGS. 15-17) may also be coupled to frame 28. If patient support apparatus 20 is a bed, there may be four such side rails, one positioned at a left head end of frame 28, a second positioned at a left foot end of frame 28, a third positioned at a right head end of frame 28, and a fourth positioned at a right foot end of frame 28. If patient support apparatus 20 is a stretcher or a cot, there may be fewer side rails. In other embodiments, there may be no side rails on patient support apparatus 20. Regardless of the number of side rails, such side rails are movable between a raised position in which they block ingress and egress into and out of patient support apparatus 20, and a lowered position in which they are not an obstacle to such ingress and egress.

The construction of any of base 22, elevation adjustment mechanisms 26, frame 28, patient support deck 30, headboard 32, footboard 34, and/or side rails 44 may take on any known or conventional design, such as, for example, that disclosed in commonly assigned, U.S. Pat. No. 7,690,059 issued to Lemire et al., and entitled HOSPITAL BED, the complete disclosure of which is incorporated herein by reference; or that disclosed in commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosure of which is also hereby incorporated herein by reference. The construction of any of base 22, elevation adjustment mechanisms 26, frame 28, patient support deck 30, headboard 32, footboard 34 and/or the side rails may also take on forms different from what is disclosed in the aforementioned patent and patent publication.

Patient support apparatus 20 further includes one or more handles 46 (FIG. 1) that are adapted to allow a caregiver to control powered movement of patient support apparatus 20. Handles 46 are pivotable about a generally horizontal pivot axis 47 such that a user can pivot them forwardly with a forward force and pivot them backwardly with a rearward force. This pivoting is detected by one or more potentiometers, or other sensors, and used to control the powered movement of patient support apparatus 20, as will be discussed in greater detail below. In some embodiments, handles 46 are located on or adjacent footboard 34, while in other embodiments handles 46 are located on or adjacent headboard 32.

For purposes of the description provided herein, powered movement of support apparatus 20 refers to movement of apparatus 20 in which one or more motors, or other powered devices, supply at least some of the force needed for steering and/or moving apparatus 20 over the floor. Powered movement of patient support apparatus 20 therefore reduces the amount of force a caregiver needs to exert to move the apparatus 20 from one location to another, thereby alleviating the work effort a caregiver needs to expend during patient transport. In one aspect, patient support apparatus 20 differs from prior powered patient support apparatuses in that it provides powered steering in addition to, and/or in lieu of, powered movement. The provision of powered steering further reduces the workload on a caregiver when moving apparatus 20.

In some embodiments, patient support apparatus 20 includes multiple handles 46 positioned on or adjacent footboard 34 and/or on or adjacent headboard 32. When multiple handles 46 are included, the powered steering of patient support apparatus 20 is implemented by analyzing the different amounts of force exerted by a caregiver on the multiple handles 46 and controlling the powered steering accordingly. For example, if a caregiver's left hand pushes strongly forward on a left handle 46, while a caregiver's right hand simultaneously pushes forward with a lesser force on a right handle 46, the patient support apparatus will automatically turn one or more of the wheels 24 toward the right because the caregiver's pushing forces suggest the caregiver wants to turn the support apparatus toward the right. That is, the patient support apparatus 20 steers the support apparatus generally in the same manner that it would normally turn in response to the caregiver's forces in the absence of any powered steering and/or powered movement. However, because of the inclusion of the powered movement and steering features, the amount of force required to be exerted by the caregiver to achieve the desired movement is lessened.

As will be discussed in greater detail below, the force sensors that are coupled to handles 46 may include any one or more of load sensors, potentiometers, strain gauges, capacitive sensors, piezoresistive or piezoelectric sensors, or any other types of sensors that are capable of detecting forces exerted by a caregiver. In many of the embodiments, the force sensors will be configured to detect forces exerted in two mutually orthogonal generally horizontal directions. That is, for example, the force sensors will be configured to detect exerted forces that have a component parallel to the longitudinal extent of apparatus 20 (head to foot end), as well as forces that have a component parallel to the lateral extent of the apparatus 20 (side to side). In this manner, the movement of patient support apparatus 20 can be coordinated to match or align with not only the forward to backward forces exerted on the patient support apparatus, but also horizontal forces that are transverse or oblique to the forward-backward axis of the patient support apparatus 20.

Figure 2:
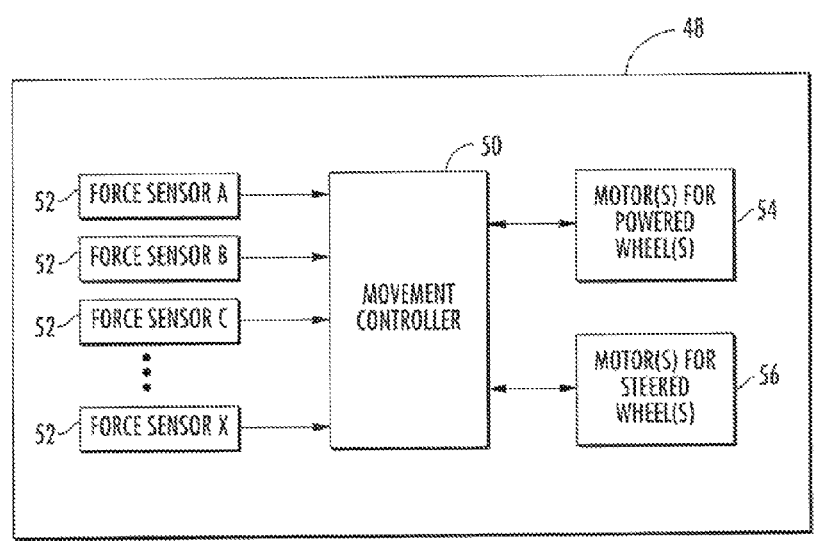
FIG. 2 is a diagram of a first example of a control system for any of the patient support apparatus embodiments of the invention.

FIG. 2 illustrates in diagrammatic format one embodiment of a control system 48 that is usable with any of the patient support apparatus embodiments discussed herein. Control system 48 includes a movement controller 50, a plurality of force sensors 52, one or more powered wheel motors 54, and one or more steered wheel motors 56. Movement controller 50 can take on a variety of different forms, including one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. In general, movement controller 50 coordinates both the steering and powering of one or more wheels 24 based upon information received from one or more force sensors 52, or from one or more other user inputs. More specifically, movement controller 50 receives electrical signals from the one or more force sensors 52, analyzes those signals, and outputs one or more commands to motors 54 and 56 that cause the motors to operate in a manner that helps to move patient support apparatus 20 in the direction desired by the caregiver.

As was noted above, force sensors 52 may include load cells, potentiometers, strain gauges, capacitive, piezoresistive or piezoelectric sensors, or any other types of sensing structures that are capable of detecting forces exerted by a caregiver thereon. Typically such force sensors 52 are arranged or configured so as to detect any and all force components that are exerted in generally any horizontal orientation, or that have any horizontal components to them. More specifically, force sensors 52 are arranged to detect forces that are generally parallel to the horizontal plane defined by frame 28 of patient support apparatus 20, or the horizontal plane defined by wheels 24 of patient support apparatus 20 (which may not be parallel to a true horizontal plane if the support apparatus 20 is positioned on an incline or decline, or other uneven ground). That is, force sensors 52 are able to detect forces in both a lateral direction 66 and a longitudinal direction 88 (FIG. 15). Force components that are vertically oriented with respect to either of these planes may, in general, be ignored or not sensed by force sensors 52, or used for other purposes besides controlling the movement of support apparatus 20 over the floor.

Force sensors 52 are able to not only detect the magnitude of forces applied, but also the direction(s) of those forces. And it will be understood by those skilled in the art, the reference to "direction" of forces herein will typically mean more than merely determining whether a force was applied in a forward or backward direction. Rather, force sensors 52 are capable of determining the direction of applied force in generally all horizontal, or approximately horizontal, directions. That is, force sensors 52 can detect any angular orientation, from zero to three-hundred and sixty degrees, about a generally vertical axis, allowing the support apparatus 20 greater movement flexibility in that it can be guided in more than just forward-reverse directions, but also many other directions as well.

Movement controller 50 is programmed, or otherwise configured, to control powered wheel motors 54 and steered wheel motors 56 such that the wheels move in a manner based upon both the direction and magnitude of forces exerted by a caregiver on the patient support apparatus 20, as detected by force sensors 52. That is, movement controller generally steers the wheels to either match the direction of the force or forces exerted by a caregiver on force sensors 52, or rotates the support apparatus 20 in a manner that corresponds to the torque on support apparatus 20 that is created by the location of the applied force. Movement controller also powers the powered wheels in a manner that is at least somewhat related to the magnitude of the detected force or forces. The relationship between the magnitude of power supplied to the wheels and the magnitude of the detected forces may, in some embodiments, be a direct relationship, but also may be more nuanced than a simple direct relationship. For example, in some embodiments, movement controller 50 supplies power to the powered wheels in increments, rather than a continuous fashion. In still other embodiments, where multiple force sensors 52 are detecting forces, the magnitudes of the detected forces is used in determining steering, and the power supplied to the wheels is completely or partially independent from the force magnitudes. For example, in some embodiments, if two forces are applied to two different sensors 52 with different magnitudes (or with different directions), the different magnitudes are interpreted by movement controller 50 to be indicating that the caregiver wants to turn the patient support apparatus. In such cases, the detected force magnitudes influence steering commands issued by movement controller 50 more so, or as much as, the speed commands or power commands issued by movement controller 50 to powered wheel motor(s) 54.

Figure 3:
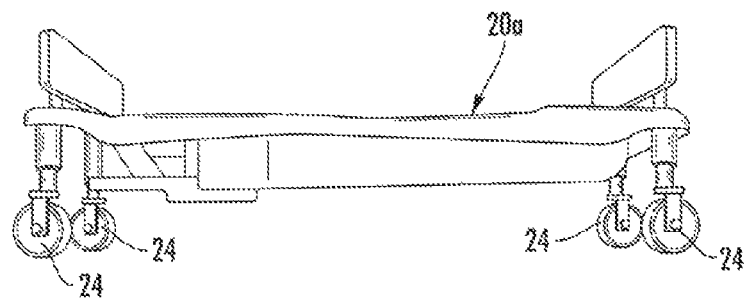
FIG. 3 is side, elevational view of another patient support apparatus incorporating aspects of the present invention.
Figure 4:
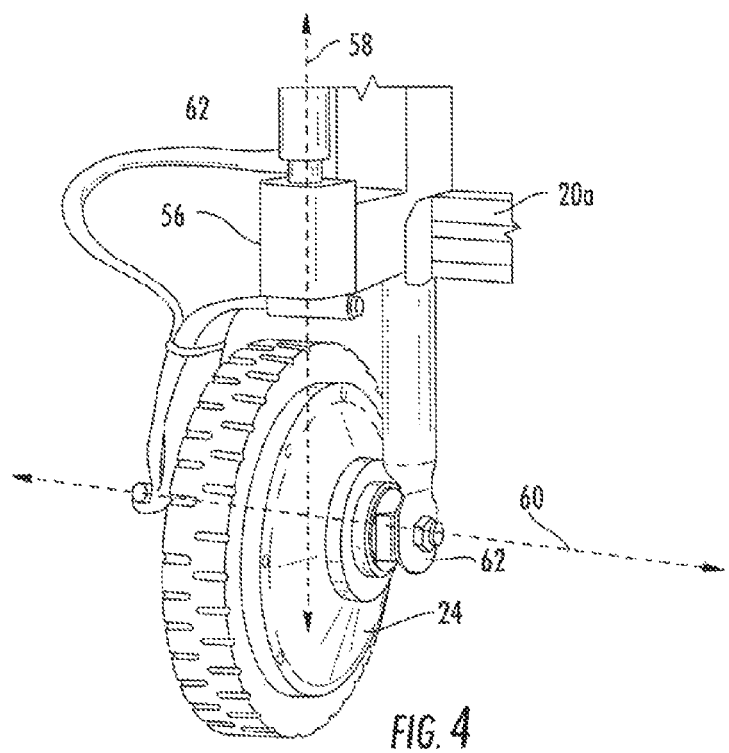
FIG. 4 is a close-up view of one of the wheels of the support apparatus of FIG. 3.

FIGS. 3 and 4 illustrate an example of a patient support apparatus 20a having different motors used for steering and for moving the apparatus 20a. As shown in FIG. 3, patient support apparatus 20a includes four wheels 24, which are each generally positioned adjacent the four corners of apparatus 20a. In this embodiment, each wheel 24 is both steerable and powered. FIG. 4 illustrates a close-up view of one of the wheels 24 of FIG. 3. As can be seen, apparatus 20a includes a steering motor 56 positioned generally above its corresponding wheel 24. Steering motor 56 is configured to rotate wheel 24 about a generally vertical axis 58 based upon commands received from movement controller 50. Wheel 24 of FIG. 4 further includes a power motor 54 that is located inside of wheel 24 and that is configured to cause wheel 24 to rotate about a generally horizontal rotational axis 60. Power motor 54 gets its commands and/or electrical power through a pair of cables 62 that connect thereto.

Power motor 54 rotates wheel 24 about axis 60 based upon speed or power commands issued from movement controller 50. Each wheel 24 of patient support apparatus 20a includes a corresponding power motor 54 and a steering motor 56. It will be understood, as described in greater detail below, that different embodiments of patient support apparatus 20 have different arrangements and combinations of steerable and powered wheels.

FIGS. 5-13 illustrate a variety of different wheel configurations that are able to be implemented in any of the patient support apparatus embodiments disclosed herein. In the various embodiments depicted in these figures, wheels 24 that are powered (such as by a motor 54) will be given the reference number 24a; wheels that are steered (such as by a motor 56) will be given the reference number 24b; wheels that are both steered and powered will be given the reference number 24c; and wheels that are neither driven nor steered will be given the reference number 24d. In some instances, powered wheels 24a are alternatively referred to as driven wheels 24a. It will be understood that the embodiments depicted in FIGS. 5-13 are only several of many possible wheel configurations that may be implemented, and that the location and combination of powered and steered wheels can be modified from the examples shown herein. It will also be understood that, for each of the embodiments shown in FIGS. 5-13, movement controller 50 will control the wheels 24a, 24b, and/or 24c based upon signals received from one or more force sensors 52, which are not shown in any of FIGS. 5-13. The potential location of force sensors 52 are described in more detail with respect to FIGS. 15-17.

Figure 5:
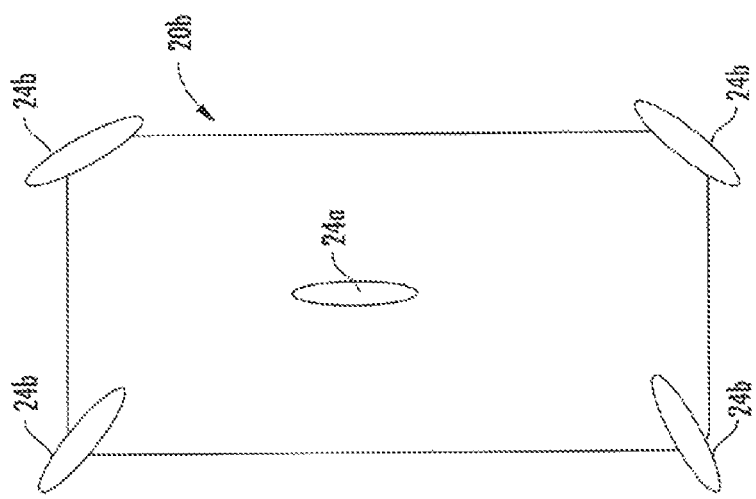
FIG. 5 is a plan view diagram of a first wheel configuration that may be incorporated into any of the patient support apparatus embodiments described herein.

FIG. 5 illustrates a plan view diagram of a patient support apparatus 20b that includes four steered wheels 24b positioned generally adjacent each corner of patient support apparatus 20b. In this embodiment, each steered wheel 24b is steerable independently of the other three wheels 24b. Such independent steering is accomplished by providing four steering motors 56 on patient support apparatus 20b— one for each wheel 24b—or through other means. By providing independent steering of each wheel, patient support apparatus 20b may be rotated in smaller spaces than a support apparatus that had fewer steered wheels. A powered wheel 24a is also provided in patient support apparatus 20b and located generally near the center of the footprint of patient support apparatus 20b, although it may be offset somewhat toward either the front or rear ends of apparatus 20b. Powered wheel 24a receives power from a motor 54 that drives the wheel 24a either forward or backward. In this embodiment, powered wheel 24a is not steerable, but instead only drives support apparatus 20b either forward or backward, leaving wheels 24b to handle the steering.

Figure 6:
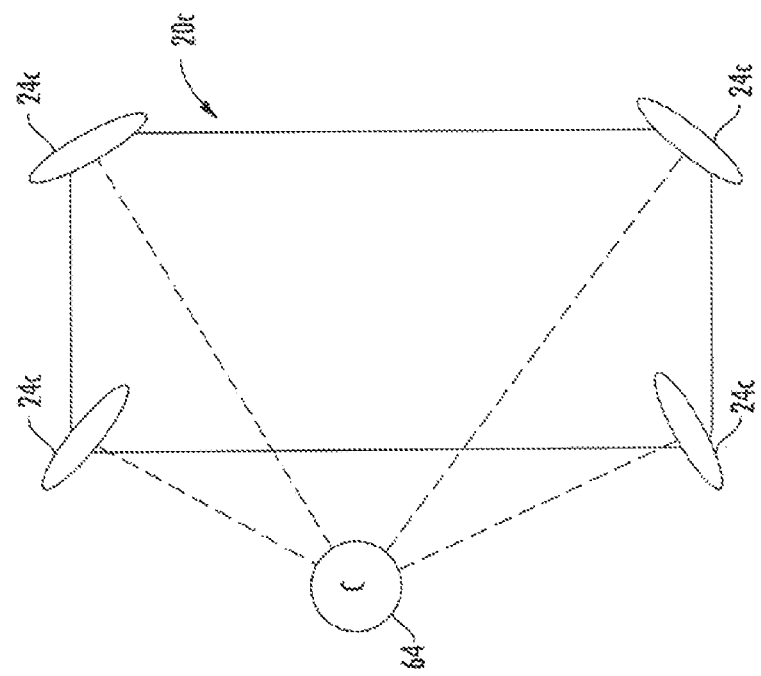
FIG. 6 is a plan view diagram of a second wheel configuration that may be incorporated into any of the patient support apparatus embodiments described herein.

FIG. 6 illustrates a plan view diagram of another embodiment of a patient support apparatus 20c that includes four steered and powered wheels 24c. Wheels 24c are located generally near each corner of patient support apparatus 20c, although, as with patient support apparatus 20b, these locations can be varied. Each of the wheels 24c is both drivable and steerable independently from the other three wheels 24c. In the configuration shown in FIG. 6, patient support apparatus 20c has its wheels 24c turned so that it can rotate about a center of rotation 64 that is positioned outside of the footprint of patient support apparatus 20c. Patient support apparatus 20c includes four separate steering motors 56 and four separate driving motors 54 to achieve the independent steering and powering of each wheel 24c. In some embodiments, however, the driving and steering of wheels 24c could be modified to be less independent. For example, the front wheels 24c could be driven as a pair (with the same power level) while the rear wheels 24c could be driven as a separate pair (with the same power level as each other, but not necessarily the same power level as the front wheels 24c). Other configurations of less independent powering are also possible. Still further, some wheels could be steered in tandem, or in other dependent configurations.

FIG. 7 illustrates a plan view diagram of another embodiment of a patient support apparatus 20d that includes two driven wheels 24a and four wheels 24d that are neither driven nor steered. Non-driven and non-steered wheels 24d may be castered wheels, or other free wheeling types of wheels. Patient support apparatus 20d is configured to move forward or backward by supplying equal power to both driven wheels 24a. Patient support apparatus 20d is further configured to provide steering assistance by rotating one of wheels 24a at a different rate than, or by applying a different amount of power to, the other of wheels 24a. This difference in power or rotation rate exerts a turning force on support apparatus 20d that can be controlled by movement controller 50 based upon signals received from force sensors 52. In the embodiment shown in FIG. 7, wheels 24 are arranged side-by-side so that their respective rotational axes 60 are generally coaxial. It will be understood by those skilled in the art that the differential steering of patient support apparatus 20d can be implemented with different powered wheel arrangements, including arrangements in which wheels 24a are not coaxial.

FIG. 8 illustrates a plan view diagram of another embodiment of a patient support apparatus 20e. Patient support apparatus 20e differs from patient support apparatus 20d in that the two driven wheels 24a have been replaced by two steered and driven wheels 24c. Thus, patient support apparatus 20e is not differentially steered, as support 20d is, but instead has its steering controlled by rotating wheels 24c about their respective generally vertical axes 60, or about a common generally vertical axis. As with non-steered and non-driven wheels 24d of patient support apparatus 20d, wheels 24d of apparatus 20e are castered or otherwise free wheeling wheels that rotate to match the current direction of movement.

Figure 9:
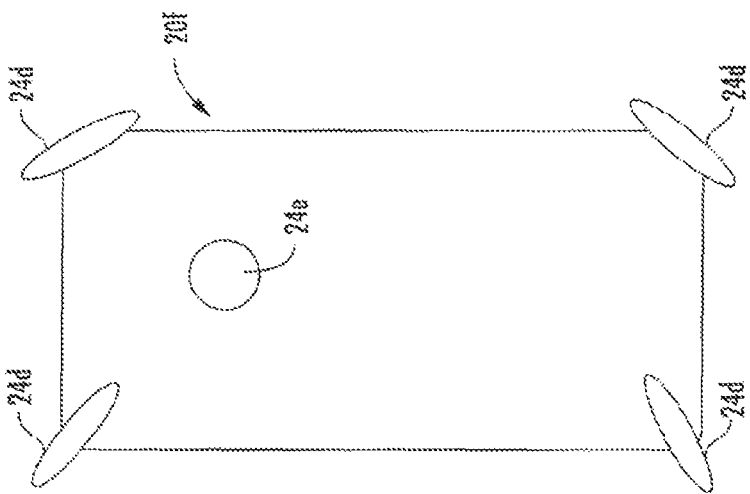
FIG. 9 is a plan view diagram of a fifth wheel configuration that may be incorporated into any of the patient support apparatus embodiments described herein.

FIG. 9 illustrates a plan view diagram of another embodiment of a patient support apparatus 20f. Patient support apparatus 20f includes four non-driven and non-steered wheels 24d, as well as a spherical wheel 24e. Spherical wheel 24e is shaped as a sphere and is controlled to roll in any desired direction. Further, spherical wheel 24e is driven in a controlled manner. Spherical wheel 24e therefore provides both a motive force for moving support apparatus 20f and control over the direction in which that motive force is applied to support apparatus 20f. In one embodiment, spherical wheel 24e may be of the kind disclosed in U.S. patent publication 2008/0084175 filed by Hollis and entitled Dynamic Balancing Mobile Robot. In this '175 patent publication, the spherical wheel is identified by the reference numeral 9. Other types of spherical wheels may also be used.

Figure 10:
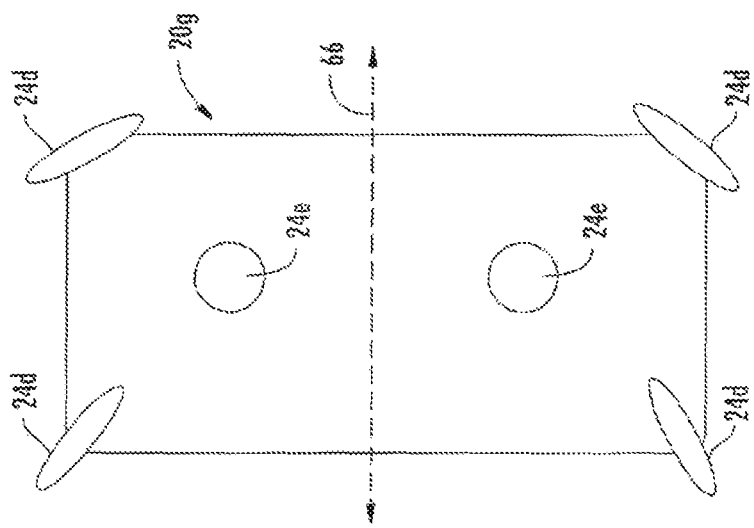
FIG. 10 is a plan view diagram of a sixth wheel configuration that may be incorporated into any of the patient support apparatus embodiments described herein.

FIG. 10 illustrates a plan view diagram of another embodiment of a patient support apparatus 20g. Patient support apparatus 20g differs from patient support apparatus 20f in that it includes a plurality of spherical wheels 24e. Spherical wheels 24e of support apparatus 20g may be the same type of spherical wheels discussed above with respect to patient support apparatus 20f. In at least one of the embodiments of patient support apparatus 20g, both wheels 24e are independently controllable with respect to both direction and with respect to the power or driving force that each exerts. By having a plurality of such wheels 24e, patient support apparatus 20f can offer greater or better movement capabilities than support apparatus 20f. For example, by rotating spherical wheels 24e simultaneously in a lateral direction 66, it is possible to move patient support apparatus 20g laterally without rotation. Further, by rotating spherical wheels 24e in opposite lateral directions (e.g. one wheel 24e rotates parallel to direction 66 and towards the right in FIG. 10 and the other wheel 24e rotates parallel to direction 66 and towards the left in FIG. 10), it is possible to rotate patient support apparatus 20g about a center of rotation that is midway between the spherical wheels 24e. Further, by controlling the rates or rotation, the location of the center of rotation 64 can be varied.

Figure 11:
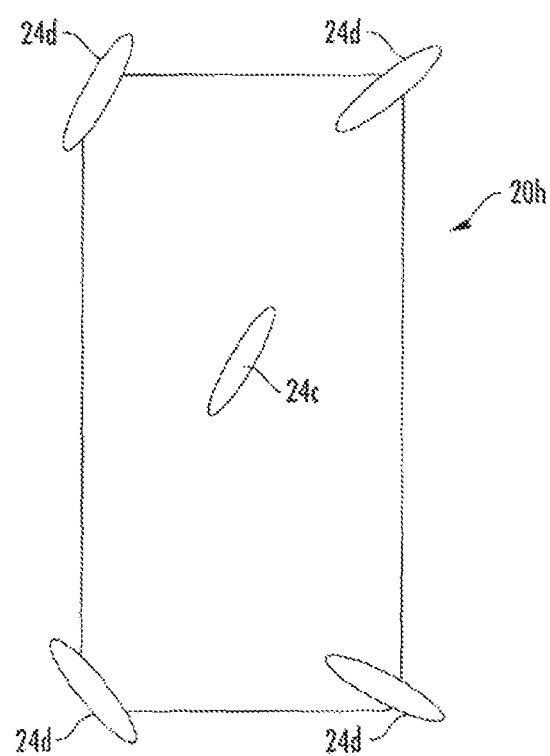
FIG. 11 is a plan view diagram of a seventh wheel configuration that may be incorporated into any of the patient support apparatus embodiments described herein.

FIG. 11 illustrates a plan view diagram of another embodiment of a patient support apparatus 20h. Patient support apparatus 20h includes four non-steered and non-driven wheels 24d positioned adjacent each of the four corners of support apparatus 20h. Support apparatus 20h further includes a driven and steered wheel 24c that is positioned generally near the center of support apparatus 20h. By controlling the driving power supplied to wheel 24c, as well as the direction it is pointed in, movement controller 50 can steer and move patient support apparatus 20h in a variety of different manners, including rotation and translational movement.

FIG. 12 illustrates a plan view diagram of another embodiment of a patient support apparatus 20i, showing some additional structural details of the support apparatus, including, for example, the side rails 44 and head and foot boards 32 and 34. The inclusion of these side rails and head and foot boards in these drawings is in no way intended to suggest that these components are, or should be, absent from the embodiments depicted in FIGS. 5-11, or in any of the other embodiments that omit these elements. Instead, these components have merely been added to provide additional graphical information about several structures that may be included in the various embodiments of the patient support apparatuses described herein.

In the embodiment depicted in FIG. 12, patient support apparatus 20i shows four wheels 24 that have been rotated to give the support apparatus 20i a center of rotation 64 that is located approximately midway between headboard 32 and footboard 34. The wheels 24 in FIG. 12 have been given the generic reference number 24 because they are able take on multiple different forms. That is, in one embodiment, they are both driven and steered (e.g. wheels 24c), while in at least one other embodiment, they are steered but not driven (e.g. wheels 24b). When steered, they are configured to allow movement controller 50 to control the steering of each one of them independently of the steering of the other three wheels.

FIG. 13 illustrates a plan view diagram of another embodiment of a patient support apparatus 20j, showing the same additional structural details as patient support apparatus 20i. As with patient support apparatus 20i, the inclusion of the side rails, head, and foot boards in this drawing is in no way intended to suggest that these components are, or should be, absent from the any of the other embodiments discussed or shown herein.

Patient support apparatus 20j of FIG. 13 is configured to implement Ackermann steering. In this configuration, the two rear wheels are not only non-steered, but they are fixedly attached to base 22 of support apparatus 20j in a manner that prevents them from turning about generally vertical axis 58, whether freely or by way of a steering motor 56. In other words, the two rear wheels 24 are fixed similar to the two rear wheels of a conventional automobile. The two front wheels 24, in contrast, are both steerable. Further, they are steerable in a manner that enables them to trace out circles of different radii, thereby enabling them to avoid, or at least reduce, any side slippage when turning. This Ackermann steering is controlled by movement controller 50. In some embodiments, each front wheel 24 is controlled independently with no mechanical linkage, while in other embodiments a mechanical linkage is coupled between the two front wheels 24 so that their steering is mechanically coordinated. When mechanically coordinated, movement controller 50 is configured to control only a single actuator that controls the mechanical linkage, whereas when no mechanical linkage is included, movement controller 50 controls two separate actuators or motors for independently steering the front wheels 24.

FIG. 14 illustrates one example of an activation algorithm 68 used to activate or deactivate (i.e. turn on and off) the powered movement of any of the patient support apparatus embodiments disclosed herein. That is, activation algorithm controls whether or not one or more user inputs (which may be force sensors 52) will cause movement controller 50 to control one or more of either driving motors 54 or steering motors 56. When not activated, a users manipulation of the force sensors 52, or other types of user inputs, will not result in any operation of motors 54 and 56. When activated, a user's manipulation of force sensors 52 will cause movement controller 50 to activate one or more of motors 54 and 56 in a manner that is dependent upon the specific user input signals that are received.

In the embodiment illustrated in FIG. 14, activation algorithm 68 is partially dependent upon the presence or absence of a radio frequency (RF) identification (ID) tag worn by a clinician, or other authorized caregiver. Such RF ID tags are conventional RF ID tags that communicate with corresponding detectors or sensors when the RF ID tag is positioned within a specific vicinity of the detector or sensor. In this case, patient support apparatus 20 includes an RF ID sensor 70 (FIG. 35) that senses any authorized RF ID tags that are within a vicinity of the support apparatus 20. The vicinity boundaries may vary, but in general may be configured to only detect RF ID tags that are within the same room as patient support apparatus 20, or within a section of the same room. On some occasions, the sensor 70 may detect RF ID tags that are outside the room if they are positioned close to the doorway, but in general it is desirable to not detect tags outside of the same room or area that patient support apparatus 20 is currently located in.

If activation algorithm 68 detects the presence of an RF ID tag, then control will transition to step 72. At step 72, patient support apparatus 20 monitors whether or not any user inputs are detected at either the side rails 44 of support apparatus 20, or at one of the ends of support apparatus 20 (e.g. at headboard 32 or footboard 34). If user inputs are detected at one or more of side rails 44, control passes to step 74. If user inputs are detected at either or both of headboard 32 and footboard 34, then control passes to step 76. When the control transitions to step 74, movement controller 50 will respond to detected user inputs from the side rails 44 by either implementing a translation step 78 or a steering step 80, or both, depending upon what specific inputs are detected at the side rail. If user inputs are detected only at one or both of the headboard 32 and/or footboard 34 (but not the side rails 44), then movement controller 50 will respond exclusively with steering step 80.

Translation step 78 involves controlling either or both of driving motors 54 and steering motors 56 in a manner that enables support apparatus 20 to move in lateral direction 66 without any rotation. Steering step 80 involves controller either or both of driving motors 54 and steering motors 56 in a manner that will cause at least some rotation of support apparatus 20 about a generally vertical axis. Activation algorithm 68 will therefore allow only steering control when users are manipulating controls at either the head end or foot end of patient support apparatus 20, but will allow both steering and translational control when a user is manipulating controls at one or more side rails 44.

If activation algorithm 68 does not detect the presence of an RF ID tag within close proximity to patient support apparatus 20, then control transitions to state or step 82. State 82 is one of two states that will activate a brake on patient support apparatus. The other state is state 84, in which a user has pressed a brake button on patient support apparatus 20, or otherwise turned such a brake on. Thus, in activation algorithm 68, the brake will be activated (i.e. control will pass to braking step 86) if either no RF ID tag is detected within close proximity of support apparatus 20, or the brake is actively turned on by a user. When the brake is turned on, both motors 54 and 56 remain off.

In the illustrated embodiment, the steps of activation algorithm 68 are carried out by movement controller 50, either alone or in combination with other components of support apparatus 20. In other embodiments, activation algorithm 68 may be carried out by other controllers on support apparatus 20. It will be understood by those skilled in the art that many modifications to activation algorithm 68 may be made. For example, in one embodiment, the activation or de-activation of powered movement is controlled without any detection or regard to RF ID tags, or other types of tags worn by caregivers. In such an embodiment, patient support apparatus 20 includes a switch, button, or other control that, when activated, allows for powered movement to take place in response to the manipulation of the corresponding user inputs (e.g. force sensors 52). Such a switch, button, or other control may include a security feature, such as a code that needs to be entered, or other structure that reduces the possibility of inadvertent or unknowing powering of wheels 24 by individuals who had not intended to move patient support apparatus 20. Alternatively, powered movement of patient support apparatus 20 may automatically be enabled whenever the brake on support apparatus 20 is turned off, and automatically disabled whenever the brake is turned on. Still other variations are possible.

FIGS. 15-17 provide several illustrative examples of different configurations and locations of force sensors 52. It will be understood that the several examples illustrated in these drawings are not exhaustive, and that variations from these configurations may be made. It will be further understood that the configurations shown in these drawings, and the modifications thereof, may be incorporated into any of the various patient support apparatuses 20 that are described herein. For example, the force sensor configuration shown in FIG. 15 could be implemented on a patient support apparatus 20 having any of the wheel arrangements shown in FIGS. 3-13. Similarly, the force sensors arrangements of FIGS. 16 and 17 could also be implemented on a patient support apparatus 20 having any of the wheel arrangements of FIGS. 3-13. Further, the activation and deactivation of any of the force sensor configurations of FIGS. 15-17 could be controlled by activation algorithm 68, modifications to algorithm 68, or in still other manners.

FIG. 15 shows a frame or litter 28 of a patient support apparatus 20, as well as several side rails 44 that are attached thereto. Still further, FIG. 15 shows a head board 32 and a footboard 34 that are attached to frame 28. Head board 32, footboard 34, and side rails 44 will collectively be referred to herein as patient boundary structures. In the example shown in FIG. 15, each patient boundary structure is coupled to frame 28 by a pair of force sensors 52. In some embodiments, force sensors 52 provide the physical coupling of the patient boundary structures to frame 28, while in other embodiments force sensors 52 are coupled to one or more separate structures that actually physically secure the patient boundary structures to frame 28. However arranged, force sensors 52 are coupled in a manner so that forces exerted by a caregiver or other user on any of the patient boundary structures are detected by one or both of the force sensors 52 that are positioned at the junction of that patient boundary structure and the frame 28. Thus, for example, if a user presses or pulls anywhere on footboard 34, including, but not limited to any one or more of locations A, B, and/or C, this pressing or pulling force will be detected by the force sensors 52*a* positioned at the junction of footboard 34 and frame 28. Further, any or all of force sensors 52 (including force sensors 52*a*) may be constructed so as to be able to detect forces exerted both in a longitudinal direction 88 as well as a lateral direction 66, although this is not necessary.

Figure 35:
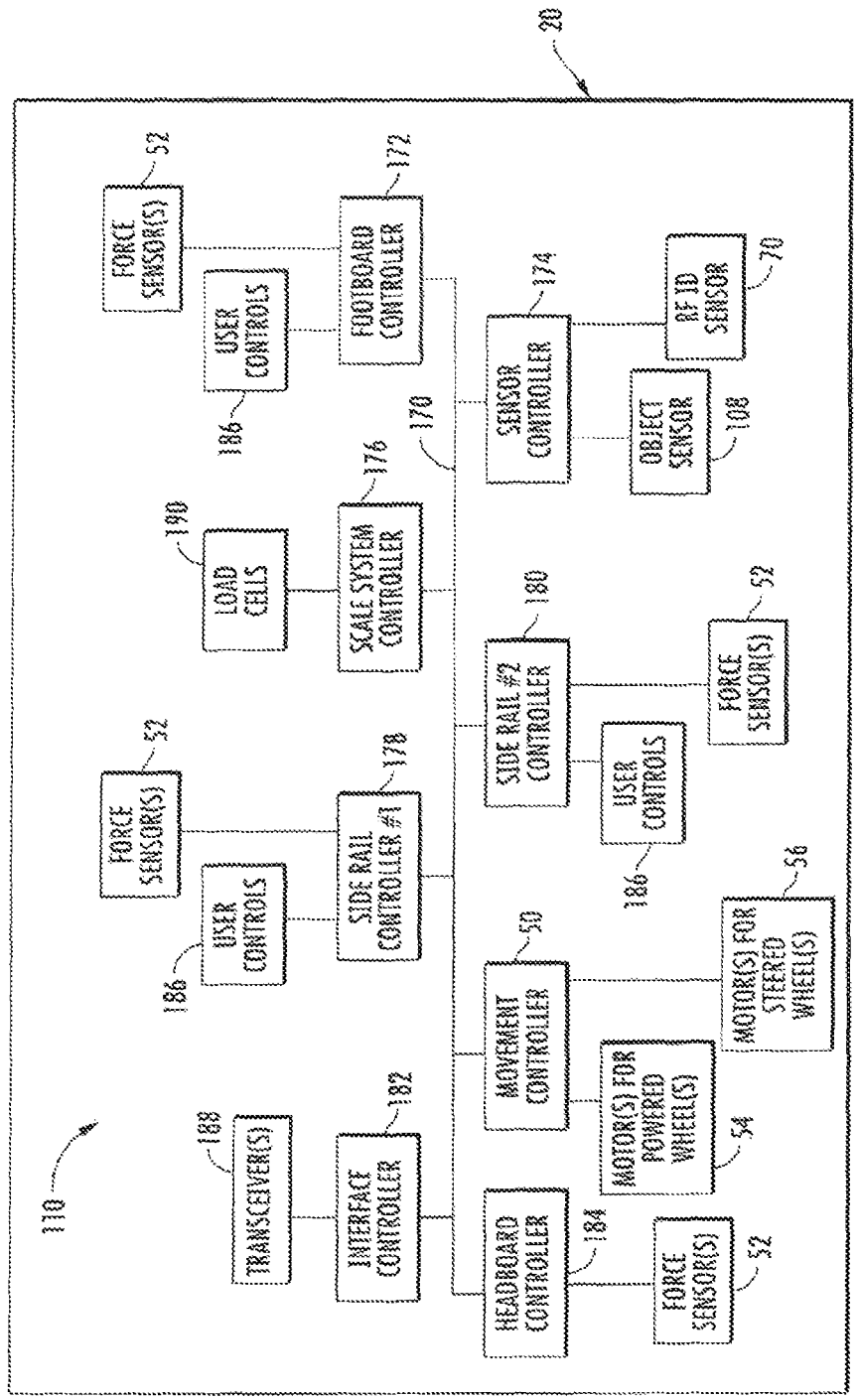
FIG. 35 is a diagram of a second example of a control system for any of the patient support apparatus embodiments of the invention.

Each of the force sensors 52 and 52*a* in FIG. 15 are electrically coupled to movement controller 50. This electrical coupling is direct, as shown in control system 48 of FIG. 2, although it may be indirect, such as through an embedded network, one example of which is shown in FIG. 35. However the force sensor readings are delivered to controller 50, controller 50 processes those readings and outputs appropriate steering and/or drive commands to motors 54 and/or 56 (assuming activation algorithm 68, or some other activation mechanism, has activated the powered movement feature of the support apparatus 20). In some embodiments, movement controller 50 control motors 54 and/or 56 so that patient support apparatus 20 moves in a direction that generally corresponds to how the patient support apparatus 20 would move in reaction to the applied forces if it were supported on frictionless or near-frictionless ground-contacting spherical wheels, and it will move with a speed or acceleration that generally corresponds to the magnitude of the sensed forces. In other words, movement controller 50 attempts to control motors 54 and 56 so as to mimic, but amplify, the motion of patient support 20 that would naturally occur as the result of the applied forces. In this manner, the direction and magnitude of the user's applied forces determine the movement of the support apparatus 20, but the motors 54 and/or 56 supply all or a substantial portion of the energy needed to effectuate that movement so that the users work effort is reduced.

In amplifying the natural movement that would result from the forces exerted by the caregiver, movement controller 50 takes into account not only the direction and magnitude of forces applies to each force sensor 52, but also the relative location of each force sensor 52 that is sensing a force. These relative positions are defined with respect to a reference location that is chosen by the manufacturer of the patient support apparatus. In some embodiments, the reference location is the geometrical center of the patient support apparatus 20, while in other embodiments the reference location is a vertical axis aligned with the center of gravity or center of mass of patient support apparatus 20, while in still other embodiments, some other reference position is used.

Thus, for example, if a user pushes forward on footboard 34 only at position C, most of this force will be sensed by the right force sensor 52*a* (as shown in FIG. 15). A small amount of this forward force will also be detected by left force sensor 52*a*, depending upon the construction of footboard 34 and its connection to frame 28, (or even a backward force may be detected on left force sensor 52*a* depending upon the location of a possible pivot point of footboard 34). Regardless of what the left force sensor 52*a* detects, however, because the predominant force will be sensed in a forward direction at a location that is located to the right of a center 90 of patient support apparatus 20, movement controller 50 will control wheels 24 in such a manner so as to begin to turn support apparatus 20 leftward (as viewed in FIG. 15). This is because a forward force applied at location C that was greater than any forward force applied at any location on footboard 34 to the left of center point 90 would naturally (i.e. without the use of motors 54 and/or 56) tend to turn support apparatus leftward. Thus, movement controller 50 takes into account not only the direction and magnitudes of forces sensed by force sensors 52, but also takes into account where each of those force sensors 52 are located relative to a reference point, such as, but not limited to, center point 90. Stated in another way, movement controller 50 is configured to take into account the amount of torque that is applied by the sum of the sensed forces about a generally vertical axis, such as one running through center point 90, or some other point, and control motors 54 and/or 56 in a manner based on this sensed torque.

Movement controller 50 takes into account the relative location of the applied forces by retrieving from a memory on board the patient support apparatus the location or locations of the one or more force sensors 52 that are currently detecting applied forces. These locations are defined in a coordinate frame of reference that has its origin located at reference point 90 so that no additional calculations of the sensor's location relative to reference point 90 need to be made.

While the embodiment of FIG. 15 shows force sensors 52 positioned at the junction of the side rails 44 and the frame 28, it will be understood that this location could be modified. For example, in one embodiment, force sensors 52 are mounted on the faces of any of the patient boundary structures (e.g. side rails 44, headboard 32, and/or footboard 34), rather than at the interface or junction of these structures and the frame 28. When so mounted, a caregiver could apply force directly to the force sensor 52, and forces applied to other locations of the patient boundary sensor would not be detected.

FIG. 16 shows a patient support apparatus 20*k* having a configuration of force sensors 52*a* that are different from the configuration of FIG. 15. In the configuration shown in FIG. 16, there are two force sensors 52, both of which are capable of detecting forces in both lateral direction 66 and longitudinal direction 88. Force sensors 52 of FIG. 15 are located at the junction of frame 28 and each of two height adjustment mechanisms 26. By positioning force sensors 52 in this location, any forces that are exerted in either lateral direction 66 or longitudinal direction 88 on frame 28 will be detected by one or both of sensors 52. In other words, when someone exerts a generally horizontal force on any portion of frame 28, including anything attached directly to frame 28 (such as the patient boundary structures), that force will be transmitted to one or both of elevation adjustment mechanisms 26, which support frame 28. However, because force sensors 52 are positioned at the junction of frame 28 and these adjustment mechanisms 26, the force sensors 52 will sense these forces.

The force sensor configuration of FIG. 16 has some advantages over the force sensor configuration of FIG. 15. First, there are fewer force sensors 52 required in the configuration of FIG. 16 than in the configuration of FIG. 15. The configuration of FIG. 15 may have up to twelve force sensors 52, while the configuration of FIG. 16 may have as few as two force sensors 52. Having fewer force sensors 52 generally reduces the cost of this configuration. Second, by placing force sensors 52 at the junction of the elevation adjustment mechanisms and the frame, a person can exert a force anywhere on frame 28, not just on the patient boundary structures that are coupled to frame 28 (such as in the configuration of FIG. 15). If a caregiver is standing between two side rails 44, for example, he or she can push or pull directly on frame 28 and have movement controller 50 respond in the corresponding manner.

As with the configuration of FIG. 15, movement controller 50 takes into account—in addition to the direction and magnitude of forces sensed by sensors 52—the location of the force sensors 52 relative to a reference point on patient support apparatus 20, such as, but not limited to, the center point 90. Thus, if the two force sensors 52 were asymmetrically positioned around center point 90, the detection of forces on both sensors 52 of equal magnitude and direction would result in a torque being applied with respect to center point 90. Movement controller 50 is programmed to take into account such torque when determining how to control steering motors 65 and/or driving motors 54. As was previously noted, center point 90 may be a geometrical center, or it may be a center of mass, or some other center.

FIG. 17 illustrates another embodiment of a patient support apparatus 20*l* having yet a different possible configuration of force sensors 52. In this embodiment, force sensors 52 are integrated into, or coupled to, wheels 24, or mounted between the wheels 24 and the wheel supports. As with the other force sensors 52, the force sensors 52 of FIG. 17 are configured to detect forces in both the lateral and longitudinal directions 66 and 88, respectively. These forces are forwarded to movement controller 50 which processes them in the same manners as have been previously described. As with the configurations of FIGS. 15 and 16, movement controller 50 for the support apparatus 20*l* of FIG. 17 takes into account the location of force sensors 52 relative to a reference point when controlling motors 54 and/or 56.

FIGS. 15-17 illustrate several patient support apparatus embodiments where there are several control locations available to one or more caregivers to control the powered movement of the support apparatus. These control locations include a head end control location 194, a foot end control location 196, a right side head location 198, a right side foot location 200, a left side head location 202, and a left side foot location 204 (FIGS. 18-21). A caregiver may stand in any of these various locations and exert a force on the frame and/or patient boundary structure. These exerted forces will then control, via movement controller 50, the movement of the patient support apparatus 20. By having multiple control locations, it is easier for a caregiver to effectuate powered movement of support apparatus 20 because he or she does not need to physically move to a single dedicated location for controlling such movement. This feature can be especially useful where an end or side (or both) of support apparatus 20 is positioned up against a wall, or other obstacle, and a caregiver cannot easily stand next to the portion of patient support apparatus adjacent the obstacle. By having multiple control locations, however, a caregiver is assured that control of powered movement can be carried out in any convenient location.

FIGS. 18-22 illustrate various different types of forces that may be applied at different positions to a patient support apparatus 20 and sensed by force sensors 52 (wherever located). The patient support apparatuses 20 depicted in these drawings do not specifically identify a type of wheel configuration because they may include any of the wheel configurations of FIGS. 3-13, or still other configurations. Similarly, the location of the force sensors 52 may be same as in any of FIGS. 15-17, or they may include still other force sensor locations and configurations.

FIG. 18 illustrates a situation in which a caregiver 94 located at the left side head control location 202 is applying a purely translational force 92 to one of the side rails 44 of a patient support apparatus 20m. In this example, the force sensors 52 (not shown) will detect this purely translational force and forward this detection to movement controller 50. Movement controller 50 will respond by controlling motors 54 and/or 56 such that patient support apparatus 20m will move with purely translational motion in the direction of force 92.

FIG. 19 illustrates a different situation in which a caregiver 94 is applying both a translational force 92 and a rotational force 96 to a patient support apparatus 20, which may be the same support apparatus 20m of FIG. 18, or it may be of a different configuration. More specifically, caregiver 94 is applying these forces to a side rail 44 of patient support apparatus. These translational and rotational forces are detected by force sensors 52, which are configured in any of the previously described configurations, or still other configurations. In response to these applied forces, movement controller 50 will move the patient support apparatus so that it both translates and rotates.

FIG. 20 illustrates another situation in which a pair of caregivers 94 are each applying a purely translational force 92, yet because the direction of each purely translational force 92 is not the same, the net result is to create a rotational force component in addition to a translational force component. The cumulative translational force 100 and cumulative rotational force 96 that result from the combination of the two translational forces 92 is shown in FIG. 20. This combination takes into account not only the direction and magnitude of the translational forces 92, but also their relative location to each other and to a reference point, such as, but not limited to, center point 90. Movement controller 50 will respond to the cumulative rotational force component 98 and cumulative translational force component 100 by controlling motors 54 and/or 56 so that the patient support apparatus 20 moves with a corresponding translational component and corresponding rotational component. The patient support apparatus 20 of FIG. 1s the same as the support apparatus 20m of FIG. 18, in one embodiment, although it will be understood that it may be different.

FIG. 21 shows yet another situation in which a caregiver is applying both a rotational force 96 and a translational force 92 to a foot end of a patient support apparatus 20n. In this embodiment of patient support apparatus 20n, the wheels 24 and movement controller 50 are configured to implement Ackermann steering. The two wheels 24 toward the foot end of patient support apparatus 20n therefore do not change direction, while the two wheels 24 toward the head end of patient support apparatus 20n are capable of changing direction. Based on the rotational and translational forces 96 and 92, respectively, applied by caregiver 94, movement controller 50 controls the steering of the two wheels 24 toward the head end of the support apparatus 20n so that they turn in a direction that corresponds to the rotational force 96. Movement controller 50 further drives any one or more of wheels 24 so that support apparatus 20n moves forward with a translational motion component corresponding to translational force 92.

FIG. 22 shows an example of the path that a patient support apparatus 20 might take under the control of movement controller 50 and the forces applied by a caregiver 94 to one of the side rails 44. Patient support apparatus 20 of FIG. 22 starts in an initial position 102 where a caregiver is positioned adjacent a foot end side rail 44. After the caregiver begins to exert forces on the side rail 44, which are sensed by appropriately positioned force sensors 52, patient support apparatus 20 begins to both rotate and translate. This rotation and translation will carry support apparatus 20 to an intermediate position 104, and eventually to a final position 106. In the final position 106, patient support apparatus 20 has rotated ninety degrees with respect to its initial position while the caregiver 94 did not need to reposition himself or herself with respect to support apparatus 20. The simple movement illustrated in FIG. 22 would not be possible with prior art powered patient support apparatuses, which likely would have required either multiple back and forth movements to move from initial position 102 to final position 106, repositioning of the caregiver 94 at different locations on support apparatus 20, and/or the use of a greater amount of space to make the transition from position 102 to position 106. Thus, patient support apparatus 20 allows more efficient movement with less space consumption. The patient support apparatus 20 of FIG. 22 may be any of the various embodiments depicted herein, such as, for example, any of patient support apparatuses 20a-20w, some of which have been described above and some of which will be described in more detail below.

FIGS. 23-26 illustrate several other patient support apparatus embodiments that include one or more additional assisted navigation features. Such assisted navigation features make it easier for a caregiver to control the movement of support apparatus 20. In the support apparatus embodiments of FIGS. 23-26, each patient support apparatus 20 includes at least one object sensor 108 attached thereto. Object sensors 108 are any sensors that are capable of detecting objects, obstacles, or other physical structures into which patient support apparatus 20 might collide with, bump into, or otherwise undesirably contact during movement. Object sensors 108 therefore include cameras, ultrasonic sensors, laser range finders, infrared projectors and sensors, and any other sensor capable of detecting the location of one or more objects relative to support apparatus 20.

The patient support apparatus 20o of FIG. 23 includes an object sensor 108 positioned at a head end of the support apparatus. Object sensor 108 is positioned on any of headboard 32, frame 28, elevation adjustment mechanism 26, or base 22, or integrated into any of these components. In other embodiments, object sensor 108 includes multiple components, and these components are dispersed amongst any of headboard 32, frame 28, elevation adjustment mechanism 26, and/or base 22. In the embodiment of FIG. 23, the control system of patient support apparatus 20o—which is control system 48 (FIG. 2), or control system 110 (FIG. 35), or any other suitable control system—is modified to include a "follow me" mode. The "follow me" mode allows the patient support apparatus 20o to automatically move and steer itself so as to follow behind an authorized individual, such as caregiver 94, as he or she walks. This is accomplished by object sensor 108 detecting the location of the caregiver 94 in front of support apparatus 20o and movement controller 50 issuing appropriate steering and driving commands to motors 56 and 54 so as to cause support apparatus 20o to follow behind the caregiver. Movement controller 50 controls the steering and driving of patient support apparatus 20o in a closed loop manner that seeks to maintain a specific distance, or range of distances, between support apparatus 20o and caregiver 94. Object sensor 108 also detects the relative lateral position of caregiver 94 with respect to the foot end of support apparatus 20o and movement controller 50 uses that information in steering support apparatus 200.

The "follow me" mode of patient support apparatus 20o in FIG. 23 is turned on and off in any desirable manner. In some instances, there is a switch, button, or other control positioned on one or more control panels of the patient support apparatus. In other instances, the activation and deactivation of the "follow me" mode takes into account the presence or absence of an RF ID tag worn by caregiver 94. For example, in some instances, support apparatus 20o is designed so that the "follow me" mode can only be used to follow individuals who are wearing RF ID tags, badges, or other authorized devices that can be detected by one or more other sensors positioned on patient support apparatus 200. This is accomplished by including one or more RF ID detectors on the patient support apparatus 20o that are able to detect when an RF ID tag is within the vicinity of patient support apparatus 20o—particularly in the front area of the patient support apparatus 20o where the tag-wearer will be positioned during the "follow me" mode—and having the internal circuitry on patient support apparatus 20o automatically switch on the "follow me" mode; or, alternatively, having the internal circuitry on patient support apparatus 20o automatically provide the option of turning on the "follow me" mode via one or more of the normal user interfaces included on the patient support apparatus 20o. In some embodiments, the detection of the RF ID tag is accomplished through any of the near field detection techniques and systems disclosed in commonly assigned U.S. patent application Ser. No. 61/701,943 filed Sep. 17, 2012 by applicants Mike Hayes et al. and entitled COMMUNICATION SYSTEMS FOR PATIENT SUPPORT APPARATUSES, the complete disclosure of which is hereby incorporated herein by reference. In other embodiments, other techniques and/or systems are used.

FIG. 24 illustrates another embodiment of a patient support apparatus 20p that includes a control system that is adapted to allow a user to select a "hands free push" mode. The "hands free push" mode can be incorporated into a patient support apparatus 20p that also has the capability of the "follow me" mode (e.g. apparatus 20o of FIG. 23), or it can be incorporated into a patient support apparatus by itself. The "hands free push" mode is like the "follow me" mode, but reversed. That is, in the "hands free push" mode, movement controller 50 controls motors 54 and 56 so as to move support apparatus 20p in a way that stays ahead of caregiver 94, who is positioned behind support apparatus 20p. In carrying out this movement, movement controller 50 relies on signals coming from an object sensor 108 positioned at the foot end of support apparatus 20p. This object sensor is positioned on footboard 34, frame 28, elevation adjustment mechanism 26, or base 22, or integrated into any of these components. In other embodiments, object sensor 108 includes multiple components, and these components may be dispersed amongst any of footboard 34, frame 28, elevation adjustment mechanism 26, and/or base 22. Based on the output of the object sensor 108, movement controller 50 steers and drives patient support apparatus 20p in a manner that seeks to maintain a specific distance, or range of distances, between support apparatus 20p and caregiver 94. In one embodiment, object sensor 108 detects the relative lateral position of caregiver 94 with respect to the foot end of support apparatus 20p and movement controller 50 uses that information in steering support apparatus 20p.

The "hands free push" mode is turned on and off in any of the same manners discussed above with respect to the "follow me mode," or in still different manners. That is, there may be a switch, button, or other control positioned on one or more control panels of the patient support apparatus. The activation and deactivation of this mode may also, or alternatively, take into account the presence or absence of an RF ID tag worn by caregiver 94. For example, in some instances, support apparatus 20p is designed so that the "hands free push" mode is only accessible to individuals who are wearing RF ID tags, badges, or other authorized devices that can be detected by one or more other sensors positioned on patient support apparatus 20p. As noted above, such sensors are, in some embodiments, the same or similar to those disclosed in the commonly assigned U.S. application Ser. No. 61/701,943, which has been incorporated herein by reference.

It will be understood by those skilled in the art that either or both of the "follow me" and "hands free push" modes illustrated in FIGS. 23 and 24 can be incorporated, either individually, or in combination, into any of the patient support apparatuses described herein, and that these modes are able to be implemented using any of the wheel configurations and any of the force sensor configurations that are described herein.

FIG. 25 illustrates another embodiment of a patient support apparatus 20q that includes one or more object sensors 108 that are used to assist in the steering of support apparatus 20q as it moves. Unlike the embodiments of FIGS. 23 and 24, the embodiment shown in FIG. 25 relies upon forces exerted by a user (and detected by force sensors 52) to initiate and provide most of the control for the movement of support apparatus 20q. However, unlike most of the previous support apparatus embodiments described above, the apparatus 20q of FIG. 25 is configured to allow signals from object sensor 108 to override, either partially or wholly, steering commands detected via force sensors 52. That is, the control system of the support apparatus of FIG. 25 is configured to follow and implement the steering and motion commands of a caregiver only to the extent they do not cause, or likely lead to, a collision with any objects that are detectable by object sensor 108. If movement controller 50 determines that the user inputs are likely to lead to a collision—based on the outputs from object sensor 108—it automatically takes corrective measures. Such corrective measures include steering the support apparatus 20q away from the detected object, slowing the speed of support apparatus 20q, or a combination of the two.

In the example illustrated in FIG. 25, a caregiver 94 is shown exerting a forward translational force 92 on support apparatus 20q. Movement controller 50 converts this forward translational force into speed and steering commands that cause support apparatus 20q to move forward in the same direction as force 92. However, upon nearing walls 112, object sensor 108 will detect the presence of walls 112, as well as the absence of these walls in a doorway 114 defined between walls 112. Movement controller 50 will therefore steer patient support apparatus 20q toward doorway 114 despite the fact that caregiver 94 might continue to exert a purely translational force 92 that would otherwise direct support apparatus 20q into wall 112. In addition to steering support apparatus 20q toward doorway 114, controller 50 also decreases the speed of support apparatus 20q, as appropriate. Indeed, if movement controller 50 determines from object sensor 108's readings that doorway 114 is too narrow to fit through, controller 50 brings patient support apparatus 20q to a complete stop.

In an alternative embodiment, instead of changing the steering and/or driving of one or more wheels 24, patient support apparatus 20q of FIG. 25 could be configured to merely issue an alert or other warning signal if object sensor 108 detects an object. Such an alert could be visual, aural, tactile, or any combination of these. By only providing such an alert, the caregiver 94 would be made aware of the potential collision, but controller 50 would leave it up to the caregiver 94 to take the appropriate corrections to the speed and course of support apparatus 20q so as to avoid a collision. In addition to the alerts, support apparatus 20q could be configured to include a display that provided an indication where on patient support apparatus 20q the likely collision is going to occur, which is especially helpful when support apparatus 20q is bulky and/or otherwise obstructs the view of a caregiver positioned behind it.

The steering assist feature illustrated in FIG. 25 can be implemented in any of the patient support apparatuses described herein. That is, it is usable with any of the wheel configurations described herein, and/or with any of the force sensor configurations described herein. Further, it may also be incorporated into, if desired, a patient support apparatus 20 that also includes one or both (or neither) of the "follow me" and "hands free push" modes of FIGS. 23 and 24, respectively.

Figure 26:
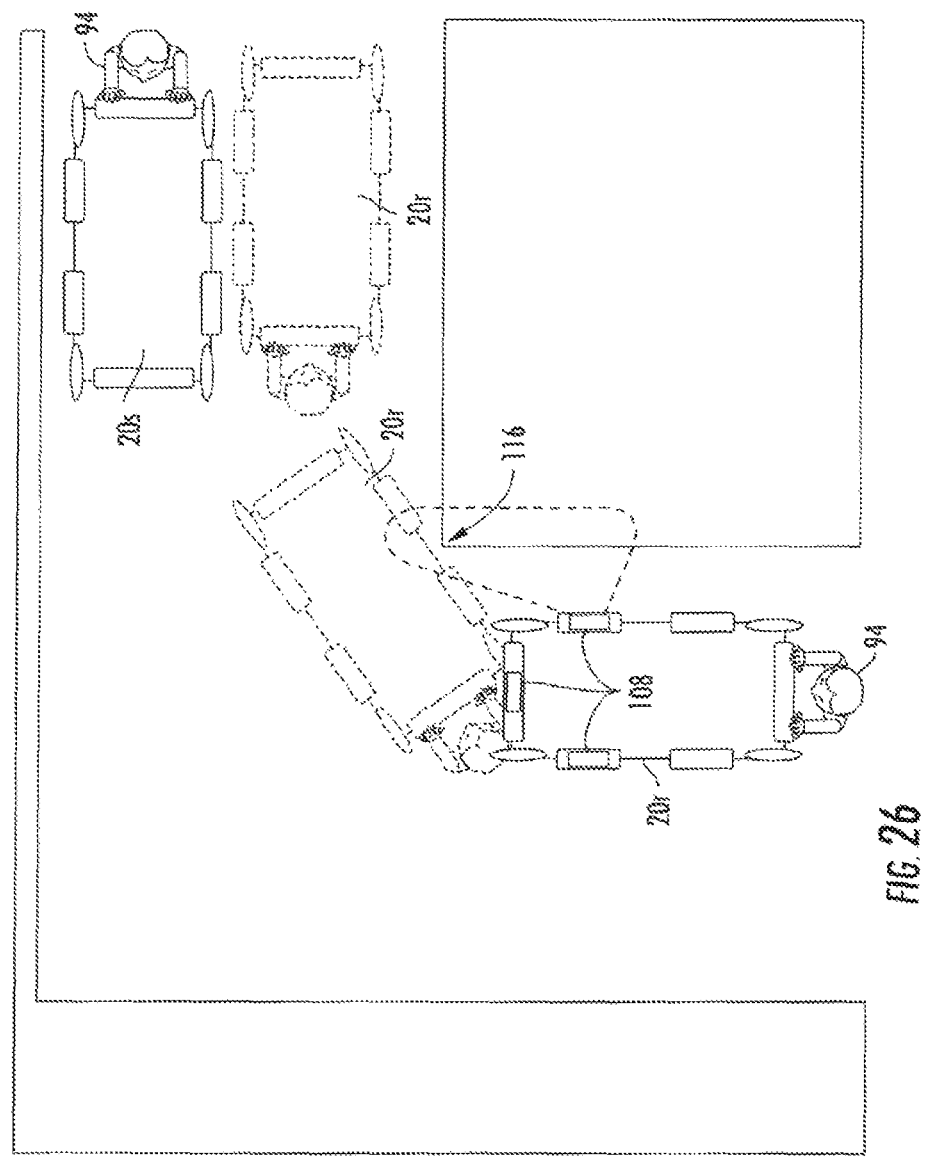
FIG. 26 is a plan view diagram of a patient support apparatus embodiments having one or more sensors allowing the patient support apparatus to automatically steer tightly around corners so as to minimize the space occupied by the support apparatus during corner turns.

FIG. 26 illustrates another control algorithm or feature that may be incorporated into any of the patient support apparatuses 20 having one or more object sensors 108. More specifically, FIG. 26 illustrates a turning feature that enables a caregiver 94 to tightly turn a first patient support apparatus 20r about a corner. This is especially helpful in situations where other obstacles are present, or in other tight spaces. For example, in the situation of FIG. 26, a second patient support apparatus 20s is shown that would be an obstacle for turning support apparatus 20r were it not able to tightly turn around corner 116. In other words, to avoid a collision in the situation where support apparatus 20r was not equipped with a corner turning feature, either the caregiver controlling support apparatus 20k would have to wait until support apparatus 20s moved out of the way, or the caregiver controlling support apparatus 20k would have to wait until the caregiver controlling support apparatus manipulated a wide corner turn that would likely involve back and forth motion.

The corner turning feature of FIG. 26 includes not only sensing the location of a corner via object sensor 108, but also controlling the steering of one or more wheels 24 so as to stay within a close distance to corner 116 as support apparatus 20r is moved. If patient support apparatus 20 is equipped with a wheel configuration that allows one or more forwardly positioned wheels 24 and one or more rearwardly positioned wheels 24 to be steered independently of each other, then movement controller 50 will also utilize this steering capability to more automatically effectuate a tighter turn than would otherwise be possible without this capability.

Figure 27:
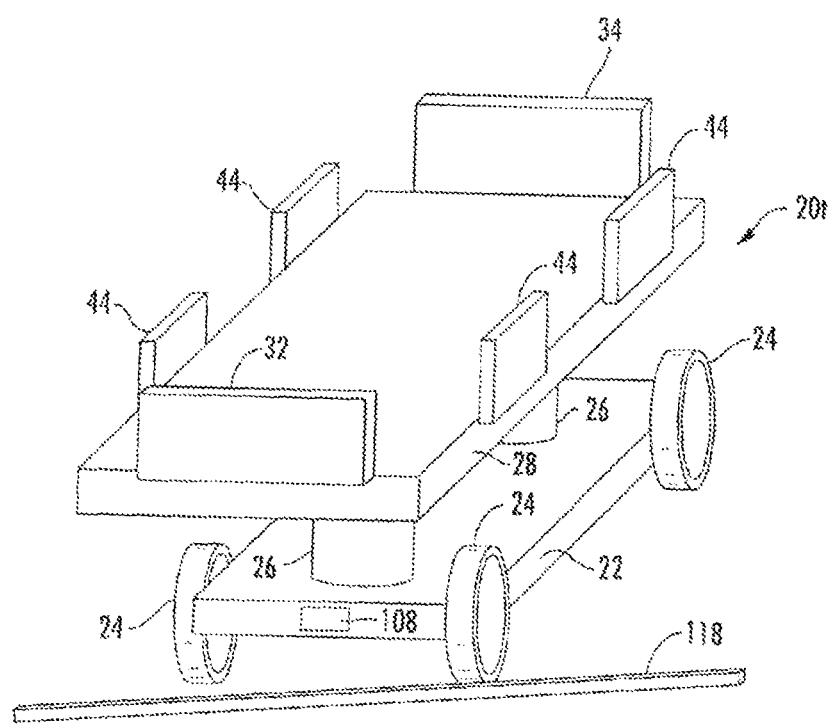
FIG. 27 is a perspective view diagram of a patient support apparatus embodiment having one or more sensors allowing the patient support apparatus to raise one or more wheels when traveling over a cord, threshold, or other discontinuity in the floor.

FIG. 27 illustrates another embodiment of a patient support apparatus 20t that includes a wheel-raising feature adapted to mitigate jostling of support apparatus 20t, as well as the patient support thereon, when traversing discontinuities in floor height, whether due to obstacles, such as a cord 118, or to other things. Support apparatus 20t of FIG. 27 includes an object sensor 108 that is positioned at an end of support apparatus 20t, and which is coupled to base 22 thereof (although its location can be varied). Regardless of the physical position of sensor 108, it is adapted to detect objects and/or surface discontinuities that patient support apparatus 20t might encounter as it moves. Object sensor 108 is further adapted to be able to detect the size of the object or floor discontinuity and communicate a signal with the size information to a wheel controller (not shown) that is able to lift one or more wheels 24 as the support apparatus 20t travels over the obstacle. Object sensor 108 is further adapted to detect the distance to the object as support apparatus 20t moves and to provide updates of this distance measurement to the wheel controller so that wheel controller can time the lifting of the one or more wheels 24 to coincide with the actual passage over the object or discontinuity. By lifting the wheel, the jostling impact that might otherwise have occurred without the wheel lifting is reduced or eliminated, thereby increase the comfort of the patient riding on patient support apparatus 20t. The wheel lifting feature of FIG. 27 may be incorporated into any of the patient support apparatuses 20 discussed herein, either alone or in any combination with the other control features discussed herein.

FIG. 28 illustrates another patient support apparatus 20u which includes a control system adapted to provide an auto-docking feature. The auto-docking feature automatically steers and moves patient support apparatus 20u into a preferred location, with a preferred orientation, within a given room. As shown in FIG. 28, a docked position 120 is defined adjacent to a wall having a sensor or locating unit 122 mounted thereto. Support apparatus 20u, in addition to one or more object sensors 108, includes a sensor that is able to communicate with locating unit 122 in a manner that allows support apparatus 20u to determine its relative position within the room.

In some embodiments, support apparatus 20u has all of the floor plans, or room plans, within a given facility stored within its memory and locating unit 122 simply provides an indication of which room support apparatus 20u is currently located in. Once support apparatus 20u knows which room it is positioned it, it retrieves from its memory the preferred docking location 120 corresponding to that room. Upon activation of the auto-docking feature by a caregiver, support apparatus 20u will maneuver itself into the docked position 120. This maneuvering may require steering itself around other objects that are in the room. In order to accomplish this, one or more object sensors 108 are incorporated into support apparatus 20u such that it can steer itself to avoid the detected objects.

In other embodiments, support apparatus 20u of FIG. 28 does not include room layouts stored in memory, but instead automatically guides itself to the docked position 120 by appropriate communications with locating unit 122. Such communications include any form of information sharing that helps guide patient support apparatus 20u to docking location 120. The commencement of the auto-docking operation is initiated by the manipulation of any suitable user control. As with the other control features disclosed herein, this auto-docking feature is able to be incorporated into any of the patient support apparatuses 20 discussed herein, either alone or in any combination with the other control features discussed herein.

FIGS. 29 and 30 illustrate another embodiment of a patient support apparatus 20v that includes an automated navigation feature. In this embodiment, patient support apparatus 20v is configured such that it is able to automatically navigate from a first location within a healthcare facility to a second location within the healthcare facility, without the need for a caregiver to steer or otherwise manipulate the support apparatus 20v. This feature enables the patient support apparatus 20v to function, in some embodiments, with various features and capabilities that are similar to conventional automatic guided vehicles used in the material handling industry. This feature further allows a caregiver to input a destination into support apparatus 20v and have the patient transport thereto automatically without requiring a staff member to accompany the patient during this transport. Alternatively, the caregiver can accompany the patient during transport, but the caregiver will be free from having to steer and push the support apparatus 20v, and therefore can focus on other activities.

The automatic navigation of support apparatus 20v of FIGS. 29 and 30 may be accomplished in a variety of different manners. In one embodiment, object sensors 108 are sufficient by themselves to enable support apparatus 20v to steer itself down hallways and corridors without collision to thereby move support apparatus 20v to the intended destination. In other embodiments, additional sensors are included on support apparatus 20v that enable it to automatically navigate. Such sensors include wheel encoders that monitor the number of rotations of one or more wheels 24. This enables support apparatus 20v to determine the distance it has traveled. Further, by monitoring the difference in rotation counts between two encoders coupled to wheels 24 positioned on opposite sides of support apparatus 20v, the turns of support apparatus are detected. Still further, encoders coupled to any one or more of motors 54 and 56 monitor the distance traveled and the direction of that travel. Other sensors, such as gyroscopes, inertial reference units, accelerometers, and/or still other sensors can also be included to provide additional navigational information.

In one embodiment, support apparatus 20v includes a floor plan or map 124 stored in its memory that identifies the layout of a floor or section of a healthcare facility, including the location of the rooms within that facility. In some embodiments, one or more landmarks are positioned throughout the healthcare facility at fixed locations that are detectable by support apparatus 20v. The locations of these landmarks are included in map 124 stored in the memory of support apparatus 20v. When support apparatus 20v detects one or more of these landmarks, it uses the detection of that one or more landmarks to update its position by consulting the stored map, which indicates the location of those landmarks within the healthcare facility.

FIG. 31 illustrates yet another embodiment of a patient support apparatus 20w. In the embodiment of FIG. 31, support apparatus 20w includes an extendable and retractable riding platform 128 that is positioned at an end of support apparatus 20w. Riding platform 128 provides a platform on which a caregiver is able to stand while manipulating the movement of support apparatus. In the embodiment of FIG. 31, support apparatus 20w includes a pair of handles 46 that are used by a caregiver to control the movement of support apparatus 20w. Handles 46 include one or more force sensors 52 positioned thereon, or they make pivoting contact with one or more force sensors 52 as a user manipulates them, or they use other devices for detecting the movements desired by a caregiver. One such other device includes potentiometers that measure the amount of pivoting of handles 46 as a caregiver pushes or pulls back on them. The amount of this pivoting is forwarded to movement controller 50, which implements the corresponding movement commands to one or more motors 54/56.

A separate force sensor 52, or other type of sensor, is included in each handle 46 so that the amount of force applied, or pivoting implemented, by a user to each handle 46 is separately determined. By making separate readings for each handle 46, movement controller 50 is able to determine in which manner, if any, the caregiver wishes to turn support apparatus 20w, and thereafter implement the appropriate commands to motors 54 and/or 56.

Riding platform 128 is both extendable out of, and retractable into, a portion of base 22, or it is positioned within either a space defined between the top of base 22 and the bottom of frame 28, or a space defined between the bottom of base 22 and the floor on which support apparatus 20w is positioned. Riding platform 128 is either supported in a cantilevered fashion from underneath support apparatus 20w, or it includes one or more wheels positioned underneath it that ride on the floor and help support the platform 128 when it is in the extended position. Riding platform 128 is able to be incorporated into any of the patient support apparatus embodiments discussed herein.

Figure 32:
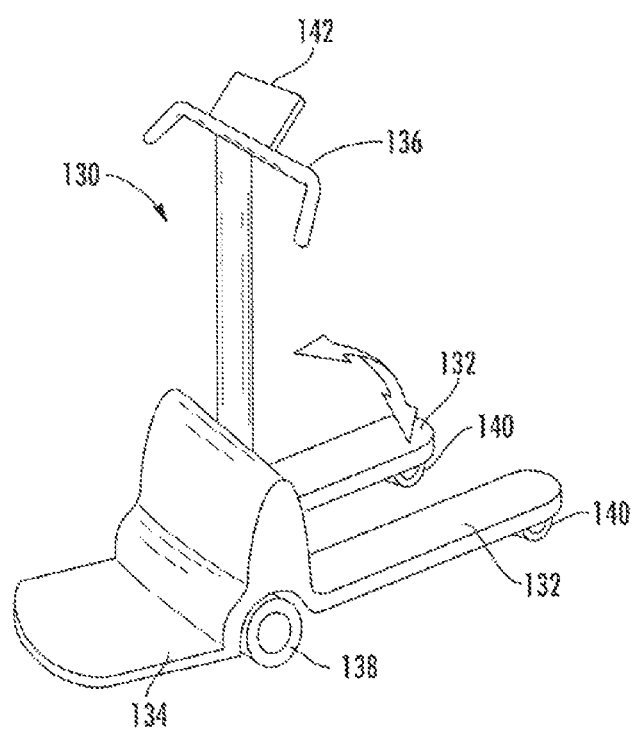
FIG. 32 is a perspective view of a patient support apparatus mover that may be coupled and uncoupled to a patient support apparatus for moving the support apparatus.

FIG. 32 illustrates a rideable bed mover 130 that includes a pair of retractable legs 132 that are retractable from a generally flat and extended position (shown in FIG. 32) to a generally upright and vertical position. In the position shown in FIG. 32, legs 132 are inserted under a conventional patient support apparatus 20 that does not have powered movement capabilities and moved, by way of mover 130, from one location to another. Bed mover 130 includes a platform 134 on which a caregiver is able to stand and ride during movement of bed mover 130. Platform 134 may either be fixed, or it may be movable between an extended use position (shown in FIG. 32), and a more compact non-use position. After legs 132 of bed mover 130 are inserted underneath a patient support apparatus 20, they are partially lifted upward so as to raise or tip a portion of the patient support apparatus 20, or they are otherwise positioned so as to securely engage the patient support apparatus 20. The partial lifting or tipping is accomplished in any suitable manner. One or more structures may also be included on either of legs 132 for releasably securing mover 130 to the patient support apparatus 20.

In some embodiments, the control of bed mover 130 is carried out in the same manner as the control of any of the patient support apparatuses described herein. That is, in some embodiments, bed mover 130 includes one or more force sensors 52, which are positioned at suitable location(s) thereon, such as, but not limited to, a handle 136 of mover 130, or elsewhere. Such force sensors 52 are configured to detect both a magnitude and direction of one or more forces applied by a user and forward that information to a controller, such as movement controller 50, or another controller. Based on that information, mover 130 provides automatic driving and/or steering of its wheels 138 in order to guide it, and an associated patient support apparatus 20, to a new location. In some embodiments, mover 130 includes a plurality of wheels 138 that are each independently steerable and drivable. In other embodiments, only a subset of the wheels 138 are drivable and/or steerable. Further, in some embodiments, the drivable and steerable wheels 138 are the same, while in others they are different.

In the embodiment shown in FIG. 32, mover 130 includes four wheels, a pair of large wheels 138 and a pair of small wheel 140 that are positioned underneath legs 132. In this embodiment, small wheels 140 are neither drivable nor steerable. Instead, the driving and steering is accomplished through the control of large wheels 138. The steering of large wheels 138 is carried out by rotating each of the two large wheels 138 at different speeds, or it is carried out by rotating the axis of rotation of each wheel about a generally vertical axis.

In some embodiments, mover 130 includes a removable touch controller 142, such as, but not limited to, a touch screen controller. Touch screen controller 142 is, in one embodiment, a removable computer that is able to be coupled to a patient support apparatus 20, such as is described in greater detail in commonly assigned, copending U.S. provisional patent application Ser. No. 61/606,147 filed Mar. 2, 2012 by applicants Cory Herbst and entitled PATIENT SUPPORT, the complete disclosure of which is hereby incorporated herein by reference. Controller 142 provides a user interface adapted to allow a user to control one or more functions of patient support apparatus 20. In order to accomplish this control, mover 130 includes an electrical connector (not shown) that plugs into a corresponding connector on support apparatus 20 and allows commands and/or other electronic information to be passed between mover 130 and patient support apparatus 20. In some embodiments, this connection is a wire or cable, while in other embodiments, it is wireless. In still other embodiments, the communication connection is carried out by inductive coupling. Examples of suitable inductive coupling structures and methods that can be used with mover 130 are disclosed in commonly assigned, copending U.S. patent application Ser. No. 13/296,656 filed Nov. 15, 2011 by applicants Guy Lemire et al. and entitled Patient Support with Wireless Data and/or Energy Transfer, the complete disclosure of which is hereby incorporated herein by reference. Other types of inductive coupling may alternatively be used.

FIGS. 33 and 34 illustrate another system and method for transporting patient support apparatuses from one location to another. As shown in these figures, a non-mobile patient support apparatus 150 is effectively made mobile by the temporary addition of a mobility base 152. The mobility base 152 includes a plurality of wheels 154, at least some of which are powered and at least some of which are steered. One or more steering motors 56 and/or driving motors 54 are included within base 152 for steering and driving the wheels 154 of mobility base 152. Mobility base 152 includes a pair of elevation adjustment mechanisms or lifts 156 that can be raised and lowered. In order to move a non-mobile support apparatus 150, mobility base 152 is moved underneath the support apparatus 150 in a lateral direction 158 (FIG. 34). The movement of base 152 in this lateral direction 158 may be facilitated by having all four wheels 154 steerable or freely rotatable so that base 152 can translate in a direction parallel to lateral direction 158, thereby allowing base 152 to be rolled underneath support apparatus 150 from one of its sides.

Once positioned underneath support apparatus 150, the height of lifts 156 is adjusted so that support apparatus 150 is lifted. Such lifting causes a plurality of legs 160 of support apparatus 150 to disconnect with the ground, which would otherwise prevent rolling movement of the combined support apparatus 150 and base 152. The lifting and lowering of lifts 156 (and support apparatus 150 when positioned over base 152) is accomplished via one or more pedals 162 positioned on base 152. Such pedals are coupled to an electric motor, a hydraulic pump, or any other suitable structures for raising and lowering lifts 156. Support apparatus 150 may include a plurality of slots 164, or other structures, defined on its underside that releasably receive the upper section of lifts 156 so as to releasably secure support apparatus 150 to base 152. Such temporary secure-ment should be sufficient to prevent support apparatus 150 from tipping during movement of base 152.

The control of the movement of base 152 is carried out in any of a variety of different manners. In one embodiment, a separate control unit, such as a touch screen controller 142, is provided that communicates with base 152. The touch screen controller 142 is releasably positionable anywhere on support apparatus 150, such as, but not limited to, its headboard 32, its footboard 34, or any other location thereon. A user then steers and powers base 152 by touching the appropriate icons, or other graphical controls, that appear on the screen of touch screen controller 142. Touch screen controller 142 communicates with base 152 over a wired connection or a wireless connection (including, but not limited to, the inductive connections discussed above).

In another embodiment, patient support apparatus 150 has a controller already integrated into it that controls base 152 when it is coupled to support apparatus 150. As with controller 142, the electrical connection between this controller and base 152 is wired in some embodiments and wireless (including inductive coupling) in others. In still other embodiments, patient support apparatus 150 has one or more force sensors 52 built into it that communicate with base 152 and a movement controller 50 positioned thereon in order to control base 152 in any of the manners discussed above with respect to the various mobile patient support apparatuses 20. By utilizing mobility bases 152 that are separate from non-mobile patient support apparatuses 20, a healthcare institution can reduce the expense of purchasing support apparatuses 20 that are all mobile, but instead can purchase the less expensive non-mobile support apparatuses 150 and a smaller number of mobility bases 152.

FIG. 35 illustrates an alternative control system 110 that is able to be incorporated into any of the patient support apparatus 20 discussed herein. In this embodiment, movement controller 50 is connected to an on-board communication network 170 that is in electrical communication with a plurality of other controllers. Internal communications network 170 can be a Controller Area Network (including CANOpen, DeviceNet, and other networks having a CAN physical and data link layer), a LONWorks network, a Local Interconnect Network (LIN), a FireWire network, an Ethernet, or any other known network for communicating messages between electronic structures on patient support apparatus. It could also be a plurality of controllers connected by point-to-point communication, such as, but not limited to, controllers connected by universal serial bus (USB) connections, I squared C connections, or other point-to-point communication protocols. Internal communications network 170 includes a number of controllers or internal nodes that are in communication with each other over the internal network 170. In addition to movement controller 50, these include a footboard controller 172, a sensor controller 174, a scale system controller 176, a first side rail controller 178, a second side rail controller 180, an interface controller 182, and a headboard controller 184. Before describing in further detail the structure and functions of these controllers, it should be pointed out that fewer and/or more controllers could be used with network 170 than the specific ones illustrated. Further, in some embodiments, the functions of one or more controllers are combined into other controllers, and/or the functionality of the controllers is changed.

Each controller that communicates over internal communications network 170 includes one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Side rail controllers 178 and 180 are physically positioned inside of a pair of side rails 44, while headboard controller 184 and footboard controller 172 are positioned inside of headboard 32 and footboard 34, respectively. Other locations for these controllers may also be implemented.

Each controller in FIG. 35 typically includes a circuit board that contains the electronics necessary for controlling a user interface, one or more actuators, one or more sensors, and one or more other electrical components. For example, side rail controllers 178 and 180, as well as footboard controller 172, include one or more user controls 186. The user controls 186 include one or more buttons or switches, or the like, or they include a touch screen, or other device for allowing a patient or caregiver to control one or more aspects of patient support apparatus 20. Such aspects include the pivoting of the patient support deck 30, the activation and deactivation of the brake, the control of a bed exit alarm system, the control of height adjustment mechanisms 26, and other features of the patient support apparatus 20.

Sensor controller 174 is shown to interact with one or more sensors, including, but not limited to, one or more object sensors 108 and one or more RF ID sensors 70, both of which have been described previously and need not be discussed further. Additional sensors may feed into controller 174, such as, but not limited to, one or more sensors for detecting the activation of the brake, and/or angle sensors for detecting the angular orientation of one or more components of support apparatus 20, such as the head section 36 of support deck 30. Controller 174 is responsible for processing the outputs of all of the sensors it communicates with and forwarding messages containing the sensed information to the network 170 for use by any of the other controllers.

Movement controller 50 is in communication with one or more driving motors 54 and one or more steering motors 56. Movement controller 50 is also in communication with network 170 where it receives information from the various force sensors 52 that are positioned on patient support apparatus 20. As shown in the embodiment of FIG. 35, there may be a plurality of force sensors 52, and these force sensors 52 may be coupled to different controllers. For example, in the illustrated embodiment, there are one or more force sensors 52 that feed into footboard controller 172, one or more force sensors 52 that feed into first side rail controller 178, one or more force sensors 52 that feed into second side rail controller 180, and one or more force sensors 52 that feed into a headboard controller 184. These controllers receive the force sensor outputs, process them accordingly, and forward them onto network 170, where they are picked up by controller 50 and acted upon accordingly (in one or more of the manners that have been previously described). In alternative embodiments, force sensors 52 feed directly into movement controller 50 (rather than via network 170), or force sensors 52 all feed exclusively into only a single one of the many controllers, instead of the multiple controllers of FIG. 35, wherein that single controller then forwards the information from all of the force sensors 52 to controller 50 via network 170.

Network 170 may include, as noted, an interface controller 182 that generally oversees communication between patient support apparatus 20 and one or more off-board electronic devices. This communication is controlled via one or more transceivers 188 in electrical communication with controller 182. Transceivers 188 allow support apparatus 20 to communicate with bed mover 130, mobility base 152, and/or for any other electronic device that is separate from support apparatus 20. In some instances, interface controller 182 may also control communications between patient support apparatus 20 and a healthcare computer network, such as a healthcare Ethernet, or other type of network. Interface controller 182 may also control or oversee any of the communications disclosed in commonly assigned U.S. patent application Ser. No. 61/548,491, filed Oct. 18, 2011, by applicants Hayes et al., and entitled PATIENT SUPPORT APPARATUS WITH IN-ROOM DEVICE COMMUNICATION, and 61/640,138 filed Apr. 30, 2012, by applicants Hayes et al., and entitled PATIENT SUPPORT APPARATUS COMMUNICATION SYSTEMS, the complete disclosures of which are both hereby incorporated herein by reference Scale system controller 176 is in communication with a plurality of sensors, such as load cells 190, that are used for detecting patient weight and/or patient presence. The operation of the load cells, in one embodiment, is in accord with the system disclosed in commonly assigned U.S. Pat. No. 5,276,432 issued to Travis and entitled PATIENT EXIT DETECTION MECHANISM FOR HOSPITAL BED, the complete disclosure of which is hereby incorporated herein by reference). The load cells 190, in addition to detecting patient weight, are also able to be used—in one embodiment—for controlling movement of one or more movable portions of patient support apparatus 20, such as is disclosed in commonly assigned U.S. patent application Ser. No. 13/767,943, filed Feb. 15, 2013, by applicant Donna-Marie Robertson et al., and entitled PATIENT SUPPORT APPARATUS AND CONTROLS THEREFOR, the complete disclosure of which is incorporated herein by reference.

It will be understood by those skilled in the art that, in all of the embodiments discussed herein, the sensing of forces by force sensors 52 is carried out repetitively and/or continuously during the movement of the patient support apparatus. In some embodiments, this sensing of forces is performed multiple times per second. The information from the repetitive sensor readings is continuously or repetitively forwarded to movement controller 50 in order to adjust, as necessary, the commands issued to either or both of steering motor(s) 56 and driving motor(s) 54. In this manner, the response to changing forces, as sensed by sensors 52, is updated many times a second so that movement of the support apparatus 20 will respond to changing applied forces. In some embodiments, the movement of patient support apparatus 20 is a closed loop control system based on the force inputs, while in other embodiments the control is open loop.

In any of the embodiments discussed above where the patient support apparatus is configured to provide both powered translational motion and powered rotational motion, controller 50 makes the decision as to which one of, or both of, these types of movements to effectuate based upon several different factors, depending upon the specific configuration of the patient support apparatus. In some embodiments, a speed sensor (not shown) is included that detects the speed of the movement of the patient support apparatus and this speed value is fed to controller 50. Based upon the current speed of patient support apparatus 20, controller 50 decides whether to apply translational forces, rotational forces, or a combination thereof, in response to the forces detected by the force sensors 52. For example, in one embodiment, any detected force inputs from force sensors 52 will result in controller 50 causing purely translational motion of the support apparatus if the speed sensor(s) indicates that the support apparatus is currently traveling under a threshold speed. If the support apparatus is currently traveling at a speed equal to, or faster than, the threshold speed, then any forces detected by force sensors 52 will be processed by controller 50 in a manner that causes powered rotation of the support apparatus to occur. The current speed of the patient support apparatus may alternatively be used in different manners to control whether translational or rotational motion is applied.

In still other embodiments, controller 50 will only allow lateral translational movement (i.e. in the direction of arrow 66 of FIG. 15) if the speed sensor(s) detect a current speed of the patient support apparatus that is below the threshold, depending upon the configuration of force sensors 52 and the forces being applied to them. In other words, while the support apparatus is below the threshold speed, controller 50 supplies power to the motors 54 and/or 56 in any manner (lateral translation, longitudinal translation, and/or clockwise or counterclockwise rotation), depending upon the forces applied by a user to force sensors 52. However, once the patient support apparatus meets or exceeds the threshold speed limit, controller 50 only applies powered movement that effects longitudinal translation and/or clockwise or counterclockwise rotation, and will exclude the possibility of lateral translation. In still other embodiments, the decision as to whether drive motors 54 and/or 56 in a manner that causes lateral translation, longitudinal translation (e.g. direction 88 of FIG. 15), or clockwise or counterclockwise rotation is made without taking into account the current speed of the support apparatus.

In one embodiment, controller 50 will direct motors 54 and/or 56 to generate a purely lateral translation of support apparatus 20 only when the one or more force sensors 52 detect forces in the lateral direction (e.g. 66 of FIG. 15). In this embodiment, the controller 50 directs motors 54 and/or 56 to provide longitudinal power when the magnitude and direction of forces applied to at least two force sensors 52 are the same, or have nearly the same direction and nearly the same magnitude. Further, in this embodiment, the controller 50 directs motors 54 and/or 56 to rotate the support apparatus based upon the difference, if any, in the magnitude and/or direction of forces applied to the two or more force sensors 52. Thus, for example, if a caregiver pushes forward on a pair of force sensors 52 with generally the same magnitude, controller 50 directs motors 54 and/or 56 to longitudinally translate the support apparatus forward without rotation. If a caregiver pushes forward on one force sensor 52 and pulls backward on the other force sensor 52, controller 50 directs motors 54 and/or 56 to rotate the support apparatus without either longitudinal or lateral translation (and the direction of rotation will depend upon which force sensor is pushed forward and which is pulled backward). If the caregiver applies a purely lateral force to one or both of the force sensors 52, then controller 50 directs motors 54 and/or 56 to effect a purely lateral translation of the patient support apparatus. Further, if mixtures of these forces are applied, controller 50 applies the appropriate combination of translation and rotation. Thus, for example, if a caregiver pushes forward on both force sensors 52 but with magnitudes of force that are different from each other by more than a threshold amount, controller 50 controls motors 54 and/or 56 to apply both a forward longitudinal translation and some amount of rotation—the amount being dependent upon the degree of difference in the magnitude of the applied forces.

In still other embodiments, the movement of the patient support apparatus is controlled in yet other manners. As but one example, one or more joysticks are added to the patient support apparatus. Controller 50 reads the forces applied to the joystick and moves the patient support apparatus accordingly. Such movement involves purely translational movement of the support apparatus in the direction corresponding to the direction in which the joystick was pushed or pulled. Rotational movement is implemented, for example, only if the joystick itself is twisted (i.e. a rotational force was applied to it by a user that tended to rotate the joystick about a generally vertical rotational axis). Still other implementations are possible.

Figure 36:
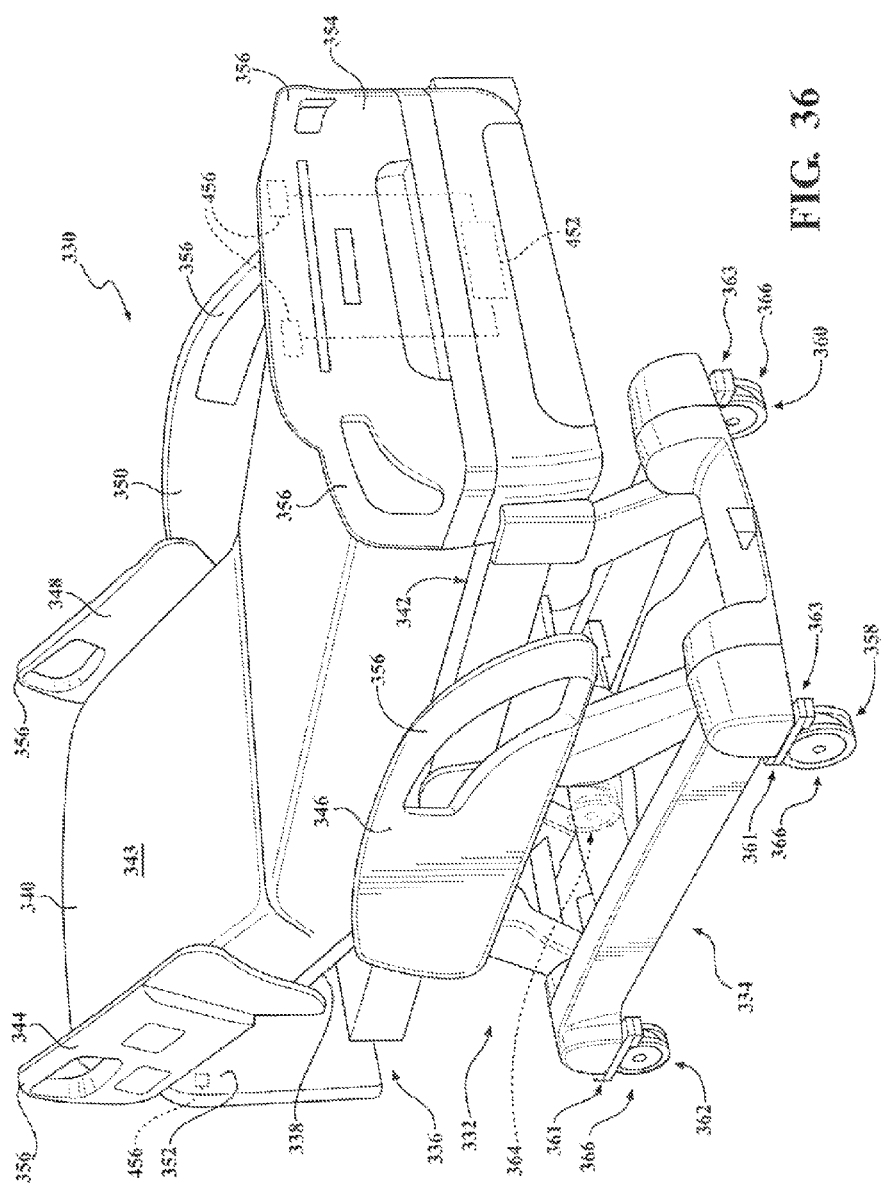
FIG. 36 is perspective view of a patient support apparatus.

Further embodiments of a patient support apparatus 330 are shown in FIGS. 36 through 54. Referring to FIG. 36, a patient support apparatus 330 is shown for moving a patient from one location to another. The patient support apparatus 330 illustrated in FIG. 36 is a hospital bed. In other embodiments, however, the patient support apparatus 330 may be a stretcher, cot, wheelchair, or similar apparatus.

A support structure 332 provides support for the patient during movement of the patient support apparatus 330. The support structure 332 illustrated in FIG. 36 comprises a base 334 and an intermediate frame 336 or litter. The intermediate frame 336 is spaced above the base 334. The support structure 332 also comprises a patient support deck 338 disposed on the intermediate frame 336. The patient support deck 338 comprises several sections, some of which are pivotable relative to the intermediate frame 336, such as a head section, a seat section, a thigh section, and a foot section. The patient support deck 338 provides a patient support surface 342 upon which the patient is supported. The patient support surface 342 is supported by the base 334.

A mattress 340 is disposed on the patient support deck 338. The mattress 340 comprises a direct patient support surface 343 upon which the patient is supported. The base 334, intermediate frame 336, patient support deck 338, and patient support surfaces 342, 343 each have a head end and a foot end corresponding to the designated placement of the patient's head and feet on the patient support apparatus 330. The construction of the support structure 332 may take on any known or conventional design, and is not limited to that specifically set forth above.

Side rails 344, 346, 348, 350 are coupled to the intermediate frame 336. A first side rail 344 is positioned at a right head end of the intermediate frame 336. A second side rail 346 is positioned at a right foot end of the intermediate frame 336. A third side rail 348 is positioned at a left head end of the intermediate frame 336. A fourth side rail 350 is positioned at a left foot end of the intermediate frame 336. If the patient support apparatus 330 is a stretcher or a cot, there may be fewer side rails. The side rails 344, 346, 348, 350 are movable between a raised position in which they block ingress and egress into and out of the patient support apparatus 330, and a lowered position in which they are not an obstacle to such ingress and egress. In still other configurations, the patient support apparatus 330 may not include any side rails.

A headboard 352 and a footboard 354 are coupled to the intermediate frame 336. In other embodiments, when the headboard 352 and footboard 354 are included, the headboard 352 and footboard 354 may be coupled to other locations on the patient support apparatus 330, such as the base 334. In still other embodiments, the patient support apparatus 330 does not include the headboard 352 or the footboard 354.

Operator interfaces 356, such as handles, are shown integrated into the footboard 354 and side rails 344, 346, 348, 350 to facilitate movement of the patient support apparatus 330 over the floor surfaces. Additional operator interfaces 356 may be integrated into the headboard 352 and/or other components of the patient support apparatus 330. The operator interfaces 356 are graspable by the operator to manipulate the patient support apparatus 330 for movement.

Other forms of the operator interface 356 are also contemplated. The operator interface may comprise one or more handles coupled to the intermediate frame 336. The operator interface may simply be a surface on the patient support apparatus 330 upon which the operator logically applies force to cause movement of the patient support apparatus 330 in one or more directions, also referred to as a push location. This may comprise one or more surfaces on the intermediate frame 336 or base 334. This could also comprise one or more surfaces on or adjacent to the headboard 352, footboard 354, and/or side rails 344, 346, 348, 350. In other embodiments, the operator interface may comprise separate handles for each hand of the operator. For example, the operator interface may comprise two handles.

Wheels 358, 360, 362, 364 are coupled to the base 334 to facilitate transport over floor surfaces. The wheels 358, 360, 362, 364 are arranged in each of four quadrants of the base 334 adjacent to corners of the base 334. In the embodiment shown, the wheels 358, 360, 362, 364 are caster wheels able to rotate and swivel relative to the support structure 332 during transport. Each of the wheels 358, 360, 362, 364 forms part of a caster assembly 366. Each caster assembly 366 is mounted to the base 334. It should be understood that various configurations of the caster assemblies 366 are contemplated. In addition, in some embodiments, the wheels 358, 360, 362, 364 are not caster wheels and may be non-steerable, steerable, non-powered, powered, or combinations thereof, including the various combinations of wheels described above with respect to FIGS. 1 through 35. Additional wheels are also contemplated. For example, the patient support apparatus 330 may comprise four non-powered, non-steerable wheels, along with one or more powered wheels.

In other embodiments, one or more auxiliary wheels (powered or non-powered), which are movable between stowed positions and deployed positions, may be coupled to the support structure 332. In some cases, when these auxiliary wheels are located between caster assemblies 366 and contact the floor surface in the deployed position, they cause two of the caster assemblies 366 to be lifted off the floor surface thereby shortening a wheel base of the patient support apparatus 330. A fifth wheel may also be arranged substantially in a center of the base 334.

Figure 37:
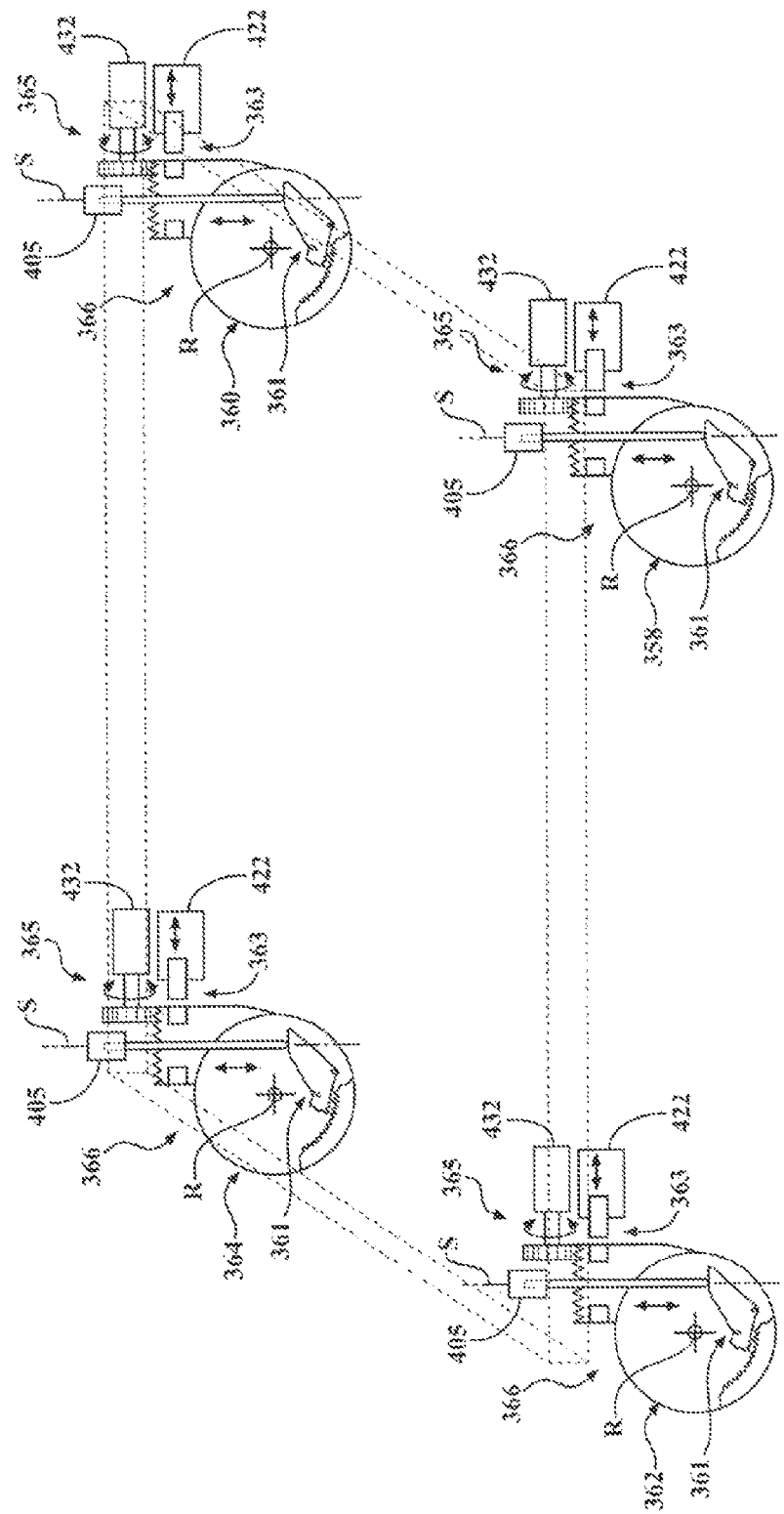
FIG. 37 is a schematic illustration of wheels controlled by brake mechanisms, steer-lock mechanisms, and pre-swivel mechanisms.

Referring to FIG. 37, each of the wheels 358, 360, 362, 364 are part of caster assemblies 366 and each rolls about a roll axis R. Each of the wheels 358, 360, 362, 364 also swivels about a swivel axis S, which may be oriented vertically with respect to the patient support apparatus 330 and transverse to the roll axis R.

A brake mechanism 361 is coupled to each of the wheels 358, 360, 362, 364, to control rolling of the wheels 358, 360, 362, 364 about their roll axes R. In other embodiments, only one brake mechanism 361 is employed to control rolling of only one of the wheels 358, 360, 362, 364. In other embodiments, only two brake mechanisms 361 are employed to control rolling of only two of the wheels 358, 360, 362, 364. In further embodiments, additional brake mechanisms 361 can control rolling of other wheels, such as one or more auxiliary wheels, powered or non-powered. The brake mechanisms 361 can also be used to control rolling of one or more of the wheels 24 previously described.

In the exemplary embodiment shown, the brake mechanisms 361 are integrated into the caster assemblies 366. However, it should be appreciated that the brake mechanisms 361 may assume any conventional design. The brake mechanisms 361 are operable in a braked mode and an unbraked mode. In the unbraked mode, the wheels 358, 360, 362, 364 are permitted to freely rotate about their roll axes R. In the braked mode, the wheels 358, 360, 362, 364 are prevented from freely rolling about their roll axes R to brake the patient support apparatus 330.

A steer-lock mechanism 363 is coupled to each of the wheels 358, 360, 362, 364, to control swiveling of the wheels 358, 360, 362, 364. The wheels 358, 360, 362, 364 will swivel about their swivel axes S to align with a direction of desired movement of the patient support apparatus 330 when an operator attempts to move the patient support apparatus 330. When free to swivel, the wheels 358, 360, 362, 364 are able to automatically re-orient in any direction to facilitate movement. However, at the same time, when allowed to freely swivel, it may be difficult to steer the patient support apparatus 330. In other embodiments, only one steer-lock mechanism 363 is employed to control swiveling of only one of the wheels 358, 360, 362, 364. In further embodiments, only two steer-lock mechanisms 363 are employed to control swiveling of only two of the wheels 358, 360, 362, 364. In still further embodiments, additional steer-lock mechanisms 363 can control swiveling of other wheels, such as one or more auxiliary wheels, powered or non-powered. The steer-lock mechanisms 363 can also be used to control swiveling of one or more of the wheels 24 previously described.

In the exemplary embodiment shown, the steer-lock mechanisms 363 form part of the caster assemblies 366. It should be appreciated that the steer-lock mechanisms 363 may assume any conventional design. Each of the steer-lock mechanisms 363 is operable in a free-swivel mode and a steer mode. In the free-swivel mode, the wheels 358, 360, 362, 364 are permitted to freely swivel about their swivel axes S. In the steer mode, the wheels 358, 360, 362, 364 are prevented from freely swiveling about their swivel axes S to improve steering of the patient support apparatus 330.

In some embodiments, the steer-lock mechanisms 363, although present on all the caster assemblies 366, are selectively actuated to lock only one or two of the wheels 358, 360, 362, 364, while the remaining wheels 358, 360, 362, 364 remain able to freely swivel. For instance, when the operator is pushing on the head end of the patient support apparatus 330 to move the patient support apparatus 330 down a hallway, the wheels 358, 360 located at the foot end of the patient support apparatus 330 are leading. In this case, locking either or both of the wheels 358, 360 makes steering down the hallway or around corners or obstacles easier.

A pre-swivel mechanism 365 is also coupled to each of the wheels 358, 360, 362, 364 to control an orientation of the wheels 358, 360, 362, 364. Much of the operator's effort in initiating movement of the patient support apparatus 330, such as by pushing or pulling on the headboard 352, is directed to first causing all of the wheels 358, 360, 362, 364 to align with the direction of desired movement so that they have a trailing orientation with respect to the direction of desired movement. That is, a start-up force needed to move the patient support apparatus 330 with the wheels 358, 360, 362, 364 in a non-trailing orientation, such as a leading orientation (180 degrees from the trailing orientation), is much greater than the start-up force needed to move the patient support apparatus 330 with the wheels 358, 360, 362, 364 aligned in the trailing orientation. Often, for instance, a direction that the wheels assumed when the patient support apparatus 330 was placed in a hospital room is the opposite direction that the wheels need to assume in order to move the patient support apparatus 330 out of the hospital room. Thus, the starting orientation of the wheels 358, 360, 362, 364 is almost always in an opposite direction of the desired orientation. Once all the wheels 358, 360, 362, 364 become aligned, the effort needed to move the patient support apparatus 330 is substantially reduced, such as by half or more. It should be understood that the trailing orientation does not strictly refer to a specific angular orientation but rather a general alignment relative to the direction of desired movement. For instance, if the patient support apparatus 330 is moving in a first direction, the trailing orientation is the orientation of the wheels 358, 360, 362, 364 of the caster assemblies 366 in which the wheels 358, 360, 362, 364 roll generally in alignment with the first direction, but trailing relative to the swivel axis S. In the embodiment shown, the pre-swivel mechanisms 365 form part of the caster assemblies 366. The pre-swivel mechanisms 365 are operable in a pre-swivel mode and a rest mode. In the pre-swivel mode, the pre-swivel mechanisms 365 are operated to supply all or a portion of the energy needed to turn one or more of the wheels 358, 360, 362, 364 to the trailing orientation before the operator begins to move the patient support apparatus 330 so that the operators work effort to initiate movement of the patient support apparatus 330 is reduced. It should be appreciated that the pre-swivel mechanisms 365 may also be operated to supply all or a portion of the energy needed to turn one or more wheels 358, 360, 362, 364 simultaneously as the operator begins to move the patient support apparatus 330. In the rest mode, the pre-swivel mechanisms 365 are inactive and are not configured to change the orientation of the wheels 358, 360, 362, 364. The pre-swivel mechanisms 365 can also be used to pre-swivel one or more of the wheels 24 previously described.

The brake mechanisms 361, the steer-lock mechanisms 363, and/or the pre-swivel mechanisms 365 can all be independently actuated into several different mobility configurations. More specifically, each of the brake mechanisms 361, the steer-lock mechanisms 363, and/or the pre-swivel mechanisms 365 can be independently operated for each of the wheels 358, 360, 362, 364. For instance, the brake mechanism 361 associated with the wheel 358 can be actuated independently of the brake mechanisms 361 associated with each of the other wheels 360, 362, 364. This is the same for the steer-lock mechanisms 363 and the pre-swivel mechanisms 365. In some embodiments, the brake mechanisms 361, the steer-lock mechanisms 363, and/or the pre-swivel mechanisms 365 may be electronically linked together to be actuated together.

In one embodiment, there are at least four mobility configurations of the brake mechanisms 361, the steer-lock mechanisms 363, and the pre-swivel mechanisms 365. These mobility configurations comprise a free configuration, a braked configuration, a steer configuration, and a pre-swivel configuration. In the free configuration, all the brake mechanisms 361 are in the unbraked mode, all the steer-lock mechanisms 363 are in the free-swivel mode, and all the pre-swivel mechanisms 365 are in the rest mode. In the braked configuration, all the brake mechanisms 361 are in the braked mode, the steer-lock mechanisms 363 are either in the free-swivel mode or the steer mode, and all the pre-swivel mechanisms 365 are in the rest mode. In the steer configuration, all the brake mechanisms 361 are in the unbraked mode, one or more of the steer-lock mechanisms 363 are in the steer mode, and all the pre-swivel mechanisms 365 are in the rest mode. In the pre-swivel configuration, all the brake mechanisms 361 are in the unbraked mode, all the steer-lock mechanisms 363 are in the free-swivel mode, and one or more of the pre-swivel mechanisms 365 operate in the pre-swivel mode to swivel one or more of the wheels 358, 360, 362, 364 to be in the trailing orientation relative to a direction of desired movement. Of course, other mobility configurations are possible.

One of the caster assemblies 366 is shown in detail in FIGS. 38-43 without the steer-lock mechanism 363 or the pre-swivel mechanism 365. The caster assembly 366 comprises a wheel support 370. The wheel 358 comprises first and second wheel parts 390, 392 coupled to the wheel support 370 and rotatable relative to the wheel support 370 about the roll axis R. A spindle 372 is coupled to and extends from the wheel support 370. The spindle 372 comprises the swivel axis S. The spindle 372 also comprises a connector 373. The connector 373 comprises a threaded shaft and a fastener 375 to mount the caster assembly 366 to a frame member 335 of the base 334 so that the spindle 372 is fixed from moving relative to the frame member 335. The wheel support 370 and associated wheel 358 are arranged to swivel relative to the spindle 372 about the swivel axis S.

Referring to FIGS. 39 and 40, the wheel support 370 comprises a housing split into first and second housing components 374, 376. The first housing component 374 is coupled to the second housing component 376 to define an interior therebetween. The spindle 372 is captured in the interior between the first and second housing components 374, 376. The first and second housing components 374, 376 may be secured together with a snap-lock connection, adhesive, or the like. A cap 379 (shown in FIG. 38) is fitted to a neck portion of each of the first and second housing components 374, 376 to further secure the first and second housing components 374, 376 together.

As shown in FIGS. 40 and 41, the spindle 372 also comprises a shaft 378 fixed to the connector 373. A first bearing 380 and a second bearing 382 are disposed around the shaft 378 to enable swiveling of the wheel support 370 and associated wheel parts 390, 392 (not shown in FIGS. 40 and 41) relative to the shaft 378 about the swivel axis S. The bearings 380, 382 are arranged so that the first bearing 380 is closer to the frame member 335 than the second bearing 382. It should be appreciated that any number of bearings may be disposed around the shaft 378. The bearings 380, 382 are spaced apart to allow for load-sharing when the caster assembly 366 encounters bumps.

An axle 384 is coupled to the first and second housing components 374, 376. The axle 384 extends through and outside the first and second housing components 374, 376. The axle 384 defines the roll axis R. A first wheel bearing 386 is rotatably coupled to the axle 384 adjacent to the first housing component 374 and a second wheel bearing (not shown) is rotatably coupled to the axle 384 adjacent to the second housing component 376. The first wheel part 390 is coupled to the first wheel bearing 386 and the second wheel part 392 is coupled to the second wheel bearing. The first and second wheel parts 390, 392 are configured to rotate about the axle 384 and the roll axis R.

The spindle 372 is hollow and comprises an inner chamber along the swivel axis S. The spindle 372 additionally comprises a pair of spindle slots 396 in communication with the inner chamber. A plunger 398 is slidably disposed within the inner chamber. The plunger 398 is configured to slide along the swivel axis S.

Referring to FIGS. 40 and 41, a swivel-lock assembly 399 is disposed within the interior of the wheel support 370. The swivel-lock assembly 399 is configured to lock swiveling of the wheel 358 about the swivel axis S in the braked mode.

This prevents additional movement of the patient support apparatus 330 due to swiveling of the wheels 358, 360, 362, 364, when the brake mechanism 361 is in the braked mode. This could prevent another four to six inches of movement or more that might occur in embodiments without the swivel-lock assembly 399. By preventing swiveling, in addition to braking, this additional movement can be substantially eliminated. In some embodiments, the swivel-lock assembly 399 is absent from the caster assembly 366.

The swivel-lock assembly 399 comprises a first swivel-lock member 400 fixed in relation to the wheel support 370. The first swivel-lock member 400 is disposed for rotating with the wheel support 370 around the shaft 378. The first swivel-lock member 400 comprises circumferentially and equally spaced protrusions. The swivel-lock assembly 399 further comprises a second swivel-lock member 402 slidably coupled to the shaft 378, but fixed from rotating relative to the shaft 378 by a pin 397 (see FIG. 42). The pin 397 engages the second swivel-lock member 402 and rides in a pair of opposing slots 401 in the shaft 378 (see FIG. 42).

The second swivel-lock member 402 comprises circumferentially and equally spaced protrusions facing the first swivel-lock member 400 such that if the second swivel-lock member 402 were to engage with the first swivel-lock member 400, the first and second swivel-lock members 400, 402 would be placed in a meshing relationship, preventing relative rotation therebetween. The protrusions on the second swivel-lock member 402 engage the protrusions on the first swivel-lock member 400 when they align in one of several swivel-lock positions about the swivel axis S. In some embodiments, six, eight, ten, twelve, or more swivel-lock positions are possible.

The swivel-lock assembly 399 additionally comprises a biasing device 403 disposed around the shaft 378. The biasing device 403 biases the second swivel-lock member 402 into engagement with the first swivel-lock member 400 to restrict the wheel support 370 and associated wheel 358 from swiveling about the swivel axis S. The biasing device 403 is shown as a compression spring, but it should be appreciated that any suitable biasing device may be used.

A brake actuator 405 separates the second swivel-lock member 402 from the first swivel-lock member 400 by depressing the plunger 398. This disengages the swivel-lock assembly 399 by depressing the pin 397 and thereby sliding the second swivel-lock member 402 away from the first swivel-lock member 400. In one embodiment, the brake actuator 405 comprises a solenoid or other driver suitable to slide the plunger 398. In other embodiments, the brake actuator 405 may be a motor, such as a stepper motor or servo motor. It should be appreciated that the design of the swivel-lock assembly 399 may comprise alternative configurations other than those specifically described above.

Figure 42:
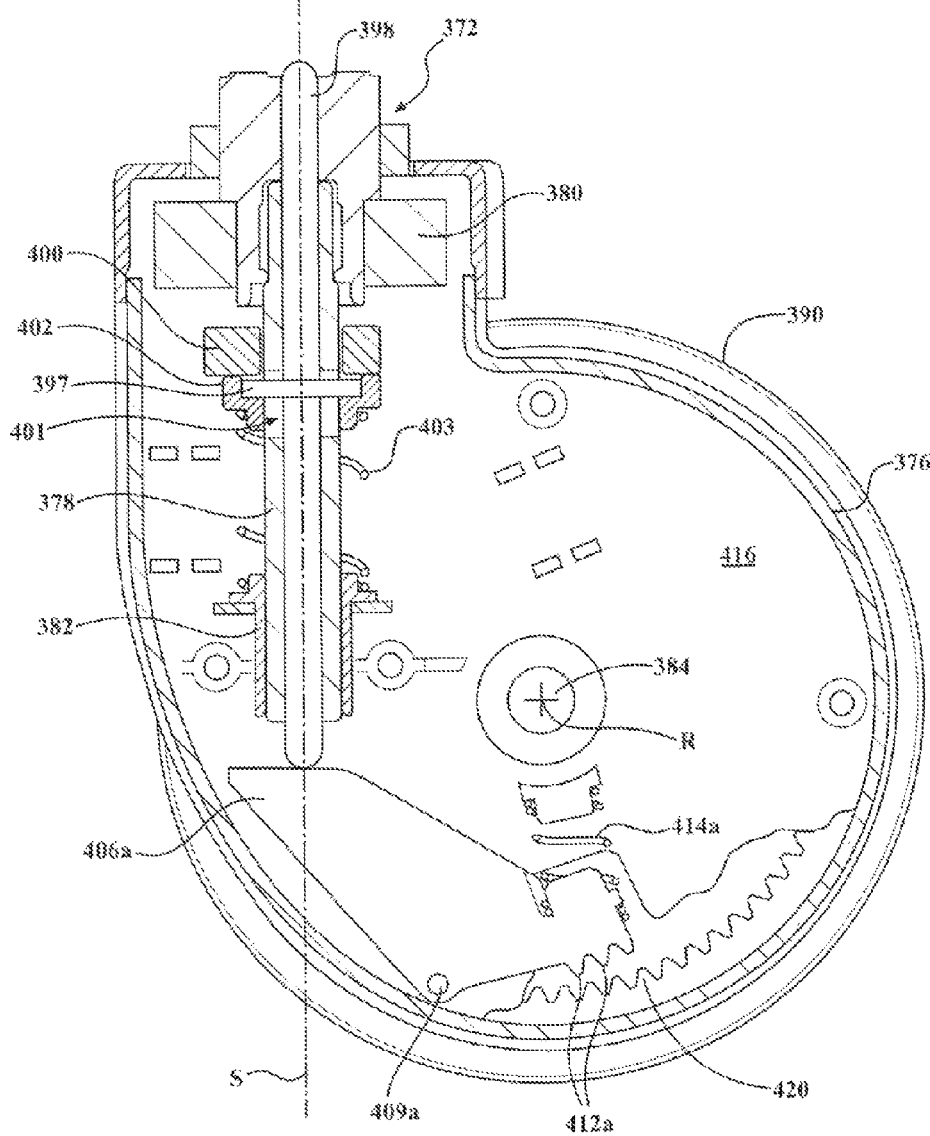
FIG. 42 is an elevational view of an alternative caster assembly showing an interior of the alternative caster assembly.

The brake mechanism 361 comprises a brake lever 406 pivotally coupled to the wheel support 370 by a pivot pin 409. A linkage 410 is pivotally coupled to the brake lever 406 by a pair of lever pins 411 integral with the brake lever 406. The first and second housing components 374, 376 further comprise a pair of locking pin slots 408 (only one locking pin slot 408 shown for the second housing component 376 in FIG. 40). The linkage 410 comprises a pair of locking pins 412. The locking pins 412 extend on opposite sides of the linkage 410 and through the locking pin slots 408 parallel to the roll axis R. In other embodiments, like that shown in FIG. 42, the brake lever 406a is coupled to the wheel support 370 by the pivot pin 409a and the brake lever 406a is configured so that the linkage 410 is unnecessary. In the embodiment of FIG. 42, the locking pins 412 are replaced by locking teeth 412a integrated into the brake lever 406a.

The first and second wheel parts 390, 392 have inner surfaces 416 facing the first 374 and second 376 housing components (see FIG. 43). The first and second wheel parts 390, 392 further comprise wheel grooves 420 in the inner surfaces 416. A portion of the wheel grooves 420 are illustrated by dashed lines in FIGS. 40 and 41 for illustration purposes. The wheel grooves 420 are circumferentially and equally arranged 360 degrees around the wheel parts 390, 392 parallel to the roll axis R. The wheel grooves 420 are radially spaced from centers of the first and second wheel parts 390, 392.

In a normal, unactuated position of the plunger 398, rotation of the first and second wheel parts 390, 392 about the roll axis R is restricted by the brake mechanism 361. The brake mechanism 361 comprises a biasing device 414 acting between the wheel support 370 and the linkage 410. The biasing device 414 biases the locking pins 412 into engagement with the first and second wheel parts 390, 392. In particular, the locking pins 412 are biased into the wheel grooves 420 to restrict rotation of the wheel parts 390, 392 about the roll axis R. This represents the braked mode of the brake mechanism 361. In the embodiment of FIG. 42, the biasing device 414a acts between the wheel support 370 and the brake lever 406a to bias the locking teeth 412a into the wheel grooves 420. The biasing devices 414, 414a are shown as a compression springs, but it should be appreciated that any suitable biasing devices may be used.

To enable rotation of the first and second wheel parts 390, 392, the brake actuator 405, which forms part of the brake mechanism 361, is controlled to move the plunger 398 downwardly so that the plunger 398 abuts and depresses the brake lever 406, 406a. When depressed, the brake lever 406, 406a pivots about the pivot pin 409, 409a and lifts the locking pins 412/locking teeth 412a out of engagement with the wheel grooves 420. This represents the unbraked mode of the brake mechanism 361. When the plunger 398 moves downward, the second swivel-lock member 402 is also separated from the first swivel-lock member 400 to allow the wheel 358 to freely swivel.

In some embodiments, the brake mechanism 361 can cooperate with the swivel-lock assembly 399 so that the swivel-lock assembly 399 and the brake mechanism 361 can work in tandem. The brake mechanism 361 can also be separate and independent of the swivel-lock assembly 399 so that the swivel-lock assembly 399 can engage independently of the brake mechanism 361.

Figure 44B:
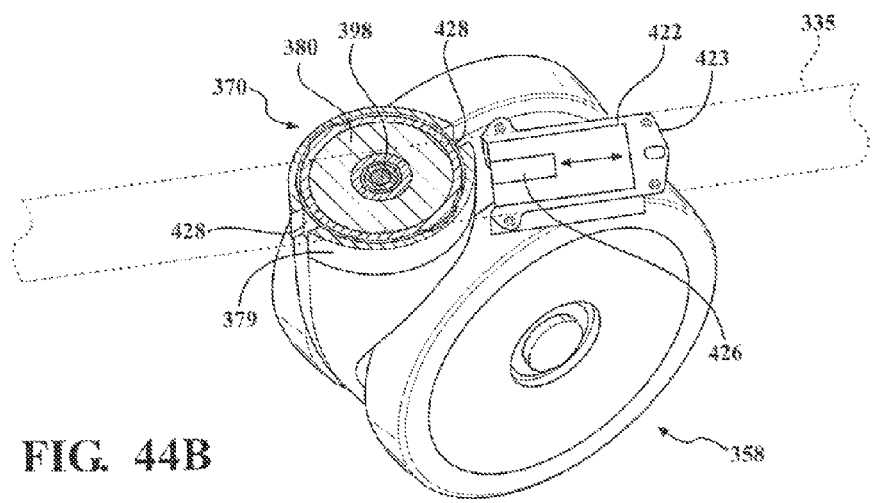
FIGS. 44B and 44C are perspective views of the steer-lock mechanism in the free-swivel mode and the steer mode, respectively.
Figure 44C:
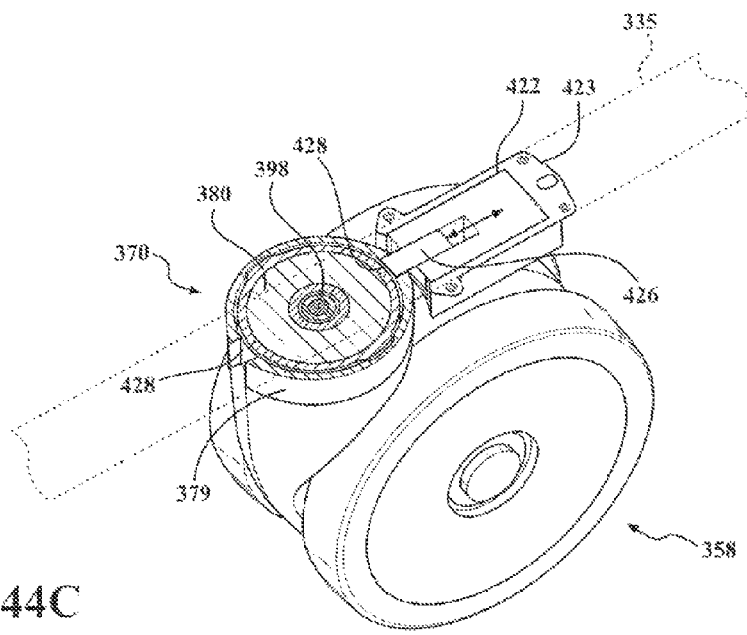

Referring to FIGS. 44A-44C, one embodiment of the steer-lock mechanism 363 is shown. It should be appreciated that, in some embodiments, other steer-lock designs may be utilized. The steer-lock mechanism 363 is different and independent of the swivel-lock assembly 399 described previously. As described, the swivel-lock assembly 399 has numerous swivel-lock positions to prevent swiveling of any of the wheels 358, 360, 362, 364 when the brake mechanism 361 is in the braked mode. This prevents movement of the patient support apparatus 330 that might otherwise occur if the wheels 358, 360, 362, 364 were allowed to swivel, even though they are braked. Conversely, the steer-lock mechanism 363 is specifically intended to operate in the steer mode to make movement of the patient support apparatus 330 easier. In some embodiments, the swivel-lock assembly 399 and the steer-lock mechanism 363 may be integrated into a single mechanism with the numerous swivel-lock positions also being used as steer-lock positions.

Referring to FIGS. 44A and 44B, each steer-lock mechanism 363 comprises a steer-lock actuator 422. The steer-lock actuator 422 is disposed and supported inside a housing 424. The housing 424 is attached to the spindle 372. The housing 424 comprises a base housing component 423 and a cover 425 mounted to the base housing component 423. The cover 425 is fixed to the spindle 372 so that the steer-lock actuator 422 is fully supported by the spindle 372 and fixed from rotating relative to the spindle 372. As a result, the wheel support 370 and associated wheel 358 swivel about the swivel axis S relative to the steer-lock actuator 422 in the free-swivel mode.

Referring to FIGS. 44B and 44C, a locking element 426 is driven by the steer-lock actuator 422 into engagement with the wheel support 370 in the steer mode. This engagement prevents free swiveling of the wheel support 370 and associated wheel 358 about the swivel axis S. The locking element 426 may be a latch, a spring-biased detent, or other element suitable to engage the wheel support 370 and prevent free swiveling of the wheel support 370 and associated wheel 358 about the swivel axis S. In some embodiments, the steer-lock actuator 422 is a solenoid and the locking element 426 is a linear latch actuated by the solenoid.

In the embodiment shown, the wheel support 370 has a pair of opposing catches 428 for receiving the locking element 426. The catches 428 are defined through the cap 379 of the wheel support 370. The catches 428 are arranged 480 degrees apart to provide two steer-lock positions, so that in the steer mode, the wheel 358 is able to be locked in the trailing orientation depending on whether the patient support apparatus 330 is being pushed from the head end or foot end of the patient support apparatus 330, based on the direction of desired movement. In the free-swivel mode, the locking element 426 is disengaged from the catches 428.

In other embodiments, only one steer-lock position is provided. In still other embodiments, there are more steer-lock positions, such as two, three, four, or more steer-lock positions. Alternatively, the locking elements may be located on the wheel support 370 to engage a catch disposed in the housing 424. Thus, other arrangements of the locking element and catches are contemplated. The locking element and catches may have any suitable complementary geometry. For example, the locking element may comprise a hemispherical protrusion, while the catches may comprise hemispherical pockets. Alternatively, the locking element may comprise angular or rectangular protrusions and the catches may comprise geometry that allows the locking element to fixedly engage the catches. Other shapes are also possible for the locking element and catches such as spherical, cylindrical, or any other suitable shapes. Furthermore, steer-lock mechanisms that do no utilize a locking element and catch arrangement may also be suitable for the patient support apparatus 330 in certain embodiments.

During operation, when the steer mode is desired, the steer-lock actuator 422 is activated to slide the locking element 426 toward the cap 379 in order to engage one of the catches 428. However, in the event that neither of the catches 428 are aligned with the locking element 426, the locking element 426 rides, or in some embodiments rolls, along an outer surface of the cap 379 until one of the catches 428 becomes aligned, at which time the locking element 426 engages that particular catch 428. A biasing device (not shown) such as a spring may be disposed between the locking element 426 and the steer-lock actuator 422 so that as the locking element 426 rides or rolls along the outer surface of the cap 379 the locking element 426 is continuously spring-biased against the cap 379 in order to easily fall into one of the catches 428.

Other brake mechanisms and steer-lock mechanisms are contemplated. The brake mechanism 361 and steer-lock mechanism 363 shown in FIGS. 38-43 and 44A-44C are considered positive lock mechanisms, but friction-based mechanisms or non-contact mechanisms, such as magnetic mechanisms, may also be used.

Figure 45:
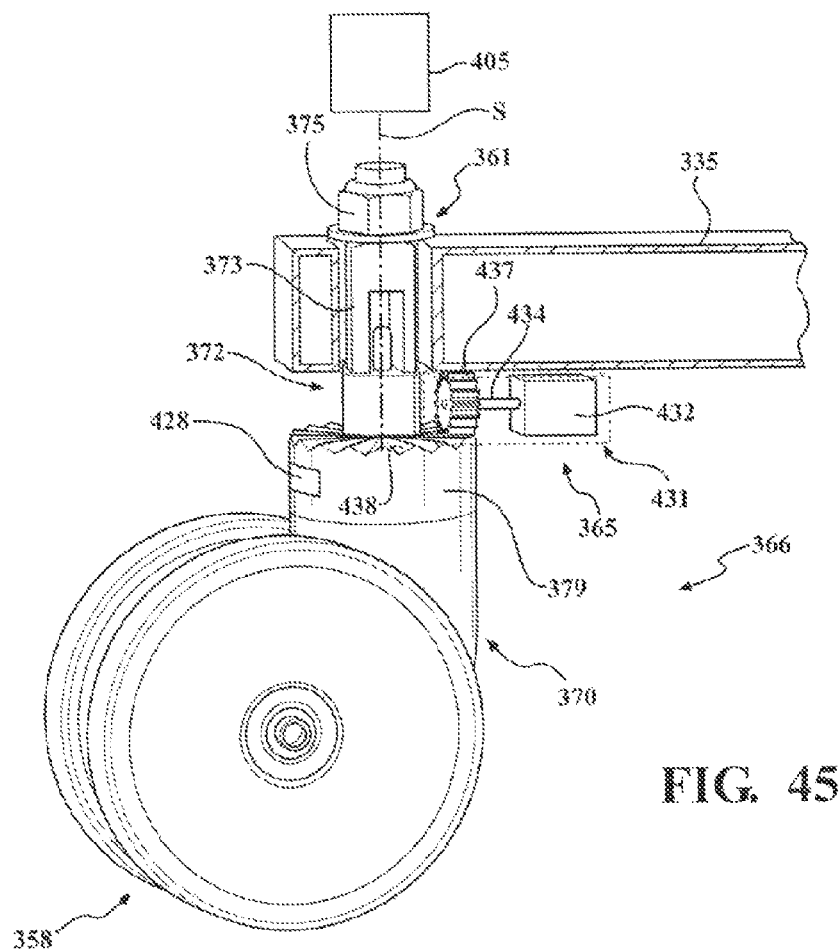
FIG. 45 is a schematic illustration of the pre-swivel mechanism.
Figure 46:
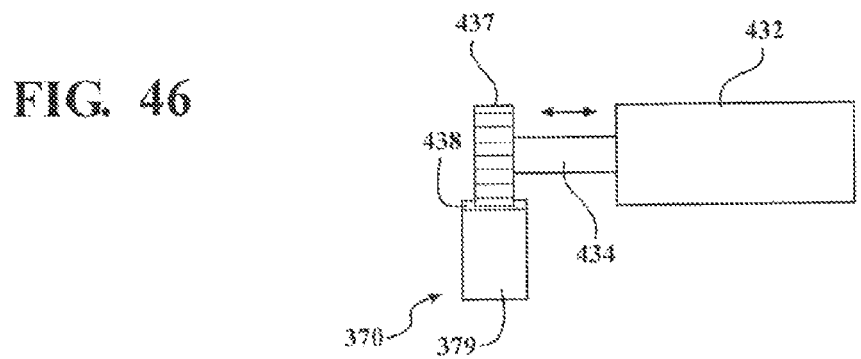
FIG. 46 is another schematic illustration of the pre-swivel mechanism.

FIGS. 44A, 45, and 46 illustrate one embodiment of the pre-swivel mechanism 365. In FIGS. 44A, 45, and 46, the pre-swivel mechanism 365 is shown on the caster assembly 366 with associated wheel 358. Like the steer-lock mechanism 363, the pre-swivel mechanism 365 is positioned at an elevation generally above the elevation of the corresponding wheel 358 (the steer-lock mechanism 363 is removed in FIG. 45 for illustration purposes). The pre-swivel mechanism 365 is configured to swivel the corresponding wheel 358 about the swivel axis S to its trailing orientation in the pre-swivel mode based upon control signals received by the pre-swivel mechanism 365.

In one exemplary embodiment, the pre-swivel mechanism 365 comprises a pre-swivel actuator 432. The pre-swivel actuator 432 is disposed and supported inside a housing 431. The housing 431 is mounted to the spindle 372. As shown in FIG. 44A, the housing 431 may comprise a base housing component 433 and a cover 435 mounted to the base housing component 433. The cover 435 is fixed to the spindle 372 so that the pre-swivel actuator 432 is fully supported by the spindle 372 and fixed from rotating relative to the spindle 372, similar to the steer-lock actuator 422. As a result, the wheel support 370 and associated wheel 358 swivel about the swivel axis S relative to the pre-swivel actuator 432 in the rest mode. In the embodiment shown, the cover 425 of the housing 424 for the steer-lock actuator 422 is integrally formed with the cover 435 of the housing 431 for the pre-swivel actuator 432.

Referring to FIG. 45, the pre-swivel actuator 432 may be a motor. The pre-swivel actuator 432 comprises a drive shaft 434 connected to a drive gear 437. The drive gear 437 is arranged to engage teeth 438 protruding upwardly on the cap 379 of the wheel support 370. The drive gear 437 and teeth 438 arrangement could be a pinion gear and crown arrangement, or other conventional gear arrangement. With the drive gear 437 engaging the teeth 438, rotation of the drive shaft 434 in the pre-swivel mode causes rotation of the drive gear 437 and corresponding swiveling of the wheel support 370 and associated wheel 358 about the swivel axis S toward the trailing orientation. It should be appreciated that the pre-swivel mechanism 365 may utilize other, non-geared devices in order to cause the swivel of the wheel support 370 and associated wheel 358 about the swivel axis S. For example, the pre-swivel mechanism 365 may be electrically coupled to one or more solenoids or servo motors that are configured to cause the wheel support 370 and associated wheel 358 to swivel about the swivel axis S.

In some embodiments, like that shown in FIG. 45, the drive gear 437 remains engaged to the teeth 438 in the rest mode. In this embodiment, the pre-swivel actuator 432 is sufficiently backdriveable so that the wheel 358 still remains able to freely swivel about the swivel axis S when the pre-swivel mechanism 365 is in the rest mode. In other embodiments, such as shown in FIG. 46, the drive shaft 434 may be linearly retractable so that the drive gear 437 only selectively engages the teeth 438. In other words, the drive gear 437 engages the teeth 438 in the pre-swivel mode and disengages from the teeth 438 in the rest mode.

Figure 47:
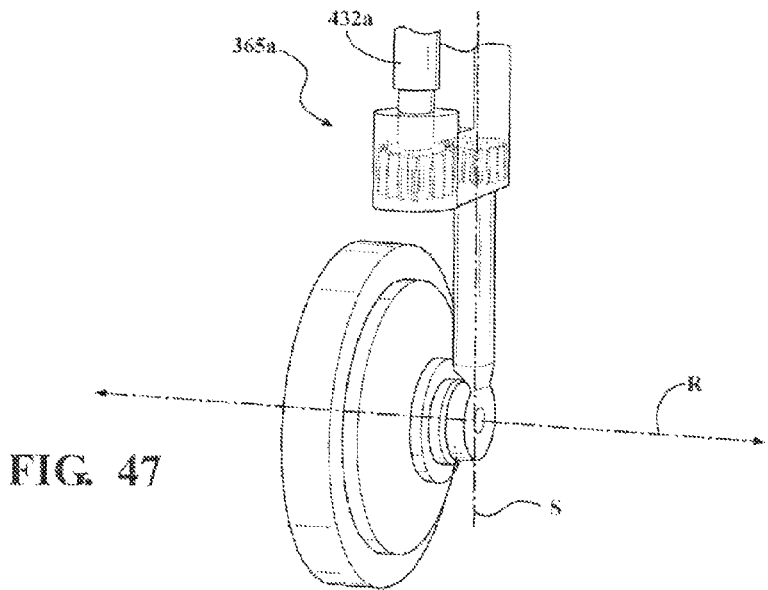
FIG. 47 is a perspective view of a wheel lacking a trailing and non-trailing orientation with an alternative pre-swivel mechanism.

Referring to FIG. 47, an alternative pre-swivel mechanism 365*a* can also be used on a swiveling wheel which does not have a trailing and leading orientation, such as a swiveling fifth wheel or a swiveling powered wheel. In this embodiment, the pre-swivel actuator 432*a* would be controlled to pre-swivel the fifth wheel or powered wheel to align it with the direction of desired movement before movement commences. This pre-swiveling may occur with the fifth wheel or powered wheel being in a stowed position, i.e., with the fifth wheel or powered wheel raised off the floor surface. In some cases, swiveling of the wheels 358, 360, 362, 364, fifth wheel, or powered wheel is not allowed unless another command is first entered by the user, such as an input button on the headboard 352 or other component. This ensures that the operator is not surprised by sudden movement of the wheels 358, 360, 362, 364, fifth wheel, or powered wheel. Pre-swiveling of the fifth wheel or powered wheel further enhances the mobility of the patient support apparatus 330 by further reducing the work needed to be input by the operator to initiate movement of the patient support apparatus 330 in a desired direction. For instance, in some cases, if the fifth wheel or powered wheel is deployed but aligned in the wrong direction with respect to the direction of desired movement, then additional work by the operator will be necessary to place the fifth wheel or the powered wheel in the desired direction. It should also be appreciated that pre-swivel mechanisms could be used on swiveling fifth wheels and/or swiveling powered wheels that do have trailing and leading orientations.

Figure 48:
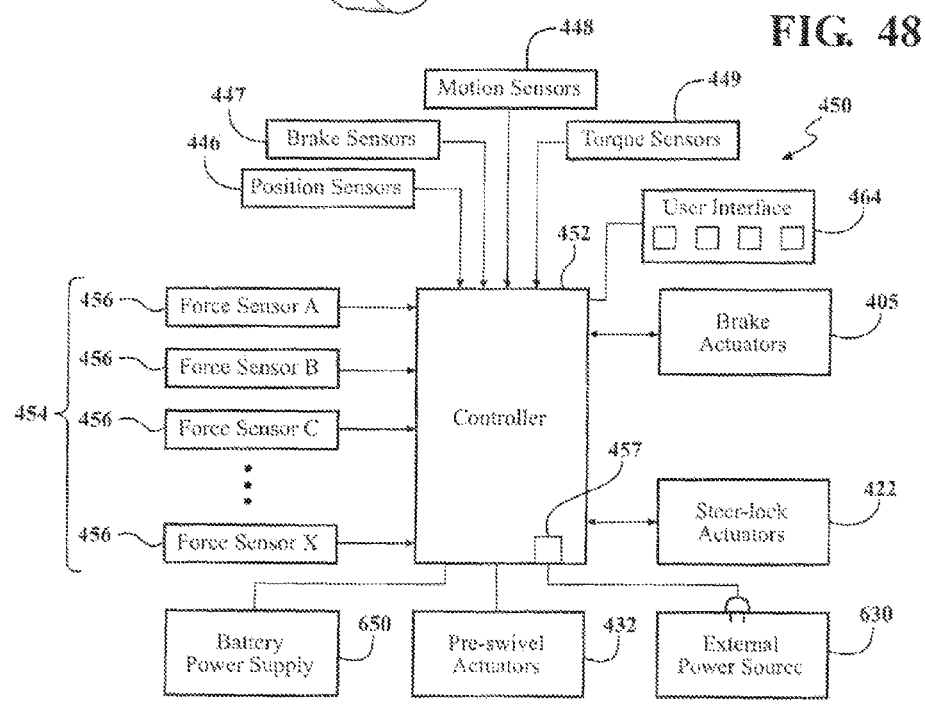
FIG. 48 is a schematic illustration of a control system.

Referring to FIG. 48, in some embodiments, a control system 450 is provided to control operation of the brake mechanisms 361, the steer-lock mechanisms 363, and/or the pre-swivel mechanisms 365. The control system 450 comprises a controller 452 having one or more microprocessors for processing instructions or for processing an algorithm stored in memory to switch between the different modes of the brake mechanisms 361, the steer-lock mechanisms 363, and the pre-swivel mechanisms 365. Additionally or alternatively, the controller 452 may comprise one or more microcontrollers, field programmable gate arrays, systems on a chip, discrete circuitry, and/or other suitable hardware, software, or firmware that is capable of carrying out the functions described herein.

The controller 452 is electronically coupled to the brake actuators 405, the steer-lock actuators 422, and the pre-swivel actuators 432. The controller 452 generates and transmits control signals to the brake actuators 405, the steer-lock actuators 422, and the pre-swivel actuators 432 to rotate their associated drive shafts, actuate their drivers, or otherwise cause desired operation of the brake actuators 405, the steer-lock actuators 422, and the pre-swivel actuators 432. The controller 452 may communicate with the brake actuators 405, the steer-lock actuators 422, and the pre-swivel actuators 432 via wired or wireless connections. Power to the brake actuators 405, the steer-lock actuators 422, the pre-swivel actuators 432, and the controller 452 may be provided by a battery power supply 650 or an external power source 630.

The controller 452 determines in which modes the brake mechanisms 361, the steer-lock mechanisms 363, and/or the pre-swivel mechanisms 365 should be placed. For instance, if the controller 452 determines that the operator is attempting to move the patient support apparatus 330, the controller 452 may selectively place all of the brake mechanisms 361 in the unbraked mode and one or two of the steer-lock mechanisms 363 in the steer mode. In some cases, the controller 452 may place all of the brake mechanisms 361 in the unbraked mode, while all the steer-lock mechanisms 363 are kept in the free-swivel mode until motion has been detected in a constant direction for a predetermined period of time and then one or two of the steer-lock mechanisms 363 associated with the wheels leading the direction of movement are placed in the steer mode.

The controller 452 may also selectively determine which of the steer-lock mechanisms 363 to place in the steer mode based on a direction of desired movement of the patient support apparatus 330. For instance, if the controller 452 senses that the operator is pushing on the head end of the patient support apparatus 330, and hence desires to move the patient support apparatus 330 in the direction of the foot end, then the steer-lock mechanisms 363 on the caster assemblies 366 located at the foot end may be placed in the steer mode. Conversely, if the controller 452 senses that the operator is pushing on the foot end of the patient support apparatus 330, and hence desires to move the patient support apparatus 330 in the direction of the head end, then the steer-lock mechanisms 363 on the caster assemblies 366 located at the head end may be placed in the steer mode. Thus, the control system 450 selectively transmits control signals to the appropriate steer-lock mechanisms 363 based on the direction of desired movement.

The controller 452 also determines whether to actuate the pre-swivel mechanisms 365 and, if so, how much to swivel each of the wheels 358, 360, 362, 364 and/or additional wheels, to place the wheels 358, 360, 362, 364 in the trailing orientation with respect to the direction of desired movement. This pre-swiveling preferably occurs before the operator exerts substantial force in attempting to move the patient support apparatus 330. Thus, in certain configurations, the pre-swivel mechanism 365 only receives the control signal to engage the pre-swivel mode when the controller 452 determines that a force over a predetermined threshold is attempting to move the patient support apparatus 330. However, in certain embodiments, this pre-swiveling may occur simultaneously while the operator is moving the patient support apparatus such that the pre-swiveling mechanism assists in placing the wheels 358, 360, 362, 364 in the trailing orientation with respect to the direction of desired movement.

In one embodiment, the control signal transmitted from the controller 452 is also tied to actuation of the brake mechanisms 361 and/or the steer-lock mechanisms 363. That is, when the operator desires to move the patient support apparatus 330, based on one or more input signals as described further below, the control system 450 first places the brake mechanisms 361 in the unbraked mode, pre-swivels each of the wheels 358, 360, 362, 364 into the trailing orientation in the pre-swivel mode as determined by the input signals, and then switches one or more of the steer-lock mechanisms 363 to the steer mode.

As noted above, the non-trailing orientation of the wheels 358, 360, 362, 364 may be a leading orientation relative to the direction of desired movement of the patient support apparatus 330. In this case, the pre-swivel mechanisms 365 are commanded by the controller 452 to swivel the wheels 358, 360, 362, 364 about the swivel axis S 180 degrees from the leading orientation to the trailing orientation. In cases where the drive gear 437 of the pre-swivel actuator 432 only rotates in one direction, the pre-swivel mechanisms 365 may swivel the wheels 358, 360, 362, 364 greater than 180 degrees between the non-trailing orientation and the trailing orientation. In other cases where the drive gears 437 rotate in both directions to pre-swivel the wheels 358, 360, 362, 364, the pre-swivel mechanisms 365 swivel the wheels 358, 360, 362, 364 anywhere from greater than 0 degrees to about 180 degrees from the non-trailing orientation to the trailing orientation.

In some embodiments, the controller 452 actuates the pre-swivel mechanisms 365 to swivel each of the wheels 358, 360, 362, 364 and/or additional wheels, merely toward the trailing orientation, but does not necessarily need to continue operating the pre-swivel mechanisms 365 until the wheels 358, 360, 362, 364 are fully in the trailing orientation with respect to the direction of desired movement, but instead can terminate operation of the pre-swivel mechanisms 365 with the wheels 358, 360, 362, 364 short of the trailing orientation so long as the work required by the operator to move the patient support apparatus 330 has been reduced. Thus, the controller 452 may operate the pre-swivel mechanisms 365 until the orientation of the wheels 358, 360, 362, 364 is less than 90 degrees, less than 45 degrees, less than 20 degrees, less than 10 degrees, or less than 5 degrees from the trailing orientation.

In some embodiments, the patient support apparatus 330 may comprise one or more position sensors 446 configured to determine a current orientation of each of the wheels 358, 360, 362, 364. These position sensors 446 are in communication with the controller 452. The position sensors 446 provide input signals to the controller 452 that enables the controller 452 to separately determine a current orientation of each of the wheels 358, 360, 362, 364 so that the controller 452 knows how much to pre-swivel each of the wheels 358, 360, 362, 364 to reach the trailing orientation from the non-trailing orientation. Often, each of the wheels 358, 360, 362, 364 will need to be pre-swiveled a different amount to reach the trailing orientation, depending on how the wheels 358, 360, 362, 364 were oriented when the patient support apparatus 330 was last moved. The position sensors 446 may be encoders on the pre-swivel actuators 432 that measure rotation of the drive shafts 434 of the pre-swivel actuators 432 and correlate such rotation with current orientation. The position sensors 446 may also be encoders disposed between the wheel supports 370 of the caster assemblies 366 and the spindles 372 to measure rotation of the wheel supports 370 relative to the spindles 372. For instance, the encoders may be positioned inside the caps 379. Of course, the modality of the position sensors 446 is not particularly important, and any suitable configuration may be utilized so long as the position sensors 446 are able to determine the orientation of the wheels 358, 360, 362, 364 relative to the trailing and non-trailing orientations.

The patient support apparatus 330 may comprise brake sensors 447 to determine whether the brake mechanisms 361 are in the braked mode or the unbraked mode. The brake sensors 447 are in communication with the controller 452. The brake sensors 447 provide input signals into the controller 452 so that the controller 452 is able to determine whether the brake mechanisms 361 are in the braked mode or the unbraked mode. The brake sensors 447 may be mechanically actuated switches on the plungers 398 of each of the caster assemblies 366 that are tripped when the actuators 405 move the plungers 398. Alternatively, Hall-Effect sensors integrated into the actuators 405 could be used to determine a position of a drive shaft or other driver of the actuator 405. In other embodiments, the controller 452 can be programmed to keep track of actuations of the actuator 405 and thus keep track of whether the brake mechanisms 361 are in the braked mode or the unbraked mode based on counts. This method can be employed, for instance, in cases where the actuators 405 comprise linear solenoids. The brake sensor 447 may also be integrated into, or at least responsive to, a user input device by which the operator electronically actuates the brakes.

The patient support apparatus 330 may comprise motion sensors 448 to monitor the number of rotations of one or more of the wheels 358, 360, 362, 364 or movement of the patient support apparatus 330. The motion sensors 448 may comprise wheel encoders, optical sensors, infrared sensors, and the like. The motion sensors 448 are in communication with the controller 452 to provide associated input signals to the controller 452. This enables the controller 452 to roughly determine the distance the patient support apparatus 330 has traveled in certain time periods. The controller 452 may be configured to transmit control signals to one or more of the steer-lock mechanisms 363 to switch to the steer mode when the patient support apparatus 330 has moved at least a predetermined distance. Further, by monitoring the difference in rotation counts between two encoders coupled to wheels on opposite sides of the patient support apparatus 330, turns of the patient support apparatus 330 are able to be detected. Likewise, the controller 452 can determine when movement is in a constant direction. Accordingly, the controller 452 can delay transmitting the control signals to the steer-lock mechanisms 363 to switch to the steer mode until movement is detected in a constant direction for a predetermined period of time. Other sensors, such as gyroscopes, accelerometers, ultrasonic sensors, and/or still other sensors can also be used to provide additional movement information.

Torque sensors 449 are in communication with the controller 452. The torque sensors 449 can generate and transmit input signals to the controller 452 corresponding to the amount of torque applied to the wheels 358, 360, 362, 364 with respect to the swivel axis S when the steer-lock mechanisms 363 are in the steer mode or the pre-swivel mechanisms 365 are in the pre-swivel mode. The torque sensors 449 may be located on the steer-lock mechanisms 363 and/or the pre-swivel mechanisms 365. The torque sensors 449 may comprise strain gages, or other suitable transducers. The controller 452 switches the steer-lock mechanisms 363 from the steer mode to the free-swivel mode if a torque of the associated wheel exceeds a predetermined threshold in the steer mode. Likewise, the controller 452 switches the pre-swivel mechanism 365 to the rest mode if a torque of the associated wheel exceeds a predetermined threshold in the pre-swivel mode. Torque sensors could also be employed to generate and transmit input signals to the controller 452 corresponding to the amount of wheel torque applied to the wheels 358, 360, 352, 364 about the rolling axis R when in the braked mode. If the wheel torque exceeds a predetermined threshold, the brake mechanisms 361 may be released to prevent damage to the brake mechanisms 361. Alternatively, repetitive braking could be employed to continuously brake and unbrake the wheels 358, 360, 362, 364 to limit movement of the patient support apparatus 330 while still preventing damage to the brake mechanisms 361.

In some embodiments, the patient support apparatus 330 may comprise a force sensing system 454 that is in communication with the controller 452. The force sensing system 454 detects forces applied by the operator to the patient support apparatus 330 and generates one or more input signals based on one or more forces. The controller 452 receives the input signals, determines a desired movement of the patient support apparatus 330 based on the input signals, which may be based on the one or more forces, and controls the brake mechanisms 361, the steer-lock mechanisms 363, and/or the pre-swivel mechanisms 365 based on the desired movement of the patient support apparatus 330 by transmitting control signals to the brake actuators 405, the steer-lock actuators 422, and/or the pre-swivel actuators 432. The desired movement of the patient support apparatus 330 may comprise the operators desire to move the patient support apparatus 330, the operators desire for the patient support apparatus 330 to be stationary, the operators direction of desired movement, or other mobility states for the patient support apparatus 330.

In some cases, the controller 452 transmits the control signals to the brake actuators 405, the steer-lock actuators 422, and/or the pre-swivel actuators 432 when a predetermined amount of time has elapsed after the controller 452 determines the desired movement of the patient support apparatus 330 or after the controller 452 receives the initial input signals. For instance, the controller 452 is configured to transmit the control signals to one or more of the steer-lock mechanisms 363 when a predetermined period of time, such as from 1 to 10 seconds, 3 to 8 seconds, 3 to 5 seconds, at least 5 seconds, at least 3 seconds, or other suitable period of time, has elapsed after the controller 452 determines the direction of desired movement of the patient support apparatus 330.

In one case, when the force sensing system 454 detects zero or near-zero forces being applied to the patient support apparatus 330, which suggests that the desired movement of the patient support apparatus 330 is that the patient support apparatus 330 remain stationary, the controller 452 places all the brake mechanisms 361 in the unbraked mode and all the steer-lock mechanisms 363 in the free-swivel mode to allow the wheels 358, 360, 362, 364 to freely swivel and move in case the operator wants to move the bed laterally. Alternatively, the controller 452 may place all the brake mechanisms 361 automatically in the braked mode when zero or near-zero forces are detected and wait until a force above a certain threshold is again measured before proceeding to switch all the brake mechanisms 361 to the unbraked mode.

Figure 49:
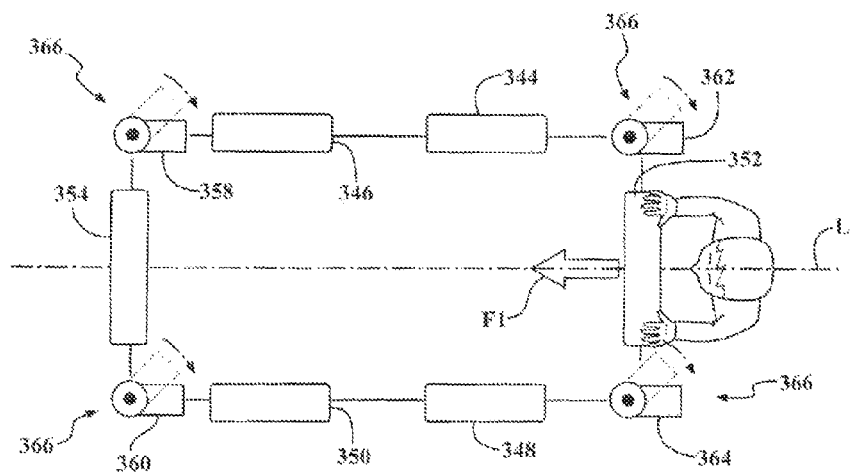
FIG. 49 is a schematic illustration of an operator pushing on a headboard to move the patient support apparatus.

In another case, referring to FIG. 49, the force sensing system 454 detects a component of the force F1 applied by the operator to the patient support apparatus 330 that is parallel to a longitudinal axis L of the patient support apparatus 330. This component determines a direction of desired movement of the patient support apparatus 330. Once the direction of desired movement is determined, the controller 452 can determine which of the pre-swivel mechanisms 365 to activate so that all of the wheels 358, 360, 362, 364 are moved to their trailing orientations, and how much to pre-swivel each of the wheels 358, 360, 362, 364. For instance, if the controller 452 detects that the patient support apparatus 330 is moving in a first direction by virtue of the operator pushing on the headboard 352 as detected by the force sensing system 454, then the controller 452 activates the pre-swivel mechanisms 365 so that all of the wheels 358, 360, 362, 364 are re-oriented to be trailing relative to the first direction, as shown in FIG. 49. In some embodiments, the controller 452 controls the pre-swivel mechanism 365 so as to anticipate the motion of the patient support apparatus 330 that would naturally occur as the result of the applied forces. In this manner, the direction and/or magnitude of the operator's applied forces determine the direction of desired movement of the patient support apparatus 330, but before movement actually occurs.

Once the direction of desired movement is determined, the controller 452 can also determine which of the steer-lock mechanisms 363 to switch to the steer mode. For instance, if the controller 452 detects that the patient support apparatus 330 is moving in the first direction by virtue of the operator pushing on the headboard 352 as detected by the force sensing system 454, then the controller 452 activates the steer-lock mechanisms 363 on the caster assemblies 366 adjacent to the foot end to place them in the steer mode. Again, this may occur after the patient support apparatus 330 moves in this direction continuously for a predetermined period of time. By waiting for continued movement in this direction, it is likely that the wheels 358, 360, which are currently able to freely swivel about the swivel axis S, will align with the direction of motion. Otherwise, in embodiments having multiple steer-lock positions, the steer-lock mechanisms 363 may lock in an undesired steer-lock position, i.e., one that is not yet aligned with the direction of desired movement.

Figure 50:
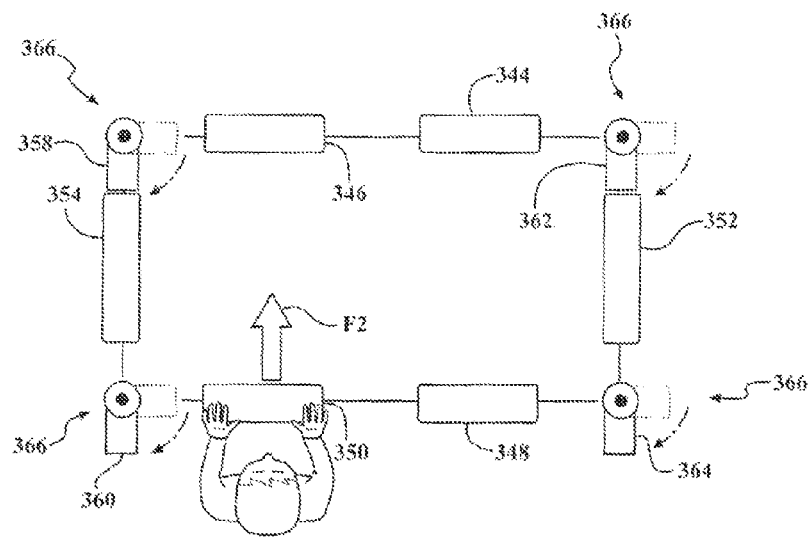
FIG. 50 is a schematic illustration of the operator pushing on a side rail to move the patient support apparatus.

Referring to FIG. 50, the force sensing system 454 can also detect a second force F2 applied laterally to the patient support apparatus 330 while the operator is located adjacent to a first longitudinal side or a second longitudinal side of the patient support apparatus 330 as the patient support apparatus 330 is moving along a hallway. The controller 452 switches the steer-lock mechanisms 363 from the steer mode to the free-swivel mode if the second force F2 exceeds a predetermined threshold. This may occur when the patient support apparatus 330 is being pushed down the hallway with one or two of the steer-lock mechanisms 363 in the steer mode, but subsequently the patient support apparatus 330 needs to move laterally. The need for lateral movement is detected by observing the second force F2 being applied laterally to the patient support apparatus 330. This desire for lateral movement can further be detected by the force F1 initially being applied by the operator when moving down the hallway decreasing to zero. As a result, all the steer-lock mechanisms 363 should be placed in the free-swivel mode.

Dramatic changes in the forces that are detected, either in the direction of the forces being detected, or in the magnitude of the forces being detected, may be monitored by the controller 452 in order to control the brake mechanisms 361, the steer-lock mechanisms 363, and/or the pre-swivel mechanisms 365 in a desired manner. For instance, suppose the forces being detected initially indicate that the direction of desired movement of the patient support apparatus 330 is longitudinally in a first direction down a long hallway, but while the patient support apparatus 330 is moving in the first direction down the long hallway, the forces being detected suddenly change to now indicate that the direction of desired movement is in a second direction, opposite the first direction. This sudden and dramatic change in the direction of desired movement could be an indication that the operator has encountered an obstacle to be avoided in the path of the patient support apparatus 330 and wishes the patient support apparatus 330 to stop. In this case, the controller 452 may automatically switch the brake mechanisms 361 to the braked mode to assist in avoiding the obstacle. The controller 452 may be configured to only switch the brake mechanisms 361 to the braked mode if the sudden change in direction occurs during movement of the patient support apparatus 330 and/or only if the patient support apparatus 330 is moving above a predetermined speed. Further, the controller 452 may be configured to only switch the brake mechanisms 361 to the braked mode if the change in direction is approximately 180 degrees. In other cases, the controller 452 may switch the brake mechanisms 361 to the braked mode upon detecting a sudden decrease in magnitude of the forces detected, which may also indicate that the operator wishes to stop movement of the patient support apparatus 330.

The force sensing system 454 comprises one or more force sensors 456, which can be the same as or similar to the force sensors 52 previously described. The controller 452 is configured to determine a magnitude of the forces applied by the operator to the patient support apparatus 330 based on input signals from the force sensors 456. The controller 452 is configured to transmit the control signals to the pre-swivel actuators 432 to place the wheels 358, 360, 362, 364 in their trailing orientation and/or to the steer-lock actuators 422 to place the steer-lock mechanisms 363 in the steer mode if the magnitude of the force applied by the operator exceeds a predetermined threshold. In some cases, when the magnitude of the force does not exceed the predetermined threshold, no action is taken by the controller 452 to change modes of the pre-swivel actuators 432 or the steer-lock actuators 422.

In one embodiment, the force sensors 456 are coupled to one or more of the operator interfaces 356, such as handles at the head end of the patient support apparatus 330 to indicate when the operator is attempting to push the patient support apparatus 330 from the head end. The force sensors 456 may also be coupled to the headboard 352 or the footboard 354. The force sensors 456 may also be located elsewhere on the patient support apparatus 330 adjacent to the head end, foot end, sides, or combinations thereof. In other embodiments, the force sensors 456 can be placed in IV poles, side rails, the intermediate frame 336 or any other push location of the patient support apparatus 330.

The force sensors 456 may comprise any one or more of load sensors, potentiometers, strain gauges, capacitive sensors, piezoresistive or piezoelectric sensors, or any other types of sensors that are capable of detecting forces applied by the operator to the patient support apparatus 330. In some embodiments, the force sensors 456 will be configured to detect forces applied in two mutually orthogonal, generally horizontal directions. That is, for example, the force sensors 456 will be configured to detect forces that have a component parallel to the longitudinal extent of the patient support apparatus 330 (head end to foot end), as well as forces that have a component parallel to the lateral extent of the patient support apparatus 330 (side to side). In this manner, control of the patient support apparatus 330 can be coordinated to match or align with not only the forward to backward forces exerted on the patient support apparatus 330, but also horizontal forces that are transverse or oblique to the longitudinal axis L of the patient support apparatus 330. Further, any or all of the force sensors 456 may be constructed so as to be able to detect forces applied both in a longitudinal direction as well as a lateral direction, although this is not necessary. For instance, the force sensors 456 may be force/torque sensors that are capable of measuring forces/torques in three translational degrees of freedom and three rotational degrees of freedom.

The force sensors 456 are arranged or configured so as to detect any and all force components that are applied in generally any horizontal orientation, or that have any horizontal components to them. More specifically, the force sensors 456 are arranged to detect forces that are generally parallel to the horizontal plane defined by the base 334 of the patient support apparatus 330, or the horizontal plane defined by the wheels 358, 360, 362, 364 of the patient support apparatus 330 (which may not be parallel to a true horizontal plane if the patient support apparatus 330 is positioned on an incline or decline, or other uneven ground). That is, the force sensors 456 are able to detect forces in both a lateral direction and a longitudinal direction. Force components that are vertically oriented with respect to either of these planes may, in general, be ignored or not sensed by the force sensors 456, or may be used for other purposes.

In certain configurations, the force sensors 456 communicate with the controller 452 to not only determine the magnitude of forces applied, but also the direction(s) of those forces. The reference to "direction" of forces herein may mean whether the force was applied in a forward or backward direction or may mean more than determining whether a force was applied in a forward or backward direction. In other words, the force sensors 456 may communicate with the controller 452 to determine the direction of applied force in generally all horizontal, or approximately horizontal, directions. That is, the force sensors 456 can be used to detect any angular orientation, from 0 to 360 degrees, about a generally vertical axis.

FIGS. 15-17 provide several illustrative examples of different configurations and locations of the force sensors 52, which can also be utilized for the force sensors 456. In some cases, the same force sensors 52 can be used in place of the force sensors 456 to carry out the functions described herein. It will be understood that the several examples illustrated in these figures are not exhaustive, and that variations from these configurations may be made. Further, activation and deactivation of any of the force sensors 52, 456 could be controlled by the controller 452.

FIGS. 15-17 illustrate several embodiments where there are several control locations available to one or more operators to control the patient support apparatus 330. These control locations may comprise a head end control location, a foot end control location, a right side head location, a right side foot location, a left side head location, a left side foot location, or other suitable locations. The operator may stand in any of these various locations and apply a force on the intermediate frame 336, side rails 344, 346, 348, 350, headboard 352, and/or footboard 354. These applied forces will then control, via the controller 452, the brake mechanisms 361, the steer-lock mechanisms 363, and/or the pre-swivel mechanisms 365. By having multiple control locations, it is easier for the operator to effectuate movement of the patient support apparatus 330 because he or she does not need to physically move to a single dedicated location to cause such movement. This feature can be especially useful where an end or side (or both) of the patient support apparatus 330 is positioned up against a wall, or other obstacle, and the operator cannot easily stand next to the portion of the patient support apparatus 330 adjacent the obstacle. By having multiple control locations, however, the operator is assured that control of the brake mechanisms 361, the steer-lock mechanisms 363, and/or the pre-swivel mechanisms 365 can be carried out in any convenient location. The location of the force sensors 456 may be the same as in any of FIGS. 15-17, or they may comprise still other force sensor locations and configurations.

The sensing of forces by the force sensors 456 may be carried out repetitively and/or continuously during the movement of the patient support apparatus 330. In some embodiments, this sensing of forces is performed multiple times per second. The information from the repetitive sensor readings is continuously or repetitively forwarded to the controller 452 in order to adjust, as necessary, the commands issued to one or more of the brake actuators 405, the steer-lock actuators 422, and/or the pre-swivel actuators 432. In this manner, the response to changing forces, as sensed by the force sensors 456, is updated many times a second so that the patient support apparatus 330 will respond to changing applied forces. In some embodiments, the movement of patient support apparatus 330 is a closed loop control system based on the force inputs, while in other embodiments the control is open loop. The force sensors 456 may be positioned anywhere on the patient support apparatus 330 that forces applied by the operator can be detected.

Other inputs into the controller 452 can affect control of the brake mechanisms 361, the steer-lock mechanisms 363, and/or the pre-swivel mechanisms 365. These other inputs may represent conditions of the patient support apparatus 330.

One such condition monitored by the controller 452 relates to the status of the brake mechanisms 361 and/or manual brakes (if manual brakes are used in addition to, or in lieu of, the electrically-operated brake mechanisms 361). More specifically, this condition relates to whether the brake mechanisms 361 or the manual brakes are in the braked or unbraked mode. In monitoring this condition, the controller 452 may prevent actuation of the steer-lock mechanisms 363 and the pre-swivel mechanisms 365 if the controller 452 determines that the brake mechanisms 361 or the manual brakes are in the braked mode. For instance, when the brake mechanisms 361 or the manual brakes are in the braked mode, the operator's manipulation of the force sensors 456 may not result in any operation of the steer-lock mechanisms 361 and/or the pre-swivel mechanisms 365. Once the brake mechanisms 361 or the manual brakes are in the unbraked mode, however, then the operator's manipulation of the force sensors 456 or other user input device can cause the controller 452 to activate one or more of the steer-lock mechanisms 363 and/or the pre-swivel mechanisms 365 in a desired manner, assuming no other conditions exist that would prevent this operation. Alternatively, when brake mechanisms 361 or the manual brakes are sensed to be in the unbraked mode, the controller 452 may cause automatic operation of one or more of the steer-lock mechanisms 363 and/or the pre-swivel mechanisms 365 in response to detecting a force applied to the patient support apparatus 330 by the operator.

The brake sensors 447 are in communication with the controller 452 to determine whether the brake mechanisms 361 or the manual brakes are in the braked or unbraked mode. The brake sensors 447 provide input signals to the controller 452 indicative of whether the brake mechanisms 361 or the manual brakes are in the braked or unbraked mode.

In the embodiment with manual brakes, the manual brakes may be actuated by a brake pedal (not shown). The brake pedal is manipulated by the operator between braked and unbraked configurations to move the manual brakes between the braked and unbraked modes. The brake sensor 447 (see FIG. 48), in this embodiment, may comprise a switch arranged relative to the brake pedal to close when the brake pedal is moved by the operator to place the manual brakes in the unbraked mode and to open when the brake pedal is moved by the operator to place the manual brakes in the braked mode. Other configurations of the brake sensor 447 are also contemplated. It should be appreciated that a variety of brakes may be used in conjunction with the patient support apparatus 330 described herein, including manual, electric, or magnetic braking systems.

In some cases, actuation of the brakes to the unbraked mode triggers the brake sensor 447 to transmit an input signal to the controller 452. In some cases, the controller 452 responds by automatically activating the pre-swivel mechanisms 365 to move the wheels 358, 360, 362, 364 to a predetermined orientation. The predetermined orientation may be a trailing orientation based on movement of the patient support apparatus 330 being in a longitudinal direction and led by the foot end. Other predetermined orientations are also possible. Similarly, actuation of the brakes to the braked mode may cause the controller 452 to automatically place the steer-lock mechanisms 363 in the free-swivel mode.

Another condition monitored by the controller 452 relates to the status of the steer-lock mechanisms 363. More specifically, this condition relates to whether the steer-lock mechanisms 363 are in the free-swivel mode or the steer mode. In monitoring this condition, the controller 452 may prevent actuation of one or more of the pre-swivel mechanisms 365 if the controller 452 determines that one or more of the steer-lock mechanisms 363 are in the steer mode. For example, if the pre-swivel mechanism 365 was actuated with the steer-lock mechanism 363 in the steer mode, the pre-swivel mechanism 365 would be unable to easily swivel the wheel 358 and may damage the steer-lock mechanism 363 or the pre-swivel mechanism 365. This condition can be monitored simply by tracking actuation of the steer-lock actuators 422 or could be monitored by any suitable sensor on the steer-lock actuators 422, such as an encoder, Hall-effect sensor, and the like.

Another condition monitored by the controller 452 relates to the status of the pre-swivel mechanisms 365. More specifically, this condition relates to whether the pre-swivel mechanisms 365 are in the pre-swivel mode or the rest mode. In monitoring this condition, the controller 452 may prevent actuation of the steer-lock mechanisms 363 if the controller 452 determines that the pre-swivel mechanisms 365 are in the pre-swivel mode. In this case, the controller 452 may delay placing the steer-lock mechanisms 363 in the steer mode until the pre-swivel mechanisms 365 are back in the rest mode, i.e., the pre-swivel mechanisms 365 have completed moving their wheels to the trailing orientation. This condition can be monitored simply by tracking actuation of the pre-swivel actuators 432 or could be monitored by any suitable sensor on the pre-swivel actuators 432, such as an encoder, Hall-effect sensor, and the like.

Another condition of the patient support apparatus 330 relates to whether the patient support apparatus 330 is connected to the external power source 630. A power detector 457 (see FIG. 48) provides an operational input into the controller 452 used to determine if the patient support apparatus 330 is connected to (e.g., plugged into) the external power source 630 and/or receiving AC power. Connection to the external power source 630 is an indication that the patient support apparatus 330 is likely to be stationary for a prolonged period of time. Other configurations of the power detector 457 are contemplated, such as a power detection circuit.

Connection to the external power source 630 may cause the controller 452 to automatically place the brake mechanisms 361 in the braked mode. This external power condition may have priority over other conditions and prevent the controller 452 from placing the brake mechanisms 361 in the unbraked mode and prevent actuation of the steer-lock mechanisms 363 or the pre-swivel mechanisms 365. For instance, when the patient support apparatus 330 is connected to the external power source 630, the operator's manipulation of the force sensors 456, or other types of user input devices, will not result in any operation of the brake mechanisms 361, steer-lock mechanisms 363, or pre-swivel mechanisms 365.

When the patient support apparatus 330 is disconnected from the external power source 630, as detected by the controller 452, the operator's manipulation of the force sensors 456 or other user input device can cause the controller 452 to activate one or more of the brake mechanisms 361, the steer-lock mechanisms 363, and/or the pre-swivel mechanisms 365 in a desired manner, assuming no other conditions exist that would prevent this operation. Disconnection from the external power source 630 is an indication that the patient support apparatus 330 is being readied for movement by the operator and the patient support apparatus 330 could be prepared accordingly. Thus, in some embodiments, the controller 452 detects the moment that the patient support apparatus 330 is disconnected from the external power source 630 and automatically places all the brake mechanisms 361 in the unbraked mode and keeps/places all the steer-lock mechanisms 363 in the free-swivel mode.

External conditions around the patient support apparatus 330 may also be used as criteria evaluated by the controller 452 to determine proper control of the brake mechanisms 361, the steer-lock mechanisms 363, and/or the pre-swivel mechanisms 365. For instance, control may be based on whether the patient support apparatus 330 is in a hospital room or a hallway. In a hospital room, for example, it may be unnecessary to activate the steer-lock mechanisms 363, but they could be activated in the hallway. Such external conditions may be determined by sensors such as optical sensors, ultrasonic sensors, infrared sensors, or any other suitable sensors.

In some embodiments, a user interface 464 (see FIG. 48) may be provided for user input. The user interface 464 may also allow customization of the conditions and priority of conditions for operation of the brake mechanisms 361, the steer-lock mechanisms 363, and/or the pre-swivel mechanisms 365. The user interface 464 may comprise buttons, voice activation, gesture sensors, remote control, hand levers, foot pedals, brake pedals, other suitable user input devices, or combinations thereof. The user interface 464 may be mounted to the headboard 352, footboard 354, side rails 344, 346, 348, 350, or any other suitable location on the patient support apparatus 330. The user interface 464 may also be located remotely from the patient support apparatus 330.

The user interface 464 may comprise a touch screen having touch-selectable buttons that can be selected by the operator to place the patient support apparatus 330 in a desired mobility configuration. For instance, the user interface 464 may have four selections available using a single touch-selectable button or multiple touch-selectable buttons. These selections could be identified with indicia or graphical representations as "brake," "steer," "free," and "pre-swivel." The "brake" selection places all the brake mechanisms 361 in the braked mode, keeps the steer-lock mechanisms 363 is their current mode, and places all the pre-swivel mechanisms 365 in the rest mode. In other embodiments, all the steer-lock mechanisms 363 may be placed in the free-swivel mode or in the steer mode. The "steer" selection places all the brake mechanisms 361 in the unbraked mode, desired steer-lock mechanisms 363 in the steer mode, and all the pre-swivel mechanisms 365 in the rest mode. The "free" selection places all the brake mechanisms 361 in the unbraked mode, all the steer-lock mechanisms 363 in the free-swivel mode, and all the pre-swivel mechanisms 365 in the rest mode. The "pre-swivel" selection places all the brake mechanisms 361 in the unbraked mode, all the steer-lock mechanisms 363 in the free-swivel mode, and any necessary pre-swivel mechanisms 365 in the pre-swivel mode based on a user-indicated direction of desired movement. Other mobility configurations and associated inputs are also contemplated.

The user interface 464 may comprise one or more buttons or other user input devices for the operator to indicate which direction the operator intends to move the patient support apparatus 330, i.e., the direction of desired movement of the patient support apparatus 330. This could be as simple as the touch screen having touch-selectable buttons corresponding to each of the longitudinal and lateral directions of the bed, namely forward, backward, left, and right (as observed when at the user interface 464 such as when the user interface 464 is located on the headboard 352). By actuating one of the buttons, the controller 452 transmits control signals to the pre-swivel actuators 432 to place the pre-swivel mechanisms 365 in the pre-swivel mode and swivel (i.e., re-orient) the wheels 358, 360, 362, 364 to their trailing orientations with respect to the direction of desired movement. The controller 452 then transmits another control signal to the appropriate steer-lock actuators 422 based on the direction of desired movement which places the appropriate steer-lock mechanisms 363 in the steer mode (such as only the steer-lock mechanisms 363 at the foot end).

In general, the controller 452 coordinates the operation of one or more of the brake mechanisms 361, the steer-lock mechanisms 363, and/or the pre-swivel mechanisms 365 based upon information received from user input devices, such as from one or more of the force sensors 456, the user interface 464, or other user input devices, and from operational input devices, such as the position sensors 446, the brake sensors 447, the motion sensors 448, the torque sensors 449, the power detector 457, or other operational input devices. More specifically, the controller 452 receives input signals from these input devices, analyzes the input signals, and outputs one or more control signals to the brake actuators 405, the steer-lock actuators 422, and/or the pre-swivel actuators 432 that cause the brake mechanisms 361, the steer-lock mechanisms 363, and/or the pre-swivel mechanisms 365 to operate in a manner that helps to move the patient support apparatus 330 in the manner desired by the operator or to keep the patient support apparatus 330 stationary, if needed. Other sensors could also be used to control operation of the brake mechanisms 361, the steer-lock mechanisms 363, and/or the pre-swivel mechanisms 365 including, for example, optical sensors, ultrasonic sensors, infrared sensors, or any other sensors capable of detecting any of the conditions described herein. Control of the brake mechanisms 361, the steer-lock mechanisms 363, and/or the pre-swivel mechanisms 365 can be independent, or dependent upon each other.

Figures 51A, 51B:
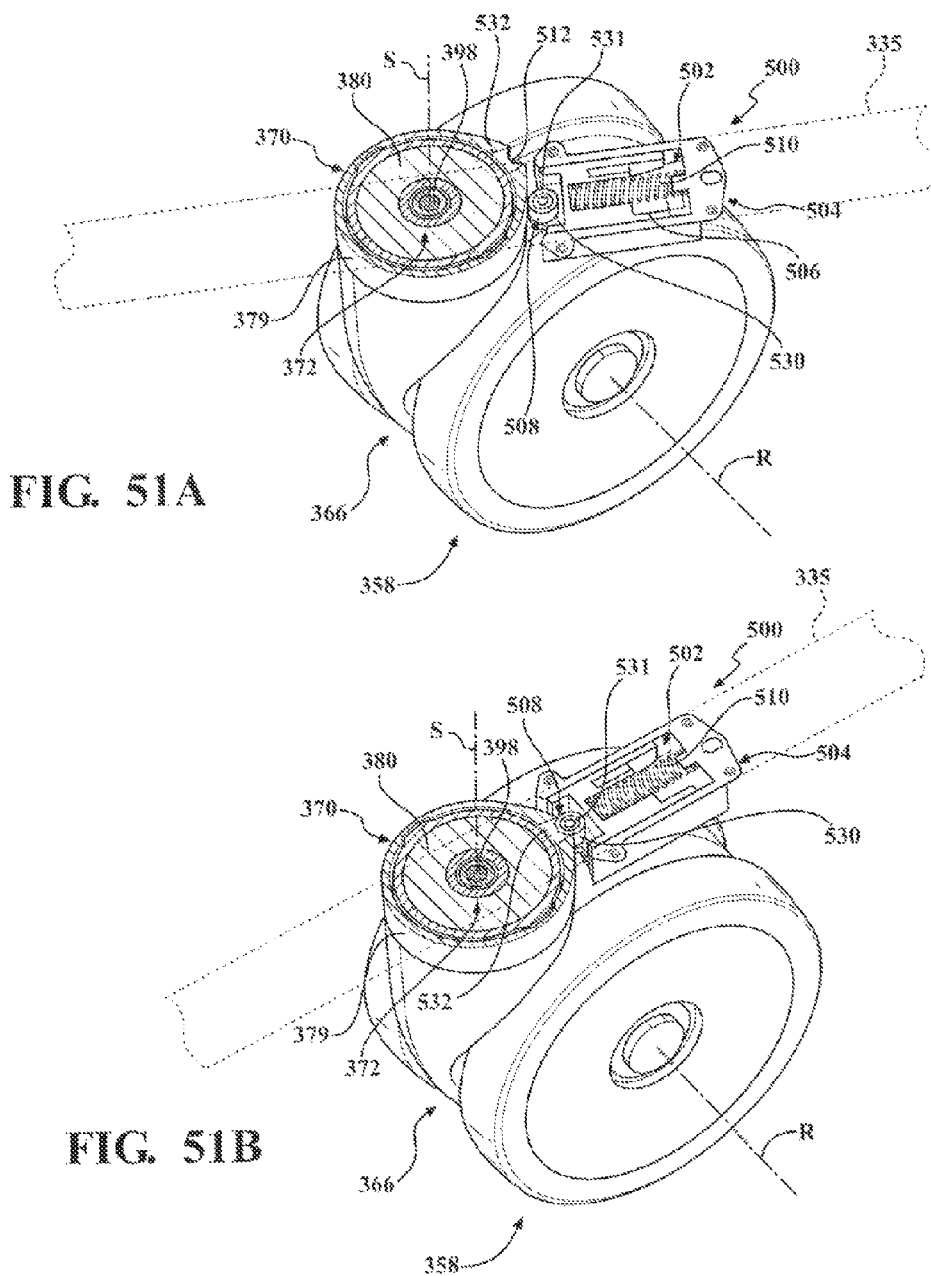
FIGS. 51A and 51B are perspective views of an automatic steer-lock mechanism in the free-swivel mode and the steer mode, respectively.

Referring to FIGS. 51A and 51B, an automatic steer-lock mechanism 500 is shown. The patient support apparatus 330 may optionally comprise the automatic steer-lock mechanism 500 in certain embodiments. This automatic steer-lock mechanism 500 is applied without requiring any operator interaction to place the automatic steer-lock mechanism 500 in the steer mode. This may be advantageous since operators often forget to engage manually-actuated steer-lock mechanisms. Even more problematic is when the operator forgets to disengage the steer-lock mechanism. In such a case, when the operator tries to laterally move the patient support apparatus 330, the patient support apparatus 330 is difficult to move and the operator believes the brakes are still engaged, causing confusion and frustration. The need for mechanical linkages throughout the base 334 to connect to the automatic steer-lock mechanism 500 could also be eliminated in the embodiment shown. The automatic steer-lock mechanism 500 shown is a purely mechanically-actuated mechanism, but could be electrically-actuated, or electro-mechanically actuated.

The automatic steer-lock mechanism 500 can be used as a substitute for the steer-lock mechanism 363 shown in FIGS. 44A and 44B. Like the steer-lock mechanism 363, the automatic steer-lock mechanism 500 also operates in a free-swivel mode and a steer mode. In the free-swivel mode, the wheel support 370 and associated wheel 358 are permitted to freely swivel about the swivel axis S. In the steer mode, the wheel support 370 and associated wheel 358 are prevented from freely swiveling about the swivel axis S.

In this embodiment, instead of the locking element 426, a detent assembly 502 is employed to provide the steer lock. A housing 504 is mounted to the spindle 372 in the same manner as the housing 424 shown in FIG. 44A. The detent assembly 502 is arranged to slide in the housing 504. The detent assembly 502 comprises a detent carrier 506. The detent carrier 506 is slidable in the housing 504 and comprises a post 531 that supports a detent 508. In the embodiment shown, the detent 508 is a roller, but can be any form of detent such as a ball detent. The detent 508 may comprise a resilient material that may provide additional dampening to the automatic steer-lock mechanism 500.

A detent pocket 512 is formed in the cap 379 of the wheel support 370. In the version shown, the cap 379 has a radially-enlarged portion on one side in which the detent pocket 512 is formed so that as the wheel 358 is swiveling toward the trailing orientation (FIG. 51B), the detent rolls along the radially-enlarged portion to reach the detent pocket 512. Only one detent pocket 512 is shown, but two or more detent pockets 512 are possible, such as two detent pockets 512 circumferentially separated 480 degrees apart like the catches 428 shown in FIG. 44B. Alternative shapes and configurations of the detent 508 and detent pocket 512 may also be utilized.

A biasing device 510 biases the detent carrier 506 so that the detent 508 is urged into engagement with the cap 379. The biasing device 510 biases the detent 508 in a radial direction perpendicular to the swivel axis S. The biasing device 510 shown comprises a compression spring acting between the housing 504 and the detent carrier 506.

During operation, as the wheel 358 moves from the non-trailing orientation (FIG. 51A) to the trailing orientation (FIG. 51B), the detent 508 rolls along the outer surface of the cap 379 under the bias of the biasing device 510. Once the wheel 358 reaches the trailing orientation, the detent 508 automatically falls into the detent pocket 512 under the bias of the biasing device 510. Locating the detent 508 in the detent pocket 512 provides temporary steer locking of the wheel 358.

The detent assembly 502 is biased, such as spring-biased, so that when enough force is applied laterally to the patient support apparatus 330, the detent 508 pops out of the detent pocket 512, allowing the wheel 358 to swivel about the swivel axis S and the patient support apparatus 330 to be moved laterally. Also, if a second operator is helping to steer the patient support apparatus 330 at the foot end, the lateral forces may be enough to overcome the bias exerted on the detent assembly 502. In other words, the automatic steer-lock mechanism 500 automatically switches from the steer mode to the free-swivel mode if a torque exceeding a predetermined threshold is applied to the wheel 358.

In this embodiment, no actuator is required to cause activation or deactivation of the automatic steer-lock mechanism 500. Thus, no operator interaction is required and no cable or linkage needs to be routed through the base 334 for the automatic steer-lock mechanism 500.

In another embodiment, the automatic steer-lock mechanism 500 can be optionally enhanced with additional engagement members. In this embodiment, a first engagement member 530 is coupled to the spindle 372 by virtue of being supported in the housing 504. In the version shown, the first engagement member 530 comprises part of the detent 508. A second engagement member 532 is coupled to the wheel support 370. The first and second engagement members 530, 532 are configured to interact with one another to prevent the wheel support 370 from freely swiveling about the swivel axis S when the automatic steer-lock mechanism 500 is in the steer mode.

In one version of this embodiment, one of the first and second engagement members 530, 532 comprises a magnet. The other of the first and the second engagement members 530, 532 comprises a ferromagnetic material or a second magnet. In the version shown, the first engagement member 530 comprises a cylindrically-shaped magnet mounted about the post 531. Thus, the first engagement member 530 forms part of detent 508. The second engagement member 532 is mounted to the wheel support 370 adjacent to the detent pocket 512. In the version shown, the second engagement member 532 is a portion of ferromagnetic material, such as a block of ferromagnetic material embedded in the cap 379. The magnet may comprise neodymium or may be an electromagnet. Accordingly, the automatic steer-lock mechanism 500 effectively becomes a magnetic steer-lock mechanism in this embodiment. The magnet and ferromagnetic material enhance locking in the steer mode by providing an additional magnetic force to hold the wheel 358 in the desired orientation in the steer mode, such as the trailing orientation shown in FIG. 51B. It should be appreciated that other configurations of the magnetic steer-lock mechanism are also contemplated, where the magnet is positioned at alternative locations within the steer-lock mechanism 363.

Figure 52A:
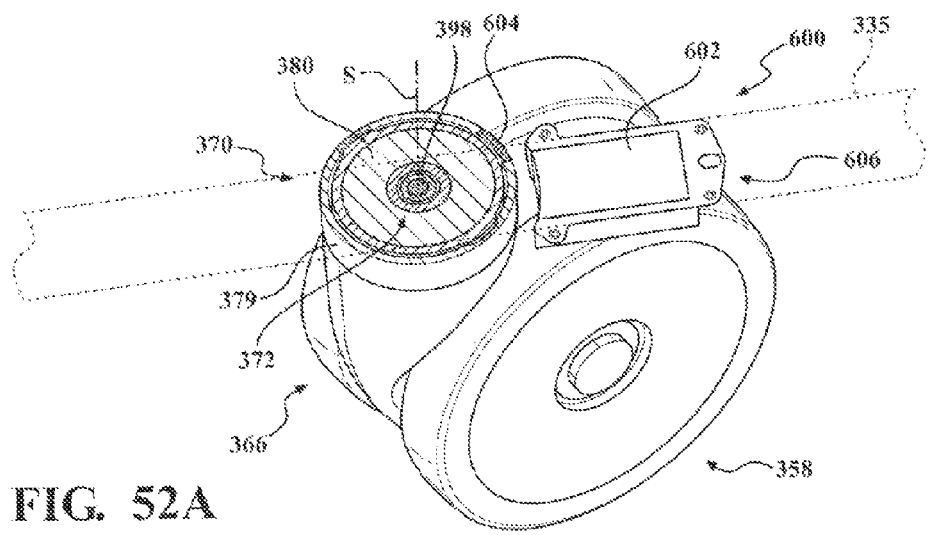
FIGS. 52A and 52B are top views of a non-contact steer-lock mechanism in the free-swivel mode and the steer mode, respectively.
Figure 52B:
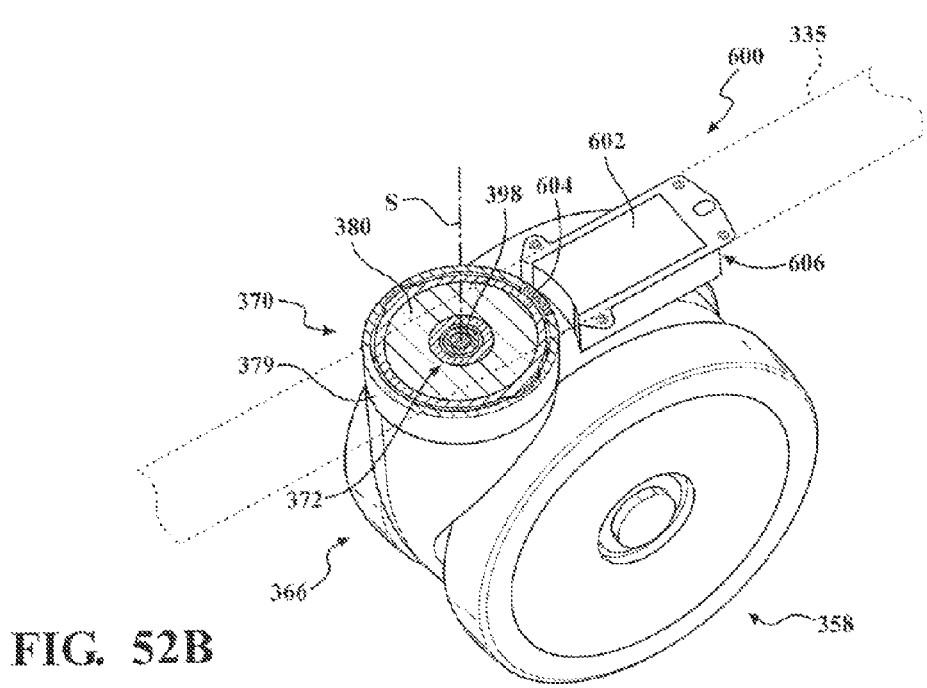

Referring to FIGS. 52A and 52B, a non-contact steer-lock mechanism 600 is shown. The non-contact steer-lock mechanism 600 can also be used as substitute for the steer-lock mechanism 363 shown in FIGS. 44A and 44B. The non-contact steer-lock mechanism 600 operates in a free-swivel mode and a steer mode. In the free-swivel mode, the wheel support 370 and wheel 358 are permitted to freely swivel about the swivel axis S. In the steer mode, the wheel is prevented from freely swiveling about the swivel axis S. More specifically, the wheel support is prevented from freely swiveling about the swivel axis S relative to the connector 373 without physical contact when the non-contact steer-lock mechanism 600 is in the steer mode.

The non-contact steer-lock mechanism 600 comprises a first non-contact member 602. A housing 606 is mounted to the spindle 372 in the same manner as housing 424 shown in FIG. 44A. The first non-contact member 602 is disposed in the housing 606 and thus coupled to the spindle 372. The first non-contact member 602 is fully supported by the housing 606.

The non-contact steer-lock mechanism 600 also comprises a second non-contact member 604. The second non-contact member 604 is coupled to the cap 379 of the wheel support 370. In the version shown, the second non-contact member 604 rotates with the wheel support 370 and associated wheel 358 relative to the first non-contact member 602 in the free-swivel mode. The first and second non-contact members 602, 604 are configured to interact with one another without physical contact to prevent the wheel support 370 from freely swiveling about the swivel axis S when the non-contact steer-lock mechanism 600 is in the steer mode. In other words, in certain embodiments, at no point during the operation of the non-contact steer-lock mechanism 600 do the first and second non-contact members 602, 604 physically contact one another.

In one embodiment, one of the first and second non-contact members 602, 604 comprises a magnet. The other of the first and second non-contact members 602, 604 comprises a ferromagnetic material. The magnet exerts a magnetic force on the ferromagnetic material in the steer mode. In one version, the magnet comprises an electromagnet. For instance, the first non-contact member 602 may be an electromagnet controlled by the controller 452 in the same manner as the steer-lock actuator 422. In another version, the magnet comprises a neodymium magnet.

In some cases, magnetic attraction is experienced between the first and second non-contact members 602, 604 in both the steer mode and the free-swivel mode. For instance, the magnet may exert a first magnetic force on the ferromagnetic material in the steer mode and a second magnetic force on the ferromagnetic material in the free-swivel mode. However, the second magnetic force is smaller than the first magnetic force since the magnetic forces are smaller when the magnet and ferromagnetic material are separated by greater distance in the free-swivel mode than in the steer mode. For that reason, the wheels 358, 360, 362, 364 are still considered to be freely swiveling in the free-swivel mode even though under some magnetic attraction forces.

In another embodiment, the first non-contact member 602 comprises a first magnet and the second non-contact member 604 comprises a second magnet. In this embodiment, the magnets are arranged with their poles aligned to attract in the steer mode.

During operation, as the wheel 358 moves from the non-trailing orientation (FIG. 52A) to the trailing orientation (FIG. 52B), the second non-contact member 604 swivels toward the first non-contact member 602 as the wheel 358 transitions to the trailing orientation. Once the wheel 358 reaches the trailing orientation, the second non-contact member 604 automatically aligns with the first non-contact member 602. Attractive forces between the first and second non-contact members 602, 604, when aligned, provides temporary steer locking of the wheel 358.

The non-contact steer-lock mechanism 600 is configured to automatically switch from the steer mode to the free-swivel mode if a torque exceeding a predetermined threshold is applied to the wheel 358. In the version shown, the non-contact steer-lock mechanism 600 acts through magnetic attraction in the steer mode so that when enough force is applied laterally to the patient support apparatus 330, the magnetic attraction is overcome, allowing the wheel 358 to swivel about the swivel axis S and the patient support apparatus 330 to be moved laterally. Also, if a second operator is helping to steer the patient support apparatus 330 at the foot end, the lateral forces may be enough to overcome the magnetic attraction. In this embodiment, no actuator is required to cause activation or deactivation of the non-contact steer-lock mechanism 600. Thus, no operator interaction is required and no cable or linkage needs to be routed through the base 334 for the non-contact steer-lock mechanism 600. The strength and orientation of the first and second non-contact members 602, 604 may be adjusted depending on the desired operation of the non-contact steer-lock mechanism 600. For example, a weaker magnet may be used in the first non-contact member 602 should it be desired that the patient support apparatus 330 be easily moved in a lateral direction.

Figure 53:
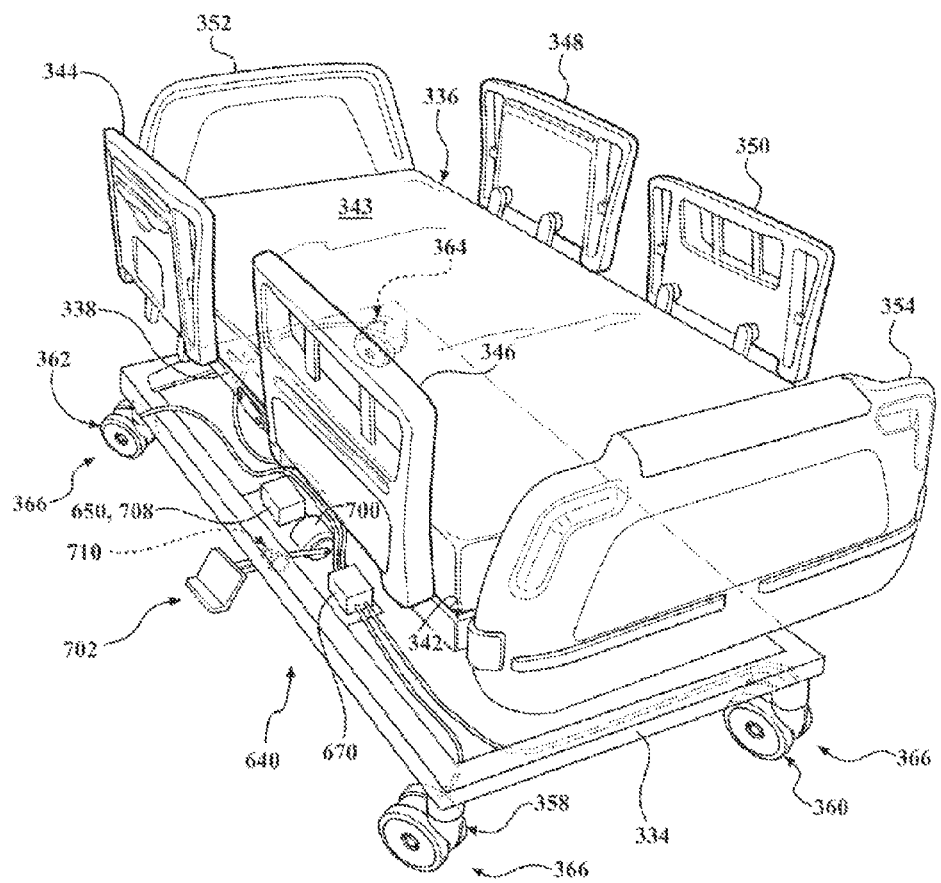
FIG. 53 is a schematic illustration of the patient support apparatus with a generator for generating and supplying back-up electricity.
Figure 54:
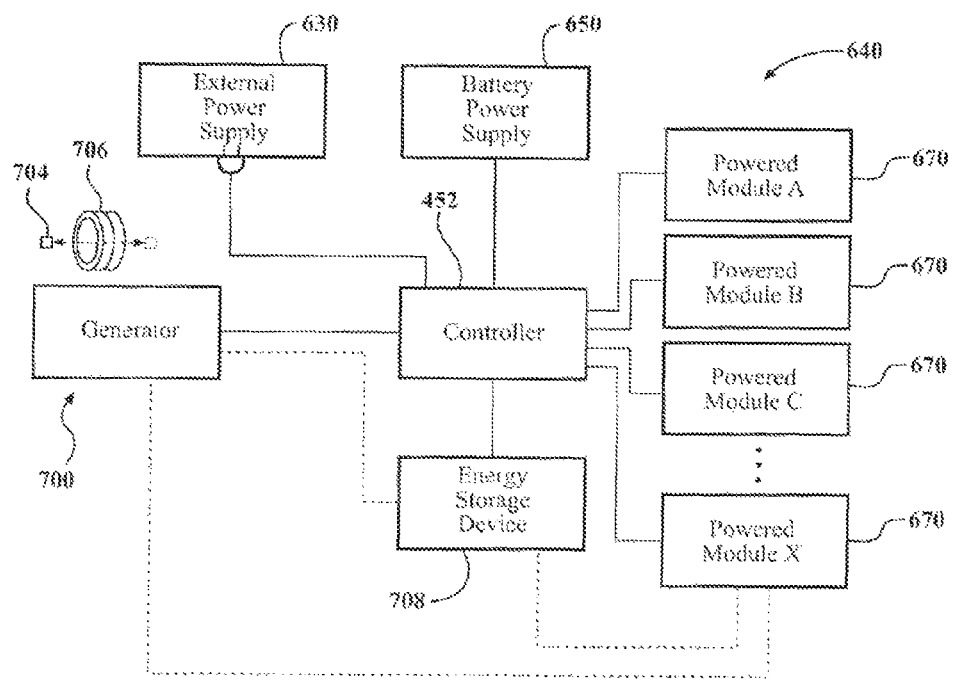
FIG. 54 is a schematic illustration of a power control system for the patient support apparatus.

Referring to FIGS. 53 and 54, the patient support apparatus 330 is configured with a power control system 640. The power control system 640 comprises a rechargeable battery power supply 650. The battery power supply 650 comprises one or more batteries. The battery power supply 650 can be recharged when coupled to the external power source 630. The battery power supply 650 is electrically coupled to one or more powered modules 670 when the patient support apparatus 330 is disconnected from the external power source 630. However, the batteries can go dead in the field, leaving the powered modules on the patient support apparatus 330 without power. For instance, the brake mechanisms 361, steer-lock mechanisms 363, and the pre-swivel mechanisms 365, if they utilize one or more electrical components or are electrically controlled, are unable to be operated in the event of complete power loss. For the caster assemblies 366 shown in FIGS. 38-43 this results in the brake mechanisms 361 being stuck in the braked mode. In other words, in certain configurations, the brake mechanisms 361 are unable to switch to the unbraked mode in the absence of a control signal from the controller 452. Further, in some cases, the patient support apparatus 330 is free of manual brakes, i.e., the patient support apparatus 330 is only equipped with electric brakes. It should be understood that manual brakes are brake mechanisms that require a user to manually actuate one or more brake pedals or other brake levers in order to switch between the braked and unbraked modes. When manual brakes are employed on the patient support apparatus 330, along with electric brakes, the manual brakes can be operated under normal conditions instead of the electric brakes, based on operator preference.

Referring to FIGS. 53 and 54, a generator 700 is integrated into the power control system 640 to provide back-up electricity in the event of total power loss, such as a depleted or dead battery power supply 650, i.e., one that is unable to provide sufficient power for one or more of the powered modules 670 on the patient support apparatus 330. The generator 700 is coupled to one or more of the powered modules 670 on the patient support apparatus 330. This could be a direct connection (see dashed line in FIG. 54) or a connection through the controller 452 or through an energy storage device 708. The generator 700 is configured to generate and supply electricity to the powered modules 670. It may be determined that only one or two of the powered modules 670 require back-up electricity in the event of total power loss. Thus, the generator 700 may be directly connected to such modules only. The generator 700 may comprise an inductive power generator, a direct current power generator, an alternating current power generator, or combinations thereof.

The generator 700 comprises an actuator 702 configured to be manually engaged by the operator of the patient support apparatus 330 to generate the electricity. In one embodiment, the actuator 702 comprises a foot pedal. Other manually actuated mechanisms are also contemplated that convert mechanical motion into electrical energy for immediate use or storage in a capacitor or battery. Other foot actuators and/or a hand actuator are possible. The actuator 702 may be mounted at various locations on the patient support apparatus 330, and may also be temporarily removable to allow easier engagement by the operator.

In one embodiment, the actuator 702 is arranged so that a magnet 704 moves through a coil 706 to charge the energy storage device 708 when the actuator 702 is engaged. The magnet 704 is coupled to one of the actuator 702, the base 334, and the wheels 358, 360, 362, 364, and the coil is coupled to the other of the actuator 702, the base 334, and the wheels 358, 360, 362, 364. The magnet 704 and the coil 706 are configured to move relative to one another during engagement of the actuator 702.

The energy storage device 708 is electrically coupled to the generator 700 and stores electrical energy produced by the generator 700. The energy storage device 708 is electrically coupled to one or more of the powered modules 670 on the patient support apparatus 330 either directly (see dashed line in FIG. 54) or through the controller 452. The energy storage device 708 comprises a capacitor or a battery. In some cases, the energy storage device 708 is the on-board battery power supply 650 of the patient support apparatus 330. In other cases, a separate battery for back-up power storage is provided. Enough energy could be generated to power the brake mechanisms 361 to move them to the unbraked mode and allow the operator to continue moving the patient support apparatus 330 so that the patient support apparatus 330 can be connected to the external power source 630. Of course, various configurations of the battery and capacitor are contemplated. Thus, the battery may comprise any type of cell, such as a lithium cell battery. The capacitor may have a size suitable to store sufficient power to activate the one or more powered modules 670 for a predetermined amount of time.

In some embodiments, when the actuator 702 comprises the foot pedal, the foot pedal is pivotally coupled to the base 334 or one of the wheels 358, 360, 362, 364. The actuator 702 further comprises a gearing system 710 to provide mechanical advantage to the operator during engagement of the actuator 702. At least a portion of the mechanical energy applied to the actuator 702 by the operator is converted to electrical energy by the generator 700 to provide to the powered modules 670. In an alternative embodiment, the generator 700 comprises a solar power generator or other non-mechanical power generator. In this embodiment, the actuator 702 acts to close a circuit to connect the generator 700 directly to one or more powered modules 670, to the controller 452, or to the energy storage device 708.

The powered modules to receive back-up electricity provided by the generator 700 may comprise one or more of an electric brake, a patient positioning system, a scale, a lighting system, a DVT motor and pump assembly, a mattress motor and pump assembly, a steer-lock actuator, a pre-swivel actuator, or combinations thereof. The powered modules can be any powered device of the patient support apparatus 330 that can be supported by the power created by the generator 700. The patient positioning system may comprise a patient lowering system or a deck adjustment system having one or more actuators for lifting and lowering the patient support surface 342 and/or adjusting one or more of the deck sections.

Various additional alterations and changes can be made to any of the embodiments described herein without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A patient support apparatus comprising:
   a base;
   non-driven wheels coupled to said base;
   a patient support deck supported by said base, said patient support deck adapted to support a patient;
   at least one motor adapted to change an orientation of said non-driven wheels;
   a user input including a force sensing system arranged to detect forces applied by a user to said patient support apparatus; and
   a controller adapted to determine a direction of desired movement of said patient support apparatus based on information received from said user input and adapted to command said at least one motor to change said orientation of said non-driven wheels based on said direction of desired movement of said patient support apparatus and at least one force applied by the user to said patient support apparatus.

2. The apparatus of claim 1, wherein said at least one motor is adapted to change said orientation of said non-driven wheels to steer said non-driven wheels and facilitate movement of said patient support apparatus.

3. The apparatus of claim 1, wherein said force sensing system includes at least one sensor selected from the group consisting of load sensors, potentiometers, strain gauges, capacitive sensors, piezoresistive sensors, piezoelectric sensors, and combinations thereof.

4. The apparatus of claim 1, wherein said force sensing system is arranged to detect forces applied by the user to said patient support apparatus at a first location and a second location.

5. The apparatus of claim 4, wherein said patient support deck includes a head end and a foot end, said first location being adjacent said head end and said second location being adjacent said foot end.

6. The apparatus of claim 5, wherein said force sensing system includes at least one sensor located adjacent said head end and at least one sensor located adjacent said foot end.

7. The apparatus of claim 1, wherein said force sensing system is adapted to detect a magnitude and direction of the at least one force applied by the user to said patient support apparatus and said controller is adapted to command said at least one motor to change said orientation of each of said non-driven wheels based on the magnitude and direction.

8. The apparatus of claim 1, wherein said force sensing system is adapted to detect a magnitude and direction of a horizontal component of the at least one force applied by the user to said patient support apparatus, said force sensing system adapted to determine a location on said patient support apparatus of the at least one force applied by the user relative to a reference location on said patient support apparatus.

9. The apparatus of claim 8, wherein said controller is adapted to command said at least one motor to change said orientation of each of said non-driven wheels based on the magnitude and direction of the horizontal component of the at least one force applied by the user to said patient support apparatus and said location on said patient support apparatus of the at least one force applied by the user relative to said reference location.

10. The apparatus of claim 9, wherein said reference location is a center of gravity of said patient support apparatus.

11. The apparatus of claim 1, wherein said force sensing system is adapted to detect a component of the at least one force applied by the user to said patient support apparatus that is parallel to a longitudinal axis of said patient support apparatus.

12. The apparatus of claim 1, including a litter supported on said base and a headboard and footboard coupled to said litter, wherein said force sensing system includes a sensor mounted to at least one of said headboard and said footboard.

13. The apparatus of claim 1, further including a brake, wherein said controller is adapted to determine whether said brake is turned on or off.

14. The apparatus of claim 13, wherein said controller is adapted to command said at least one motor to change said orientation of each of said non-driven wheels if said controller determines that said brake is turned off.

15. The apparatus of claim 1, wherein said controller is adapted to command said at least one motor to change said orientation of each of said non-driven wheels based on a second force applied by the user to said patient support apparatus.

16. A patient support apparatus comprising:
a base;
wheels coupled to said base;
a patient support deck supported by said base and including a head end and a foot end, said patient support deck adapted to support a patient;
a force sensing system adapted to detect a direction of a horizontal component of a force applied by a user adjacent said head end or said foot end of said patient support deck, said force sensing system further adapted to determine a location of the force applied by the user relative to a reference location on said patient support apparatus; and
a controller coupled to said force sensing system to receive a signal from said force sensing system, and configured to output commands that facilitate control of at least one of said wheels based on said direction of said horizontal component of the force applied by the user and said location of the force applied by the user relative to said reference location.

17. A patient support apparatus comprising:
a base;
four non-driven wheels coupled to said base;
a patient support deck supported by said base, said patient support deck adapted to support a patient;
four motors, each of said four motors adapted to change an orientation of one of said four non-driven wheels;
a user input; and
a controller adapted to determine a direction of desired movement of said patient support apparatus based on information received from said user input and adapted to command said four motors to independently change said orientation of each of said four non-driven wheels based on said direction of desired movement of said patient support apparatus.

18. The apparatus of claim 17, wherein said four motors are adapted to change said orientation of said four non-driven wheels to steer said four non-driven wheels and facilitate movement of said patient support apparatus.

19. The apparatus of claim 17, further including a driven wheel.

20. The apparatus of claim 17, further including a brake, wherein said controller is adapted to determine whether said brake is turned on or off.

21. The apparatus of claim 20, wherein said controller is adapted to command said four motors to change said orientation said four non-driven wheels if said controller determines that said brake is turned off.

* * * * *